United States Patent
Fedyukov et al.

(10) Patent No.: US 11,132,833 B2
(45) Date of Patent: Sep. 28, 2021

(54) METHOD AND SYSTEM FOR REMOTE CLOTHING SELECTION

(71) Applicant: TEXEL LLC, Moscow (RU)

(72) Inventors: Maxim Alexandrovich Fedyukov, Dzerzhinskiy (RU); Andrey Vladimirovich Poskonin, Moscow (RU); Sergey Mikhailovich Klimentyev, Moscow (RU); Vladimir Vladimirovich Guzov, Moscow (RU); Ilia Alexeevich Petrov, Khimki (RU); Nikolay Patakin, Karaganda (KZ); Anton Vladimirovich Fedotov, St. Petersburg (RU); Oleg Vladimirovich Korneev, St. Petersburg (RU)

(73) Assignee: Texel, Inc., Moscow (RU)

( * ) Notice: Subject to any disclaimer, the term of this patent is extended or adjusted under 35 U.S.C. 154(b) by 0 days.

(21) Appl. No.: 16/840,598

(22) Filed: Apr. 6, 2020

(65) Prior Publication Data
US 2021/0049811 A1 Feb. 18, 2021

(30) Foreign Application Priority Data
Aug. 13, 2019 (RU) .......................... RU2019125602

(51) Int. Cl.
*G06T 15/00* (2011.01)
*G06T 17/00* (2006.01)
(Continued)

(52) U.S. Cl.
CPC .......... *G06T 17/00* (2013.01); *G06Q 30/0643* (2013.01); *G06T 7/50* (2017.01);
(Continued)

(58) Field of Classification Search
CPC ........... G06T 17/00; G06T 2207/30196; G06T 2207/20028; G06T 7/60; G06T 7/50; G06T 2207/10028; G06Q 30/0643
(Continued)

(56) References Cited

U.S. PATENT DOCUMENTS 8,463,006 B2 * 6/2013 Prokoski ............... G06T 7/0012
382/128
9,652,890 B2 * 5/2017 Beeler .................... H04N 5/225
(Continued)

OTHER PUBLICATIONS

Nguyen MT, Dang TV, Tran Thi MK. Generating point cloud from measurements and shapes based on convolutional neural network: an application for building 3D human model. Computational intelligence and neuroscience. Sep. 2, 2019;2019. (Year: 2019).*
(Continued)

*Primary Examiner* — Phu K Nguyen
(74) *Attorney, Agent, or Firm* — Bardmesser Law Group

(57) ABSTRACT

The method for remote clothing selection includes determination of anthropometric dimensional parameters of a user, automatic assessment of correspondence of a garment to the shape and body measurements of a user, determination and provision of recommendations to a user on the selection of a particular garment and, optionally, visualization of a garment on a digital avatar of this user in the virtual fitting room, including optional change of his/her pose. The invention provides an increase in the efficiency of remote clothing selection by a user, an improvement in user's experience of remote purchase, an increase in user satisfaction and, ultimately, an increase in online sales of clothing and a decrease in the proportion of clothing returned after a purchase due to unsatisfactory matching to the shape and measurements of user's body.

19 Claims, 35 Drawing Sheets

(51) Int. Cl.
*G06T 7/50* (2017.01)
*G06T 7/60* (2017.01)
*G06Q 30/06* (2012.01)

(52) U.S. Cl.
CPC ...... *G06T 7/60* (2013.01); *G06T 2207/10028* (2013.01); *G06T 2207/20028* (2013.01); *G06T 2207/30196* (2013.01)

(58) Field of Classification Search
USPC ........................................................ 345/418
See application file for complete search history.

(56) References Cited

U.S. PATENT DOCUMENTS

| | | | | |
|---|---|---|---|---|
| 10,013,801 | B2* | 7/2018 | Mehr | G06T 7/50 |
| 10,574,974 | B2* | 2/2020 | Arora | H04N 13/282 |
| 10,777,018 | B2* | 9/2020 | Varady | G06T 7/80 |
| 10,929,996 | B2* | 2/2021 | Angelova | G06T 3/40 |
| 2016/0253807 | A1* | 9/2016 | Jones | G06K 9/00221 382/154 |
| 2018/0077400 | A1* | 3/2018 | Ayari | G06T 17/20 |
| 2021/0049811 | A1* | 2/2021 | Fedyukov | G06T 17/00 |

OTHER PUBLICATIONS

Mao A, Zhang H, Liu Y, Zheng Y, Li G, Han G. Easy and Fast Reconstruction of a 3D Avatar with an RGB-D Sensor. Sensors. May 2017;17(5):1113. (Year: 2017).*

Jiang B, Zhang J, Cai J, Zheng J. Disentangled Human Body Embedding Based on Deep Hierarchical Neural Network. arXiv e-prints. May 2019:arXiv-1905. (Year: 2019).*

Munaro M, Basso A, Fossati A, Van Gool L, Menegatti E. 3D reconstruction of freely moving persons for re-identification with a depth sensor. In2014 IEEE international conference on robotics and automation (ICRA) May 3, 20141 (pp. 4512-4519). IEEE. (Year: 2014).*

Lunscher N, Zelek J. Deep learning whole body point cloud scans from a single depth map. InProceedings of the IEEE Conference on Computer Vision and Pattern Recognition Workshops 2018 (pp. 1095-1102).*

Wuhrer, S., 2018. Deformation Models for Human Shape Analysis (Doctoral dissertation, Université Grenoble Alpes (France)).*

* cited by examiner

METHOD AND SYSTEM FOR REMOTE CLOTHING SELECTION

BACKGROUND OF THE INVENTION

Field of the Invention

The invention relates to e-commerce, and, more particularly, to a means to assist the user in remote selection of goods (clothing, footwear, accessories, etc.) to which the concept of size applies by assessing whether the size of the goods corresponds to the shape and body measurements of the user.

Related Art

In recent years, the use of the traditional simplest size system, such as [height]-[chest girth]-[waist girth]-[hip girth] or [height]-[shoulder size]-[hip size] in the clothing trade, or [size]-[fullness] in the footwear trade, has been gradually supplanted by the use of more complex parametric models or geometric models of the user's body, which can be used to analyze a particular garment, shoes, accessories, etc. (hereafter, for brevity, referred to as "garment", "clothing" or "clothes").

The tendency to use such models is due to several factors, among which are a desire of retailers to reduce the number of returns of clothes that "did not fit" for any reasons, and a transition of clothing manufacturers to the use of "computer" clothing patterns instead of the traditional "paper" clothing patterns. In order to obtain "computer" clothing patterns, production computer models or physical dummies (mannequins, dress forms, etc.) are used, for which parametric models are specified. Such production models are usually created based on statistical data obtained by sampling representative measurements of population on a certain territory. In other words, production models usually fairly accurately describe at least the most common types of human shapes in a given country, corresponding to at least 80-90% of the population.

It gives an opportunity, having executed optical scanning of a body of the user and having constructed its geometrical (in particular, three-dimensional) and/or parametric model, to compare this model with the corresponding production models used at tailoring, and remote selection of garments most suitable to the user based on body measurements and the shape of the body.

In addition, it makes it possible to visualize these items of clothing on the user, i.e., to present a realistic image of one garment or several items of clothing in combination, on the screen of an electronic device. In this case, the user has the opportunity to examine in detail the depicted garment (or himself/herself in this clothing) from different angles and distances, on different situational background (which can be chosen from the library), in different lighting (day, evening, artificial), etc.

It is expected that all these measures should facilitate more meaningful purchases of clothing and, consequently, a significant reduction in the number of returns.

Thus, the task of helping the user in remote clothing selection can be divided into several stages: determination of anthropometric dimensional parameters of the user (in particular, his/her body measurements), determination of dimensional parameters of garments, assessment of correspondence of garments to the user's body based on analysis of these parameters and, optionally, visualization of garments on the user's digital avatar.

Determining the user's body measurements may include building a model of the user's body. Approaches to construction of three-dimensional model of a body of the user, determination of its anthropometric dimensional parameters and their comparison with dimensional parameters of garments are described in a set of patent and non-patent documents.

US2015206341A1 (Method for providing a three dimensional body model) describes the application of segmentation by body parts on a 3D image, the application of a swivel body skeleton model, the construction of a canonical model, as well as partially describes the determination of shape parameters and canonical parameters of the pose of a parametric model by minimizing the loss function, taking into account the visible points, minimizing the errors of an arbitrary model by the Gauss-Newton method, and the construction of an arbitrary three-dimensional model of the surface by changing the parameters of the canonical model transformation based on 3D image (in arbitrary shape and arbitrary pose) according to the morphing field graph. This document does not describe the construction of the morphing field graph by determining the vertices of the parametric model and refining the shape parameters and canonical parameters of the parametric model pose taking into account the results of the canonical three-dimensional surface model.

EP2674913A1 (Three-dimensional object modelling fitting & tracking), EP3358527A1 (Apparatus and method to generate realistic rigged three dimensional (3D) model animation for viewpoint transform), EP3382648A1 (Three-dimensional model generating system, three-dimensional model generating method, and program), RU2014152713A1 (Body Measurement), US2012019517A1 (Automatic generation of 3D character animation from 3D meshes), US2013187919A1 (3D body modeling, from a single or multiple 3D cameras, in the presence of motion), US2013286012 A1 (3D body modeling, from one or more depth cameras, in the presence of articulated motion), US2015356767A1 (Rapid avatar capture and simulation using commodity depth sensors), US2016110595A1 (Fast 3D model fitting and anthropometrics using synthetic data), US2017140578A1 (Depth camera based human-body model acquisition method and network virtual fitting system), US2017337732A1 (Human body representation with non-rigid parts in an imaging system), WO2010019925A1 (Method and apparatus for estimating body shape), WO2013087084A1 (Method and apparatus for estimating a pose), WO2014053198A1 (Co-registration—simultaneous alignment and modeling of articulated 3D shapes), WO2015021381A1 (Real-time reconstruction of the human body and automated avatar synthesis), WO2016207311A1 (Skinned multi-person linear model) describe the application of segmentation by body parts on a 3D image, the application of an articulated body skeleton model, the construction of a canonical model, as well as partially describing the determination of shape parameters and canonical parameters of the parametric model pose by minimizing the loss function taking into account visible points and building an arbitrary three-dimensional surface model by changing the transformation parameters of the canonical model based on the 3D image (in arbitrary shape and arbitrary pose) according to the morphing field graph. These documents do not describe the construction of the morphing field graph by determining the vertices of the parametric model, minimizing the errors of the arbitrary model by the Gauss-Newton method, and specifying the shape parameters and canonical parameters of the parametric model pose taking into account the results of the canonical three-dimensional surface model.

US2008180448A1 (Shape completion, animation and marker-less motion capture of people, animals or characters), US2013226528A1 (Perceptually guided capture and stylization of 3D human figures), and US2013342527A1 (Avatar construction using depth camera) describe the application of an articulated body skeleton model, the construction of a canonical model, as well as partially describing the determination of shape parameters and canonical parameters of the parametric model pose by minimizing the loss function taking into account visible points, and building an arbitrary three-dimensional surface model by changing the transformation parameters of the canonical model based on the 3D image (in arbitrary shape and arbitrary pose) according to the morphing field graph. These documents do not describe the application of segmentation by body parts on the 3D image, the construction of the morphing field graph by determining the vertices of the parametric model, minimizing the errors of the arbitrary model by the Gauss-Newton method, and refining the shape parameters and canonical parameters of the parametric model pose taking into account the results of the canonical three-dimensional surface model.

RU2615911C1 (Methods and systems for building a realistic 3D user avatar for virtual dressing room), US2010306082A1 (Garment fit portrayal system and method), US2014035901A1 (Animating objects using the human body), US2014375635A1 (Methods and systems for generating a three dimensional representation of a subject), US2015213646A1 (Method and system for constructing personalized avatars using a parameterized deformable mesh), WO2014037939A1 (System and method for deriving accurate body size measures from a sequence of 2D images), WO2016073841A1 (Scan data retrieval with depth sensor data) describe the construction of a canonical model, as well as partially describing the determination of shape parameters and canonical parameters of the parametric model pose by minimizing the loss function taking into account visible points, and building an arbitrary three-dimensional surface model by changing the transformation parameters of the canonical model based on the 3D image (in arbitrary shape and arbitrary pose) according to the morphing field graph. These documents do not describe the application of a swivel body skeleton model, the application of segmentation by body parts on a 3D image, the construction of a morphing field graph by determining the vertices of the parametric model, minimizing errors of an arbitrary model by the Gauss-Newton method, and specifying the shape parameters and canonical parameters of the parametric model pose taking into account the results of the canonical three-dimensional surface model.

US2019122424A1 (Generation of body models and measurements), WO2013174671A1 (A method and a system for generating a realistic 3D reconstruction model for an object or being) describe the application of segmentation by body parts in a 3D image, the application of a swivel body skeleton model, the construction of a canonical model, as well as partially describe the determination of shape parameters and canonical parameters of the pose of a parametric model by minimizing the loss function taking into account visible points. These documents do not describe the construction of the morphing field graph by determining the vertices of the parametric model, minimizing the errors of the arbitrary model by the Gauss-Newton method, construction of an arbitrary three-dimensional surface model by changing the transformation parameters of the canonical model based on the 3D image (in arbitrary shape and arbitrary pose) according to the morphing field graph, and refinement of the shape parameters and canonical parameters of the parametric model pose by taking into account the results of the canonical three-dimensional surface model.

Document [A1] describes a method of generation of a 3D model of a human body based on a set of images (depth maps) with the use of segmenting and articulation, by changing the parameters of shape and pose.

Document [A2] describes the SCAPE model of the human body built from one static image (depth maps) and a set of images using markers. The method includes segmentation, articulation, determination and modification of shape and pose parameters.

Document [A3] provides an overview of various approaches to the generation of a 3D model of the human body.

Document [A4] describes details of generation of a skeletal structure of 3D models for animation.

Document [A5] describes the method of generation of a generalized 3D model of the human body (FAUST) using optical markers.

Document [A6] describes the method of generation of a 3D model of the human body using the DeepCut method for segmentation and articulation and the SMPL statistical model for changing the parameters of shape and pose. Alignment of compositions pose according to DeepCut with SMPL model was carried out by minimization of target function Geman-McClure.

Document [A7] provides a comparative overview of 3D human body models: SCAPE, BlendSCAPE, Dyna, S-SCAPE, SMPL and RealtimeSCAPE. The vertex-based approach is shown to be more accurate than the triangle-based approach.

In document [A8], the issues of muscle rendering at changing the parameters of the shape and the pose of the 3D model of the human body are considered.

In document [A9,] the issues of generation of visible surfaces (skinning) of 3D models based on skeleton approach are considered.

In document [A10], questions of generation of visible surfaces (skinning) of 3D models with use of Dual Quaternions are considered.

Document [A11] describes the principle of operation of the DeepWrinkles neural network (Facebook AI Research) for 3D modeling of clothes on a person.

In document [A12], the issues of generation of visible surfaces (skinning) of 3D models based on skeleton approach are considered. Smoothing Laplacian regularization is discussed.

Document [A13] compares the skeleton subspace deformation (SSD) and pose space deformation (PSD) methods when morphing a pose.

Document [A14] describes a 3D human body model, the Skinned Multi-Person Linear Model (SMPL).

In document [A15], the issues of generation of 3D model surface of human body from the point of view of skeleton-muscular model are considered.

Document [A16] describes a statistical 3D model of the human body S-SCAPE with pose normalization by Wuhrer et al. (WSX) and Neophytou and Hilton (NH).

Document [A17] describes a local-predictive approach to obtaining anthropometric measurements by transforming a point cloud using a random regression forest.

Document [A18] describes the application of Generative Adversarial Networks (GANs) for the generation of surfaces of the 3D model of the human body.

In document [A19], approaches to implementation of parameters of the shape and the pose of 3D model of a human body are discussed.

In document [A20], questions of parametrization of the shape of 3D models of a human body are considered.

Document [A21] describes the approach (SobolevFusion) to the generation of a 3D model of the human body from a single RGB-D data stream with the application of a gradient flow in Sobolev space.

Document [A22] describes how to obtain a 3D model of a human body for a virtual fitting room from data from a single depth camera for domestic use. The method includes segmentation and articulation with subsequent extraction of the nearest variant in size from the database. It is claimed that the method is workable in real time.

Document [A23] describes the application of a refined skeleton approach (using characteristic examples) to the generation of the 3D model surface.

Document [A24] describes obtaining a 3D model of a human body by the Semantic Parametric Reshaping method (SPRING)—using 23 semantic dimensional parameters.

Document [A25] describes how to obtain a 3D model of a human body from a single depth camera image.

Document [A26] suggests a method for obtaining a 3D model of a human body from the data of a single depth camera (BodyFusion) based on skeleton-embedded surface fusion (SSF) and graph-node deformations. It is asserted that the method is resistant to noise and data omissions.

Document [A27] suggests a way to obtain a 3D model of the human body from data from a single depth camera (DoubleFusion) using the Double Node Graph and Joint motion tracking.

Document [A28] describes a method of reconstructing the surface of a 3D model of a human body based on images in clothing taken from a depth camera. The method is based on minimizing the target function specified by the open parts of the body surface (without clothes).

Document [A29] describes a method of generation of a 3D model of the human body using segmenting and articulation.

Document [A30] describes how to build a 3D model of a human body using a single 3D camera and several inertial sensors attached to the human body.

In these non-patent documents, the general approaches, algorithms and mathematical details of various ways of implementation of 3D models of a human body are discussed. No technical solution solving the problem of the present invention by the same means has been found in the prior art.

Ways of comparing data on the user's body with data on the garment are also described in many patent and non-patent documents.

Documents US2006287877A1 (Matching the fit of individual garments to individual consumers), US2009276291A1 (System and method for networking shops online and offline), U.S. Pat. No. 6,546,309B1 (Virtual fitting room) describe, at least in part, the availability of input data (1) on the user's body and data (2) on garments, conversion and/or filtering the input data, comparison of data (1) and (2) by analyzing the target function, imposing restrictions (boundary conditions) on the target function, the results of the analysis—determination of the global optimum of the target function, output data—recommendations to the user on the selection of clothing based on the results of the analysis of the target function. These documents do not describe comparison of data (1) and (2) using a neural network and the presence of at least two layers in the neural network, with the first layer implementing the network's internal representation of human anthropometric dimensional parameters, and the second layer implementing the network's internal representation of the dimensional parameters of a garment (or brand).

Documents US2014040041A1 (Garment fitting system and method), US2017039622A1 (Garment size recommendation and fit analysis system and method), US2002188372A1 (Method and system for computer aided garment selection), WO0217160A2 (Method and system for generating a recommendation for a selection of a piece of clothing), US2003028436A1 (Method and system for selling clothes), US2004093105A1 (Method for custom fitting of apparel), US2014180864A1 (Personalized clothing recommendation system and method), US20090210320A1 (System and method for comparative sizing between a well-fitting source item and a target item), US2004083142A1 (System and method for fitting clothing), US2002138170A1 (System, method and article of manufacture for automated fit and size predictions), US2009193675A1 (Systems and methods for collecting body measurements), describe the presence of input data (1) on the user's body and data (2) on garments, comparison of data (1) and (2) by analyzing the target function, imposition of restrictions (boundary conditions) on the target function, the results of the analysis—determination of the global optimum of the target function, the output data—recommendations to the user on the selection of garments based on the results of the analysis of the target function. These documents do not describe the transformation and/or filtering of input data, data comparison (1) and (2) using a neural network and the presence of at least two layers in the neural network. The first layer implements the network's internal representation of the human anthropometric dimensional parameters, while the second layer implements the network's internal representation of the dimensional parameters of a garment (or brand).

Documents US2005049816A1 (System and method for assisting shoe selection), and US2011099122A1 (System and method for providing customers with personalized information about products), describe at least partially the availability of input data (1) about the user's body and data (2) about garments, the conversion and/or filtering of input data, the comparison of data (1) and (2) by analyzing the target function, the results of the analysis—the determination of the global optimum of the target function, the output data—recommendations to the user for the selection of garments based on the results of the analysis of the target function. These documents do not describe the imposition of restrictions (boundary conditions) on the target function, data comparison (1) and (2) using a neural network and the presence of at least two layers in the neural network, with the first layer implements the network's internal view of the anthropometric dimensional parameters of a person, and the second layer implements the network's internal view of the dimensional parameters of the garment (or brand).

Documents WO2010014599A1 (A distributed matching system for comparing garment information and buyer information), US2011184831A1 (An item recommendation system), US2012259581A1 (Apparatus, system and method for providing garment fitting identification), US20110295711A1 (Apparel fit advisory service), US20060059054A1 (Apparel size service), US2002178061A1 (Body profile coding method and apparatus useful for assisting users to select wearing apparel), US2007198120A1 (Computer system for rule-based clothing matching and filtering considering fit rules and fashion rules), US2016155186A1 (Digital wardrobe using simulated forces on garment models), US2007022013A1 (Fitting systems), US2009234489A1 (Fitting systems), U.S. Pat. No. 6,741,728B1 (Footwear sizing database method), WO2009090391A1 (Garment filter generation system and method), US2011231278A1 (Garment sizing system), WO2008033138A1 (Matching the fit of garments to consumers), US2008235114A1 (Matching the fit of individual garments to consumers), US2009287452A1 (Method and apparatus for accurate footwear and garment fitting), EP2752804A1 (Method and system for optimizing size consultation upon the ordering of trousers), US2010293076A1 (Method and system for providing fitting and sizing recommendations), US2015161707A1 (Method and system for recommending a size of a wearable item), U.S. Pat. No. 6,701,207B1 (Method for integrating information relating to apparel fit, apparel sizing and body shape variance), US2011055054A1 (Method for online selection of items and an online shopping system using the same), US2014379515A1 (Method for providing a custom-like fit in ready-to-wear apparel), US2003076318A1 (Method of virtual garment fitting, selection, and processing), US2006020482A1 (Methods and systems for selling apparel), US2019266654A1 (Methods and systems for virtual fitting rooms or hybrid stores), US2014279289A1 (Mobile application and method for virtual dressing room visualization), US20120084987A1 (Shaped fit sizing system), EP3171323A1 (System and method for identifying and dispensing one or more customized articles of clothing), U.S. Pat. No. 6,879,945B1 (System and method for sizing footwear over a computer network), US2005022708A1 (Systems and methods for improving apparel fit), US2019073335A1 (Using artificial intelligence to determine a size fit prediction), US2007005174A1 (Virtual apparel fitting) at least partially describe the availability of input data (1) on the user's body and data (2) on the items of clothing, comparison of data (1) and (2) by analyzing the target function, the results of the analysis—determining the global optimum of the target function, the output data—recommendations for the user to select items of clothing based on the results of the analysis of the target function. These documents do not describe the transformation and/or filtering of input data, imposition of restrictions (edge conditions) on the target function, data comparison (1) and (2) using a neural network and the presence of at least two layers in the neural network, with the first layer implementing the network's internal view of the human anthropometric dimensional parameters, and the second layer implementing the network's internal view of the dimensional parameters of the garment (or brand).

Document [C1] describes the application of a neural network to generate a realistic image of a garment object on a human digital avatar.

Document [C2] describes the application of a neural network to transfer an image of a garment object from one person's digital avatar to another person's digital avatar.

Document [C3] describes the application of a nonlinear regression model based on a neural network to generate a realistic image of a garment object on a human digital avatar and the application of a recursive neural network to calculate the folds of garments in dynamics.

Document [C4] describes the application of a wavelet neural network for remote clothing sizing.

Document [C5] provides an overview of approaches to implementing virtual dressing rooms. Reference is made to the use of neural networks.

Document [C6] provides an overview of approaches to the implementation of clothing recommendation systems. The use of neural networks is mentioned.

Document [C7] describes the application of a convolution neural network to generate a realistic image of a garment object on a human digital avatar in various poses.

Document [C8] describes the application of spline transformation based on a convolution neural network to generate a realistic image of a garment object on a human digital avatar in various poses.

Document [C9] describes the application of a multilayer neural network to the virtual fitting room implementation.

Document [C10] describes the application of a competitive neural network and a self-organizing neural network to simulate jackets to implement a virtual fitting room.

Document [C11] describes the application of a convolution neural network to generate a realistic image of a garment object on a human digital avatar.

Document [C12] describes the application of a neural network to generate a realistic image of a garment object on a human digital avatar.

Document [C13] describes the application of a deep neural network for the implementation of a cosmetic recommendation system.

Document [C14] describes the application of a neural network to generate a realistic image of a garment object on a human digital avatar.

Document [C15] mentions the use of a neural network to create a realistic image of a garment object on a human digital avatar.

Document [C16] provides an overview of approaches to implementing virtual dressing rooms. The use of neural networks is mentioned.

Document [C17] provides an overview of approaches to implementing virtual dressing rooms.

These non-patent documents describe approaches to the use of neural networks, including multilayered ones, to solve problems associated with the remote clothing selection.

Thus, the technical solutions of available prior art solve with a certain degree of success only fragmented problems that are in some sense related to the remote clothing selection. No technical solution that comprehensively solves the problem of the present invention is found in the prior art.

SUMMARY OF THE INVENTION

The object of this invention is to determine anthropometric parameters of a user, to automatically assess the matching between a garment and the shape and the parameters of a user's body in real time, to develop and provide the user with recommendations on the selection of a particular garment and, optionally, to visualize a garment on a digital avatar of that user in a virtual fitting room, including when changing his/her pose.

The technical result of this invention is an increase in the accuracy of user's body model, an increase in the efficiency of user's remote clothing selection (faster and more accurate selection), an improvement in the user experience of remote purchase, an increase in the user's satisfaction with the purchase of clothing (customer satisfaction) and, ultimately, an increase in online sales of clothing and a decrease in the proportion of clothing returned after purchase due to unsatisfactory matching of the shape and measurements of user's body.

The problem of the invention was solved using the method of remote clothing selection, which includes:

determination of anthropometric dimensional parameters of a person;

determination of dimensional parameters of one or more garments;

comparison of a person's anthropometric dimensional parameters with dimensional parameters of one or more garments to determine the degree to which these garments match a person;

optional visualization of a garment; and performing the selection of clothing.

Determination of person's anthropometric dimensional parameters may include the generation of a parametric model of a person. A parametric model of a person may be built based on a geometrical model of a person, based on the physical measuring of person's body, based on questionnaire data, based on two-dimensional image data (e.g., photographic image), based on the physical measurement of a reference garment, based on optical measurement data of a reference garment. A person's parametric model can be generated using a neural network and machine learning algorithm.

The geometrical model of a person can be built based on three-dimensional scanning of a human body, including optical scanning. Optical scanning may include the use of a depth camera, laser rangefinder and other similar means to obtain data of a human body surface. A human geometric model can be generated using a neural network and a machine learning algorithm.

Anthropometric dimensional parameters of a person can be determined using linear algebra and/or a machine learning algorithm. At the same time, it is possible to implement an invention where first the intermediate anthropometric dimensional parameters of a person are determined using linear algebra, and then the final anthropometric dimensional parameters of a person are determined using a machine learning algorithm. Regression model can be used in the machine learning algorithm.

Dimensional parameters of a garment can be determined based on a production geometric model, which can be a physical mannequin, three-dimensional digital model, a set of patterns, etc. Dimensional parameters of a garment may also be determined based on a production parametric model, which may represent at least part of the technical documentation of the garment, e.g., technical pack (tech pack) and/or specification sheet (spec sheet) and/or bill of materials and/or grading rules. A production parametric model may represent at least part of the size chart of a brand.

Dimensional parameters of a garment may be determined based on the physical measurement of a garment or based on the optical measurement of a garment, in particular using a computer vision algorithm.

A comparison of the dimensional parameters of a person and a garment may include an analysis of the target function. In another case, comparing the dimensional parameters of a person and a garment may involve the use of a neural network and machine learning algorithm. A neural network may contain at least two layers, one of which acts as an encoder and the other as a decoder. The layer that acts as an encoder can be trained separately from the layers that act as a decoder. In another case, the layer that acts as an encoder can be trained together with the layers that act as decoders. For example, the initial training of an encoder can be done separately from the decoder, and further training can be done together with the decoder.

Dimensional parameters of a person and/or garment may include at least one of the following: height, distance, girth and distance along a curved surface. For a comparison of the dimensional parameters of a person and a garment, these dimensional parameters may be adapted to a comparable type or data format.

The garment can be visualized on a virtual mannequin or on the user's avatar. The avatar (digital twin) can be a 3D model of a human body and can provide a realistic image of a human head. The avatar can incorporate the individual characteristics of the user's appearance—skin color, eye shape and color of the hair, age manifestations, etc. Visualization can include the possibility of setting and/or changing the pose of the avatar (poses, gestures, etc.), angle, scale (zooming in/zooming out), situational background, lighting conditions, etc.

The selection of a garment can be made from a list of garments ranked by the degree to which these garments match the user. The matching of a garment may include physical fitness to body shape and stylistic matching. Selection of a garment may include a refusal to make a selection of a garment, i.e., selection of a garment is optional and may not be available in some embodiments of the invention (e.g., if the user was unable to select the required garment).

The method to determine a person's anthropometric dimensional parameters may include:

building a geometric model of a person's body;

building a parametric model of a person's body based on a geometric model;

determination of anthropometric dimensional parameters of a person based on a parametric model of a person's body.

Determination of anthropometric dimensional parameters of a person can be supplemented by determination of a type of a person's shape.

Building a geometric model of a human body may involve obtaining a depth map and transforming the depth map into a point cloud. Converting a depth map into a point cloud may involve applying a bilateral filter. Construction of geometrical model of a human body can be carried out for a canonical human pose.

The construction of a parametric model may include:

calculation of initial approximation of pose parameters;

refinement of pose parameters;

refinement of pose and shape parameters;

construction of a morphing field graph that allows the transformation of the geometric model from a canonical pose and/or shape into an arbitrary pose and/or shape.

At calculation of initial approximation of pose parameters the information on position of characteristic points of a skeleton of the person in parametric model can be used. Characteristic points can correspond to the centers of the human joints and/or those parts of the skeleton that are considered when segmenting a person's body from the point of view of pose changing.

Refinement of the pose parameters may include minimizing the pose parameter error function. The pose parameter error function can include the sum of squares of angles between pairs of segments connecting characteristic points of the human skeleton in a geometric model and in a parametric model, and/or the sum of squares of distances between pairs of points from many characteristic points in a geometric model and in a parametric model.

At first the pose parameter error function that is equal to the sum of squares of angles between pairs of segments connecting characteristic points of a human skeleton in geometrical model and in parametric model can be used, and then the pose parameter error function that is equal to the sum of squares of distances between pairs of points from the set of characteristic points in geometrical model and in parametric model can be used.

Refinement of pose and shape parameters may include minimizing the error function by pose and shape parameters. The error function on pose and shape parameters may be the following:

$$E_{init}(P, \theta, \beta) = \sum_{x \in P} \min_{v \in U} \rho(\|v - x\|) + \sum_{v \in U} \min_{x \in P} \rho(\|v - x\|),$$

where P is the set of visible points x of geometrical model, θ are pose parameters, β are shape parameters, U is the set of visible vertices v of parametric model with pose and shape parameters (θ, β), ρ is Huber function with parameter δ equal to 1.

The morphing field graph can have vertices containing coordinates in three-dimensional space, Euclidian transformation parameters, and a Euclidian transformation weighting factor. The graph may also have edges between the vertices, providing the connectivity of the morphing field, i.e., the smoothness of the geometric model of the required shape in an arbitrary pose, which can be built based on the parametric model. The smoothness of such transformation can be used in generation of user's avatar for high-quality visualization of a garment.

The generation of the vertices of the graph may include:
  selecting the value of the neighborhood radius δ;
  division of space into voxels with the side 2δ;
  determination of the coordinates of a vertex as medoid coordinates for each voxel;
  assigning a weighting factor equal to 2δ for each vertex.

Edges between the vertices of the graph can be formed when these vertices are among the closest, for example eight adjacent vertices on the shortest path in the graph.

The Euclidian transformation of an arbitrary point x may include:
  identifying graph vertexes $v_c$ that are the nearest to point x;
  calculation of the weighted sum of double quaternions of these vertices, with the weight w of each double quaternion being calculated by the following formula:

$$w = \exp\left(-\frac{\|x - v_c\|_2^2}{2v_w^2}\right)$$

or taken as 0, if $\|x-v_c\|_2 > 3v_w$, where $v_w$ is the vertex weighting factor;
  normalization of the summation result;
  building orthogonal transformation matrix R and transfer vector t, with the result of point x transformation being Rx+t.

A parametric model of the human body can be constructed using a neural network and machine learning algorithm, which may include using the human skeleton characteristic point error function in two-dimensional space, the human skeleton characteristic point error function in three-dimensional space, the SMPL model parameter error function, and the depth map error function. A regression model can be used in the machine learning algorithm.

Determining the dimensional parameters of a garment may include obtaining dimensional parameters of a garment from a production model. A production model may be a parametric model, and obtaining dimensional parameters of a garment may include conversion of production model parameters into dimensional parameters of a garment. Production model can be a geometrical model, and obtaining dimensional parameters of a garment can include transformation of geometrical production model into a parametric production model and subsequent transformation of production model parameters into dimensional parameters of a garment.

The production geometrical model can be a physical mannequin, a three-dimensional digital model or a set of patterns. A production parametric model may represent at least part of the process documentation for a garment and/or at least part of the brand size chart.

Determining the degree of matching between person's body and a garment may involve comparing person's and garment dimensional parameters using a target function that takes into account the weight of each dimensional parameter on the degree of matching between person's body and a garment.

A target function can be the following, and can be minimized $$\mathcal{F} = \sum_{i=1}^{M} |DP_{cust} - DP_{prod}| a_i,$$

where M is the number of dimensional parameters, $DP_{cust}$ is a dimensional parameter of a person, $DP_{prod}$ is a dimensional parameter of a garment, $a_i$ is a weighting factor.

Determining the degree of matching between a garment and a person's body may include determining the recommended size S of the garment:

$$S = \Sigma(w_i s_i)/\Sigma w_i + ds,$$

where $s_i$ is the size corresponding to i-th body measurement, $w_i$ is the weight factor of i-th body measurement, ds is at least one optional correction value. The correction value can be specified individually for each user or for a group of users, e.g., those who have shapes of the same type. The size calculated this way can be additionally adjusted to the size chart of the brand.

The result can be a list of garments in which garments can be placed according to the fit score, and garments with the same fit score can additionally be ranked according to the fit value error.

Dimensional parameters of a person may represent the dimensional parameters of a reference garment, i.e., such a garment that matches the user perfectly. In particular, parameters of a reference garment may be used directly when analyzing another garment, for example, the same brand belonging to the same size chart, or may be recalculated into dimensional parameters in another size chart, if the ratios of dimensional parameters in these size charts are known in advance.

Determining the degree to which a garment corresponds to a person may include consideration of stylistic recommendations, such as those related to the type of the user's shape.

The degree to which a garment corresponds to a person may include comparing the parameters of a person and a garment using a neural network and machine learning algorithm. The machine learning algorithm can be implemented as a classifier. In another case, a machine learning algorithm can be implemented as an algorithm of a gradient boosting of a solution tree.

Visualization of an garment may include:
- obtaining an image of a person's body in an arbitrary pose;
- obtaining a parametric model of a person's body;
- obtaining a parametric model of a garment;
- changing parameters of parametric model of a person's body for it to match an arbitrary pose; and
- generating an image of a garment on a person in an arbitrary pose.

A user image can be obtained from any device capable of generating such an image, for example, a smartphone, tablet, game console, laptop, desktop computer, TV with a camera, etc. The resulting user image in an arbitrary pose may contain a depth map and/or two-dimensional image. Parameters of a pose and/or a shape of the parametric model of a user's body can change so that shape and pose of user's avatar correspond to the obtained image. Such processing may be performed in real time.

It is assumed that the shape parameters of a user's body parametric model generally correspond to the shape of a user's body. Nevertheless, if in the course of algorithm processing a substantial difference between the shape of the user's avatar and the user's shape pictured on the obtained image is revealed, the parametric model can be corrected. The need for such correction may be caused by both a limited accuracy of the parametric model generation and actual changes in the user's body shape after the parametric model generation, for example, increase or decrease in body weight, targeted treatment of some muscle groups, change in posture, pregnancy, etc.

BRIEF DESCRIPTION OF THE ATTACHED DRAWINGS

A detailed description of the various practical embodiments of the invention is given below with references to the attached drawings.

Figure 4:
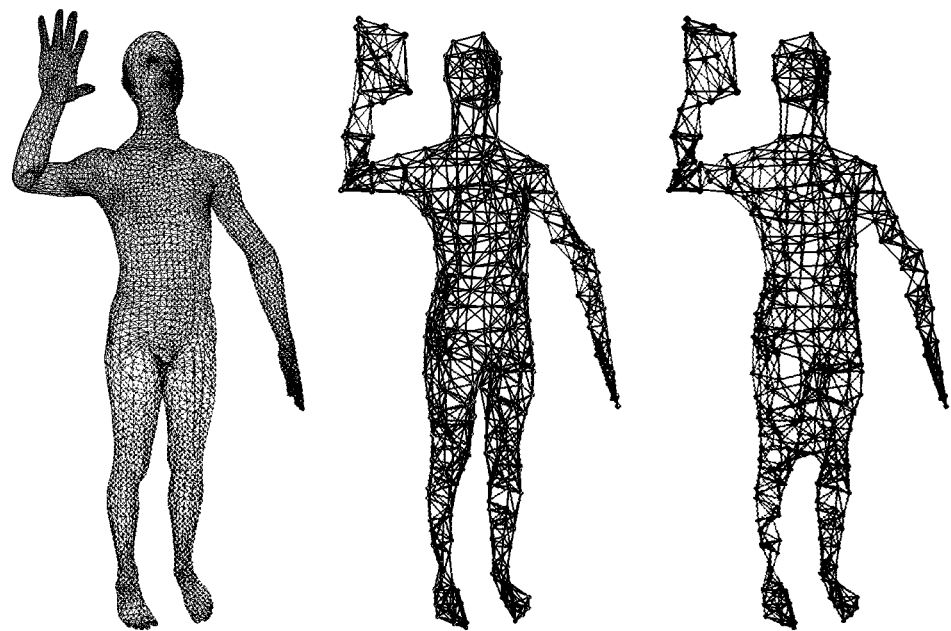

FIG. 4 illustrates the solution to the problem associated with the regularization of semantically unrelated vertices, in particular the right and left leg vertices, where from left to right are presented: the initial model, the graph, initialized by the proposed method, and the graph, initialized by the usual procedure to find the nearest neighbors. Particular attention should be paid to the stickiness of the legs in the regular procedure.

Figure 5:
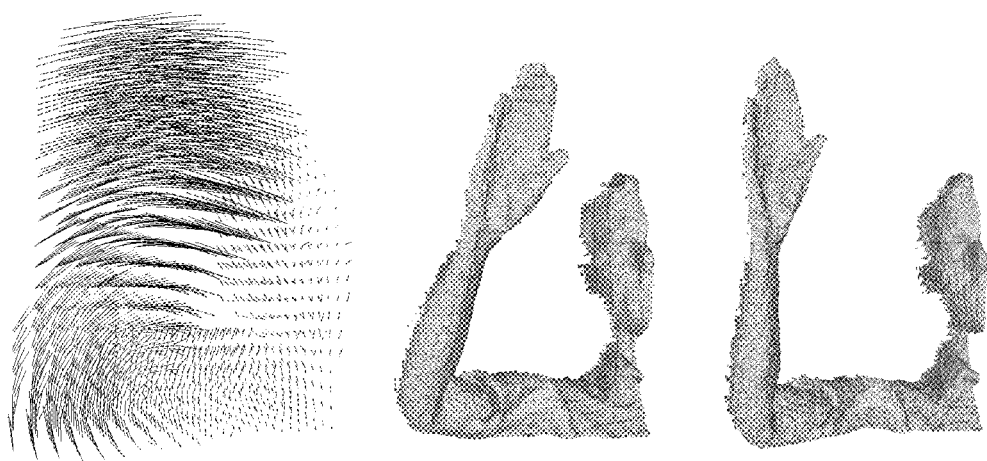

FIG. 5 on the left shows the visualization of the morphing field, in the center shows the surface obtained from the depth map of the next frame, and on the right shows the same surface after the conversion to the canonical pose.

Figure 6:
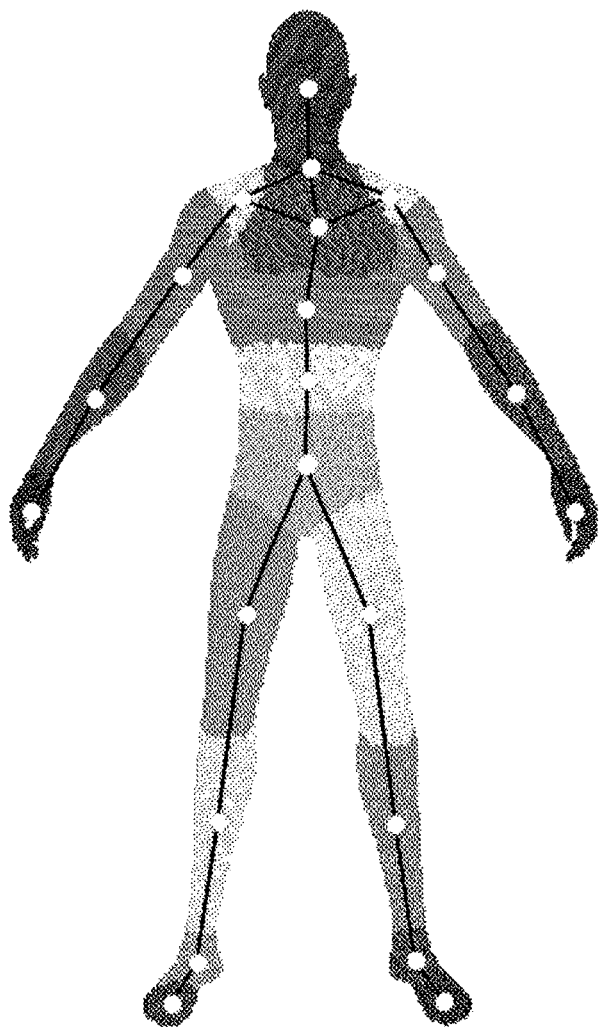

FIG. 6 illustrates an example of segmentation of the human body, where segments have different colors and neighboring segments are connected by lines.

Figure 7:
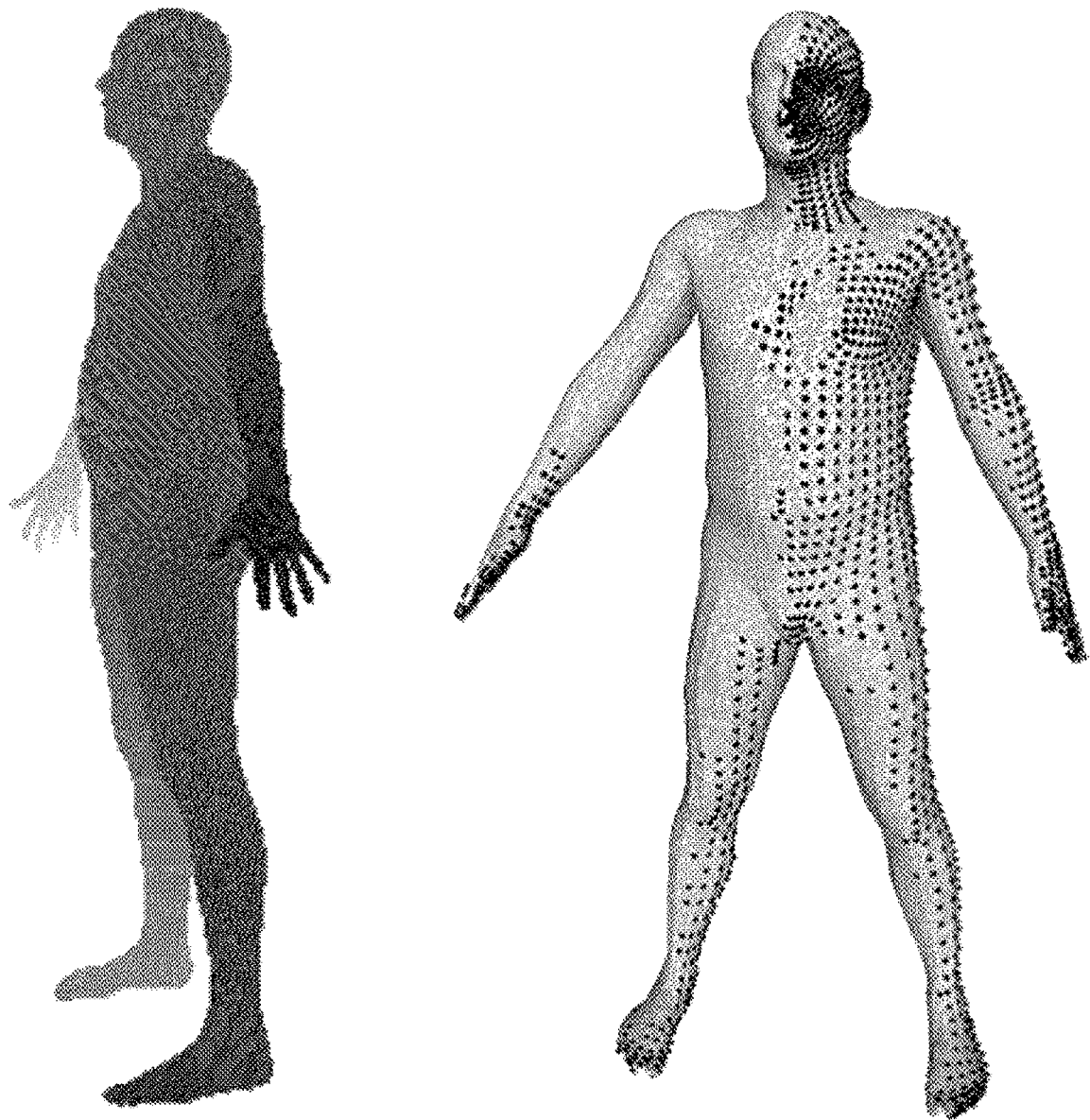

FIG. 7 on the left shows the result of rendering the surface into a depth map, and on the right shows the original surface with visible vertices marked by red dots.

Figure 8:
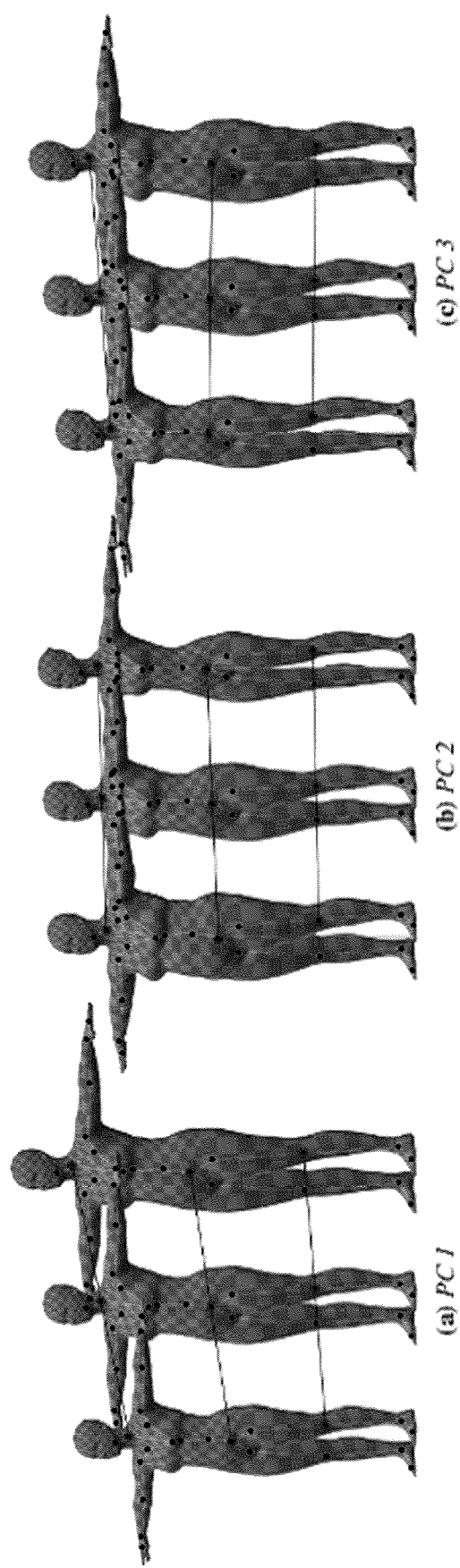

FIG. 8 shows an example of models which can be obtained by transforming the original SMPL model through the variation of three shape parameters with fixed pose parameters. Positions of skeletal joints are marked with red dots.

Figure 9:
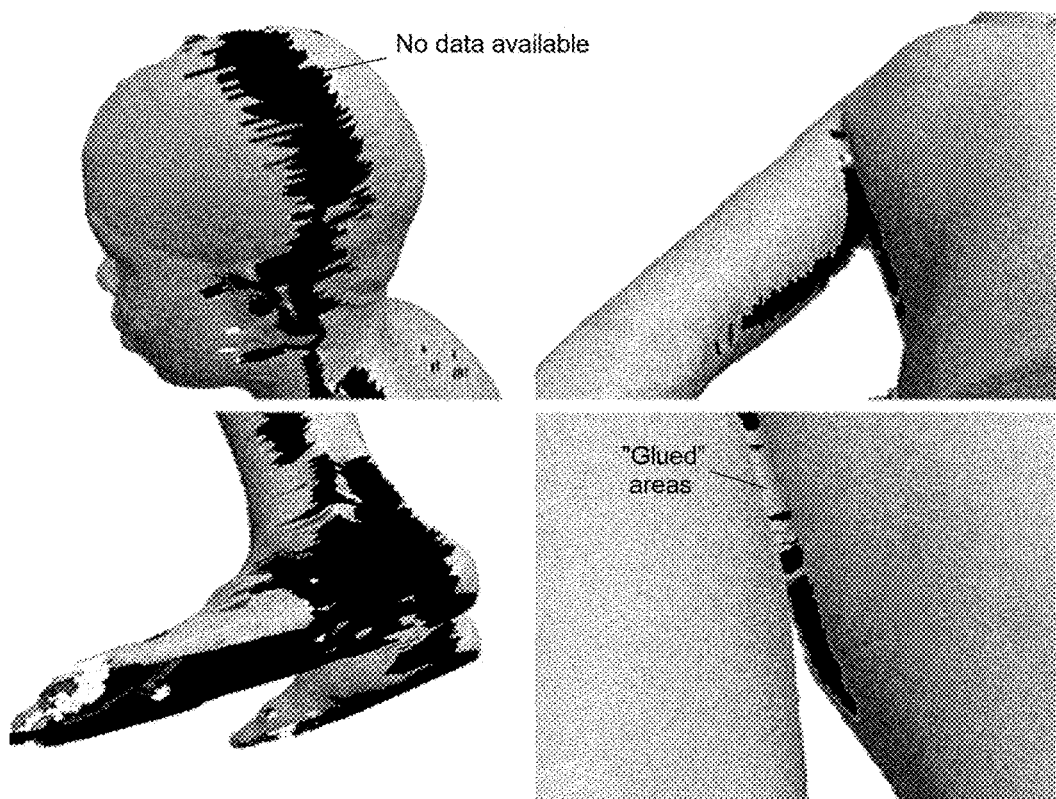

FIG. 9 shows the scanning defects on the example of three-dimensional images of the CAESAR data set—the lack of body surface in the area of feet, hands and the outer surface of arms, shoulders, head, as well as "glued" areas.

Figure 10:
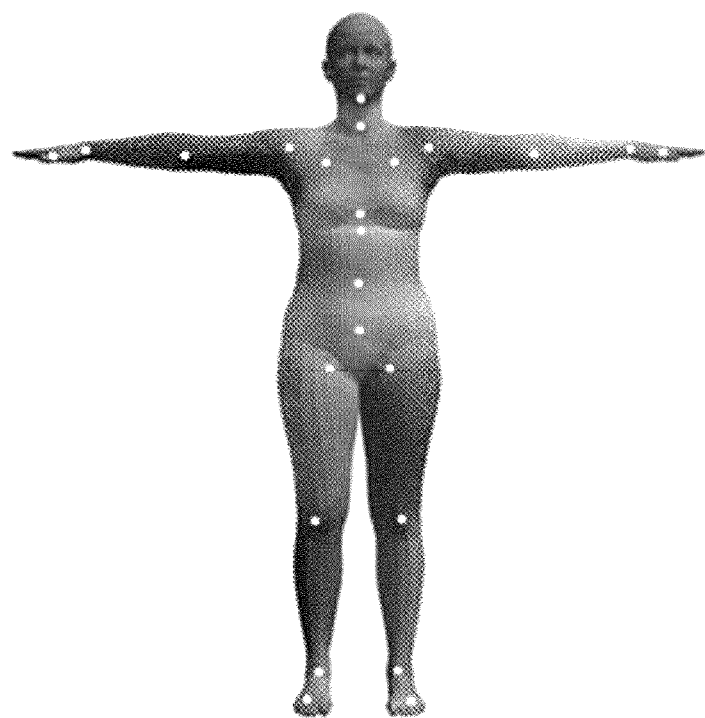

FIG. 10 shows the skeleton as a tree of skeletal points (joints), where each joint is characterized by its position in space and represents the point of articulation of "bones" of the skeleton, and the color shows the zones of influence of each joint on the surface of the body model.

Figure 11:

FIG. 11 illustrates the appearance of significant artifacts in the HumanShape model when changing the parameters of human body shape due to their impact on the position of skeletal points.

Figure 12:
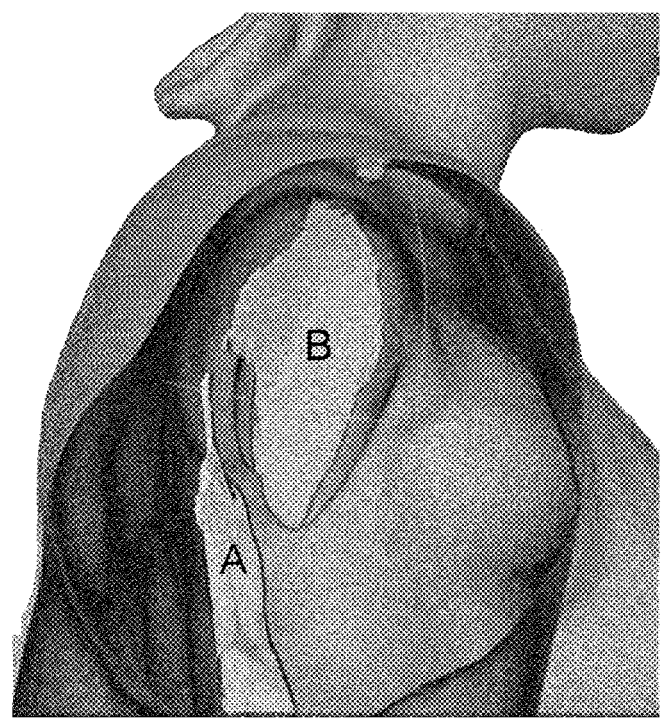

FIG. 12 illustrates the emergence of noise geometric structures located inside a model of the human body. One geometrical structure (highlighted with green color) gets in a separate component of connection of the graph and can be rather easily removed, and another geometrical structure which is a part of the left shoulder surface (highlighted with yellow color) is a part of a human body surface.

Figure 13:
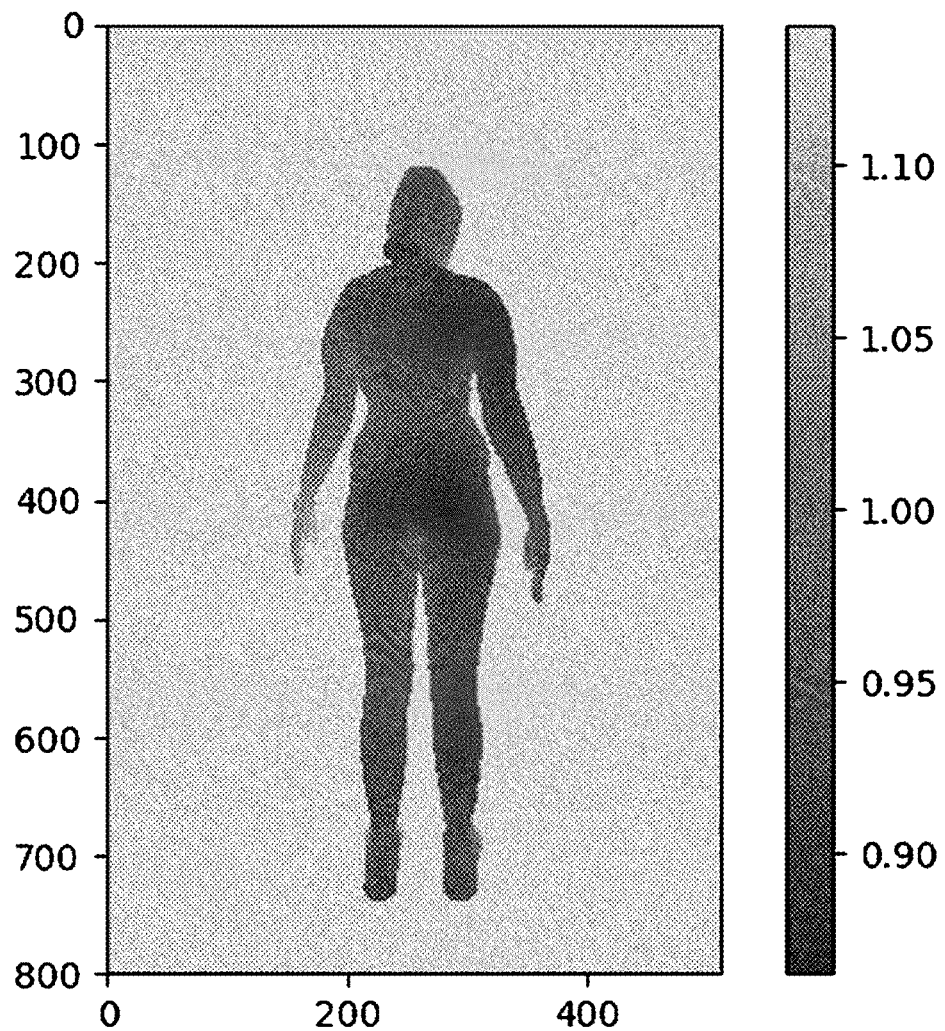

FIG. 13 shows an example of a depth map, where the color indicates the distance to the point, and the color scale is graded in meters. The depth map is the data on the distance from the camera projection plane to the 3D model surface.

Figure 14:
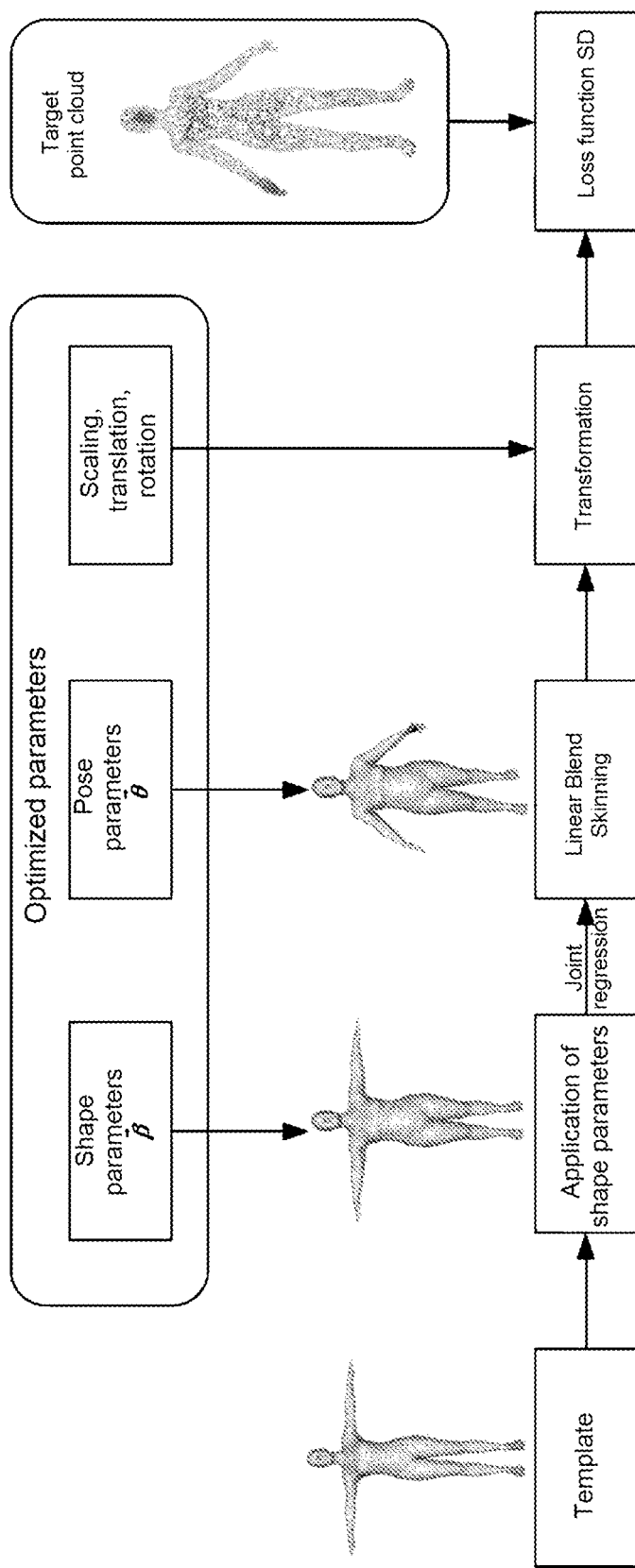

FIG. 14 illustrates the step-by-step application of shape and pose parameters with a preliminary recalculation of the coordinates of the skeletal joint, and then with the application of common transformation parameters such as scaling and translation. A loss function is then calculated based on the standard deviation from the nearest vertices.

Figure 15:
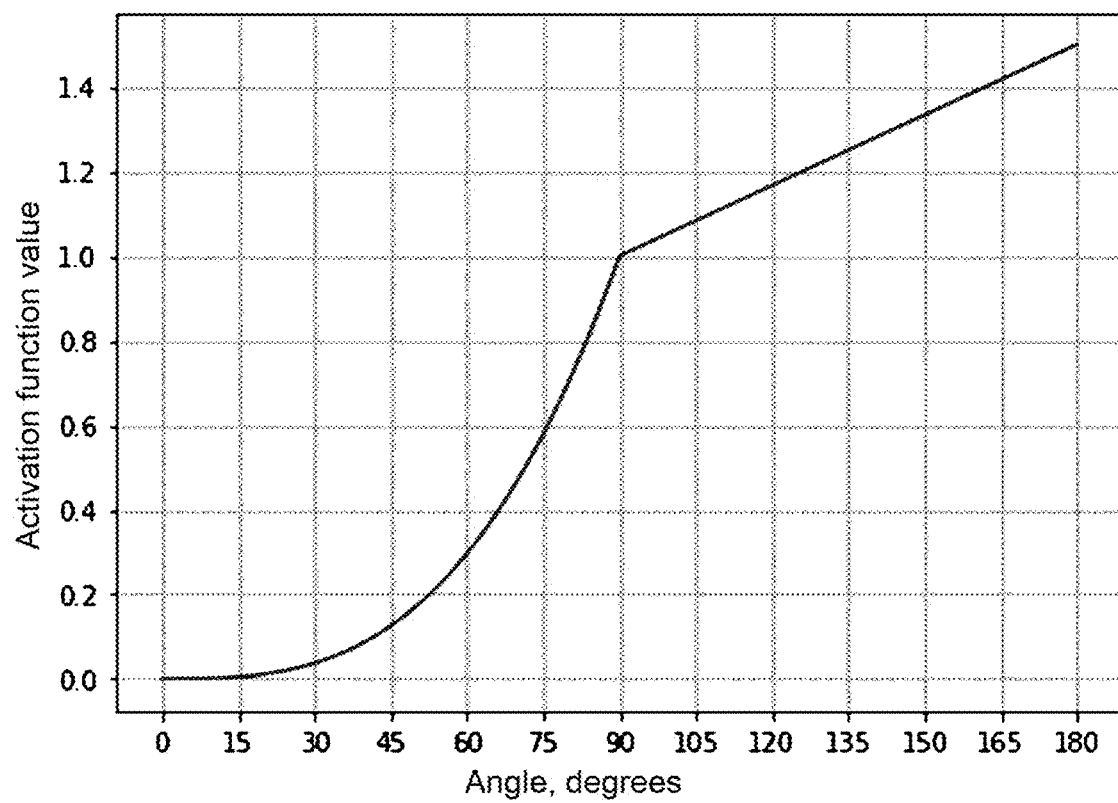

FIG. 15 shows the graph of the activation function used to calculate the component, which penalizes too large a value of angles between the normals of neighboring triangles.

Figure 16:
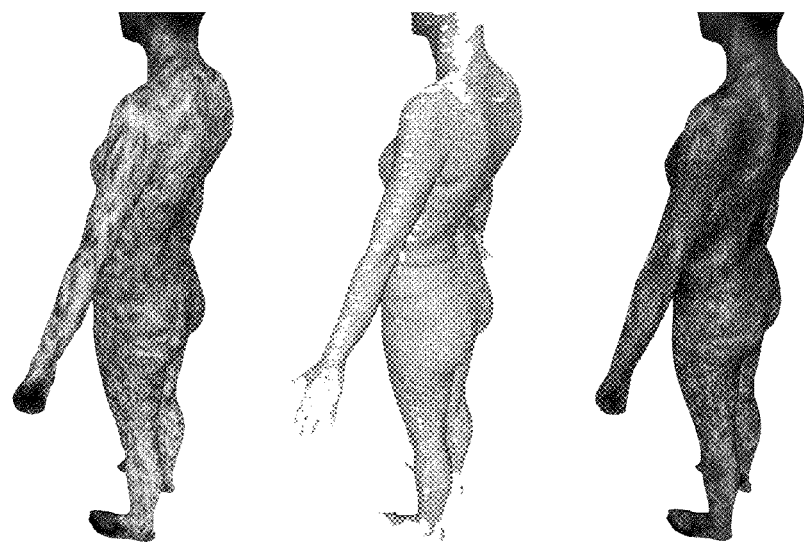
Figure 17:
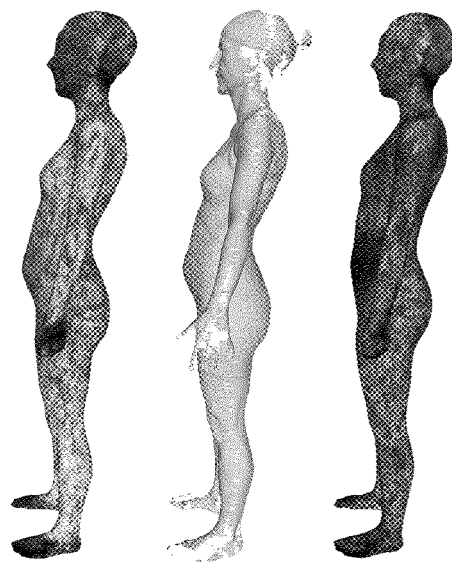
Figure 18:
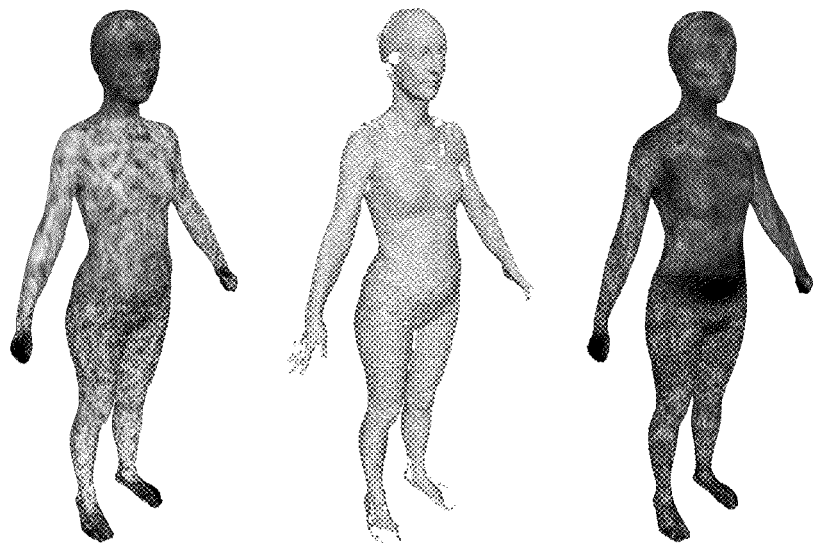

FIGS. 16-18 show the comparison of the results of the proposed modification of NRD algorithm and the original algorithm [B15] on the three-dimensional image from the CAESAR set. From left to right there are presented: the proposed improved version of NRD, the original three-dimensional image and the original version of NRD. Color indicates deviations from three-dimensional image: white color means zero deviation, red color means deviation of 15 mm and more.

Figure 19:
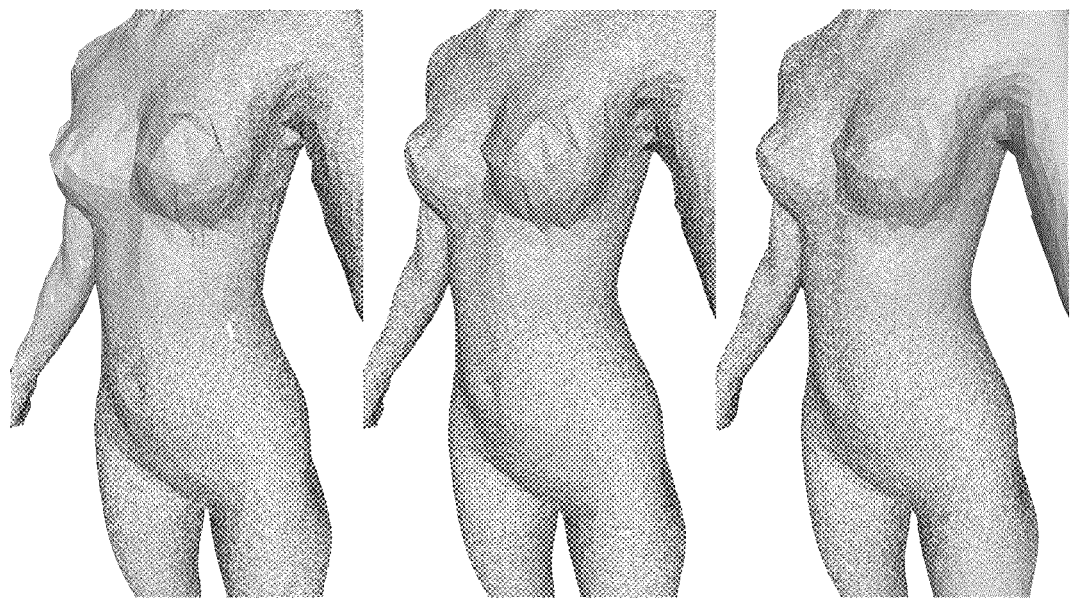

FIG. 19 shows the results of NRD algorithm's work. From left to right: with original loss function, 25 thousand vertices in 3D image; with original loss function, 250 thousand vertices in 3D image; and with modified loss function, 250 thousand vertices in 3D image.

Figure 20:
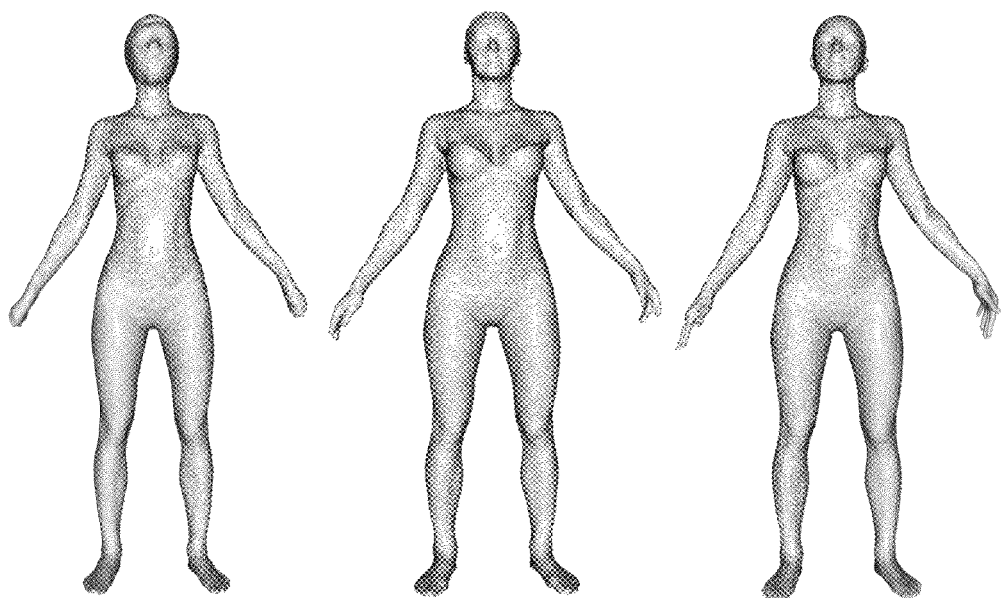

FIG. 20 shows the registration of the same three-dimensional image using different parametric models. From left to right: registration based on the HumanShape model (18659 vertices), initial 3D image (250000 vertices), registration based on the SMPL model (18890 vertices).

Figure 21A:
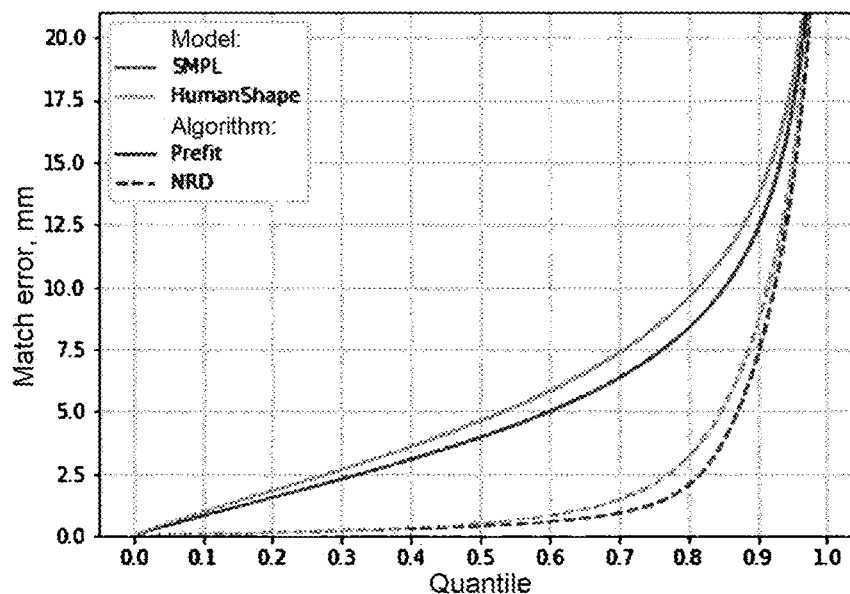

FIG. 21A shows errors in data set registration. The orange color indicates the results obtained from the HumanShape model, and blue—from the SMPL model. A solid line indicates the results of registration initialization, and a dotted line of registration improvement using the proposed modification of NRD algorithm.

Figure 21B:
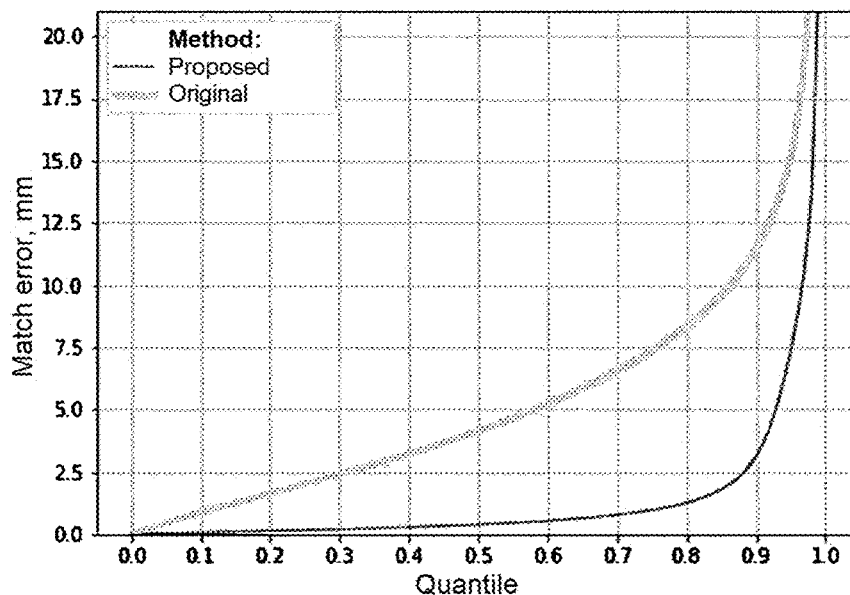

FIG. 21B shows errors when registering a CAESAR dataset. The blue color indicates the registration results obtained by the proposed method, and the orange color indicates the results obtained by the original method.

Figure 22:
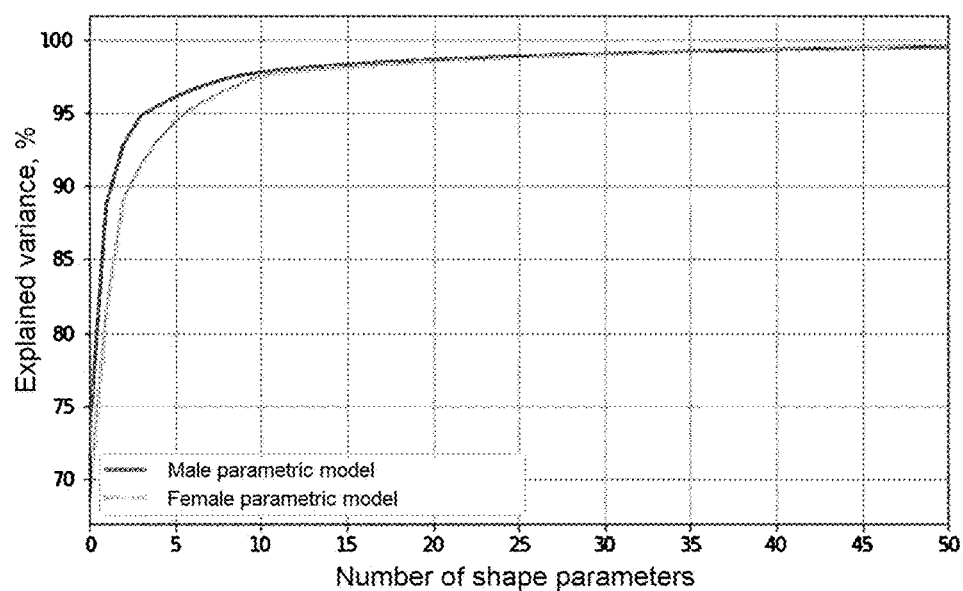

FIG. 22 shows the graph of dependence of the Explained Variance on the number of considered shape space parameters.

Figure 23:
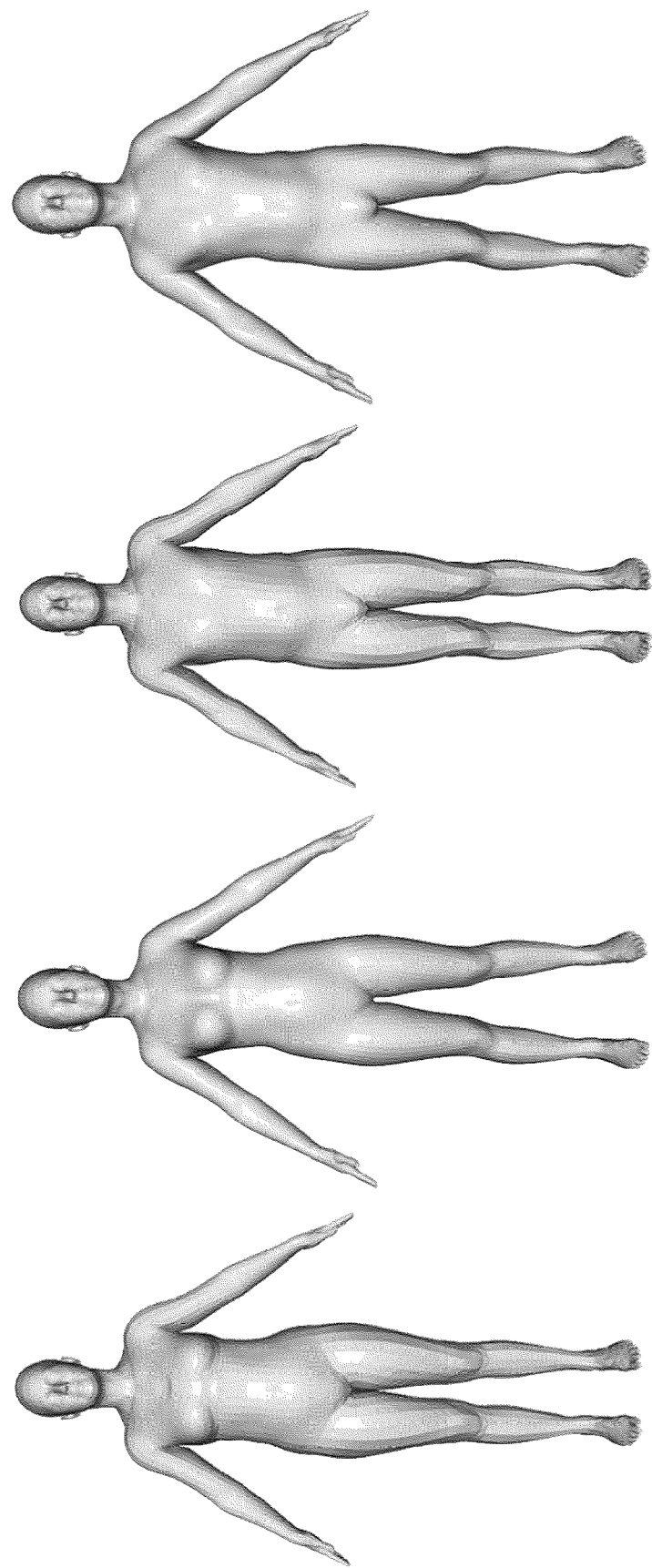

FIG. 23 shows a comparison of the initial pose and shape of the parametric SMPL model (left) and the resulting parametric model (right) for male and female bodies.

Figure 24:
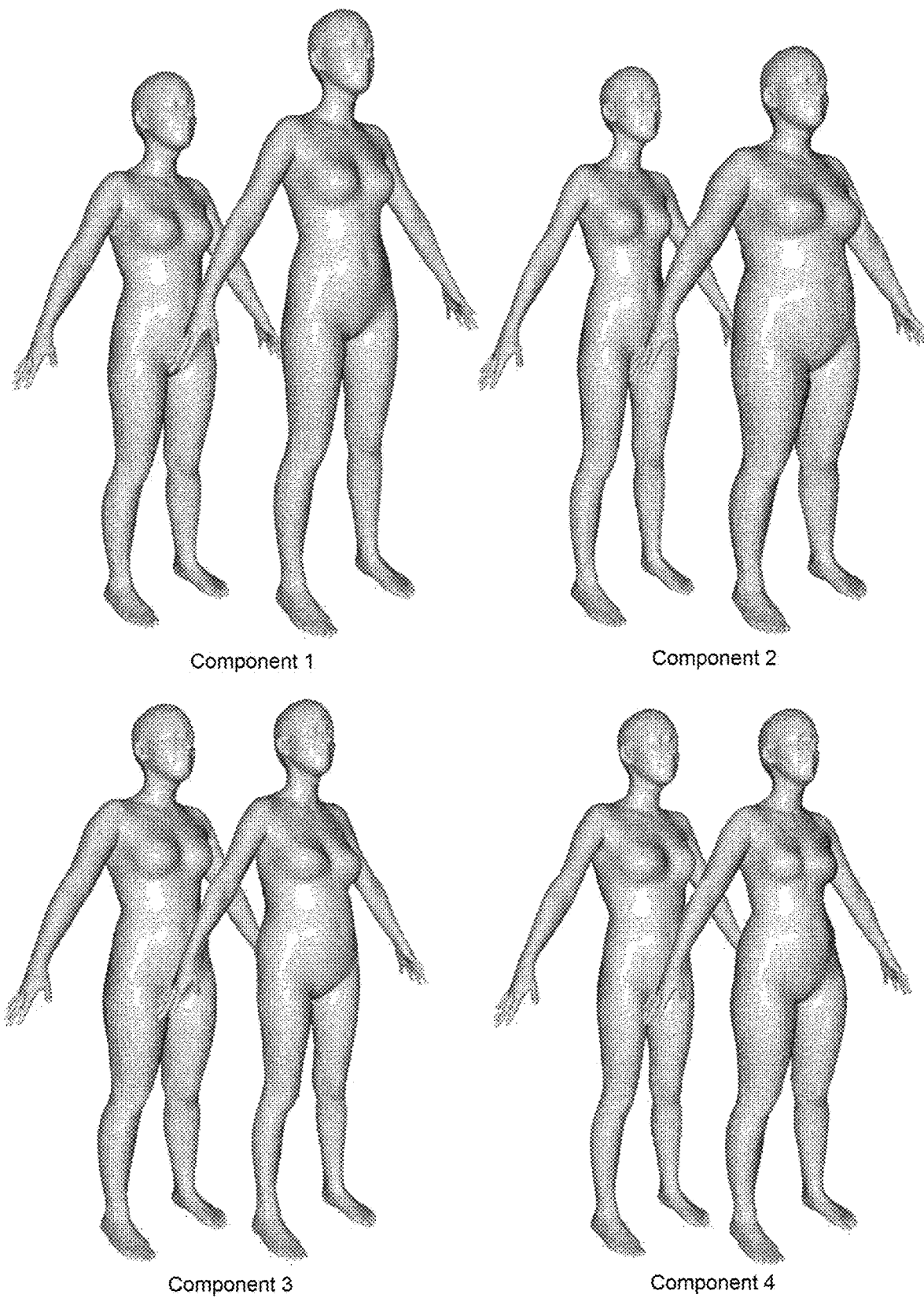

FIG. 24 shows the visualization of the result of separate changing the first four parameters of the shape with fixed other parameters of the obtained female parametric model.

Figure 25:
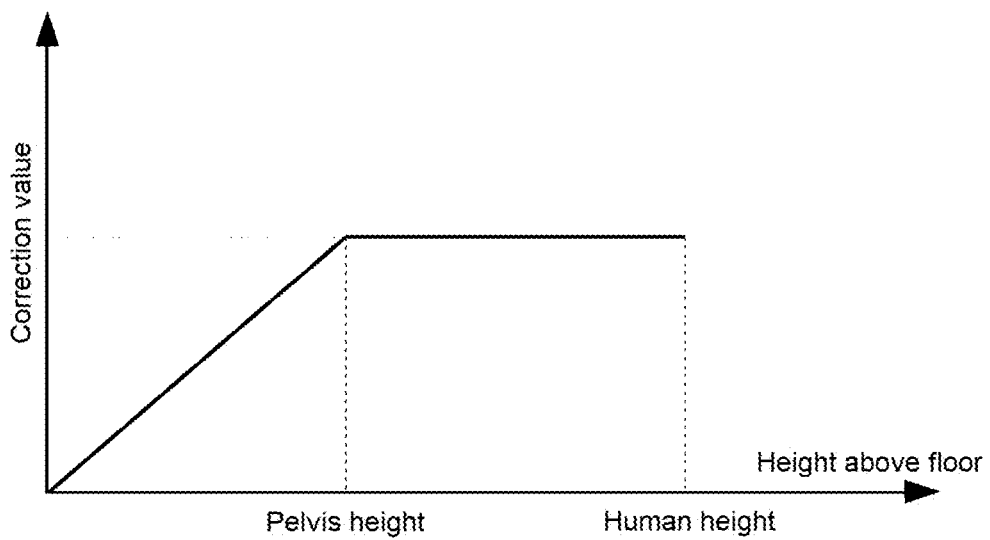

FIG. 25 shows a graph of the correction value in the A-pose for each leg as the difference between the actual length of the leg and its projection to the vertical axis.

Figure 26:
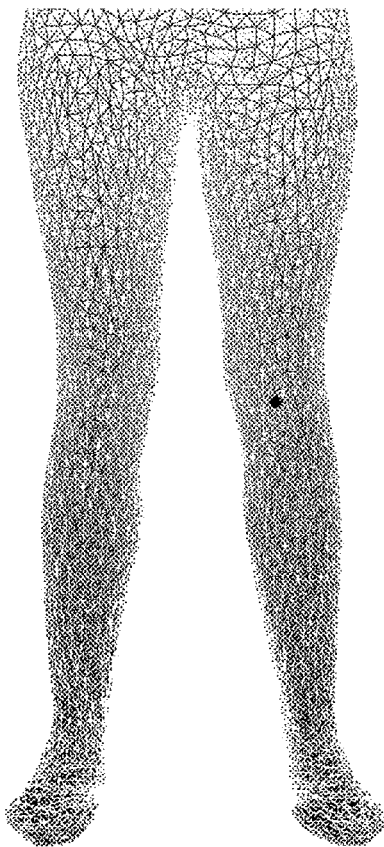

FIG. 26 shows the visualization of the anthropometric parameter as an anthropometric point (landmark).

Figure 27:
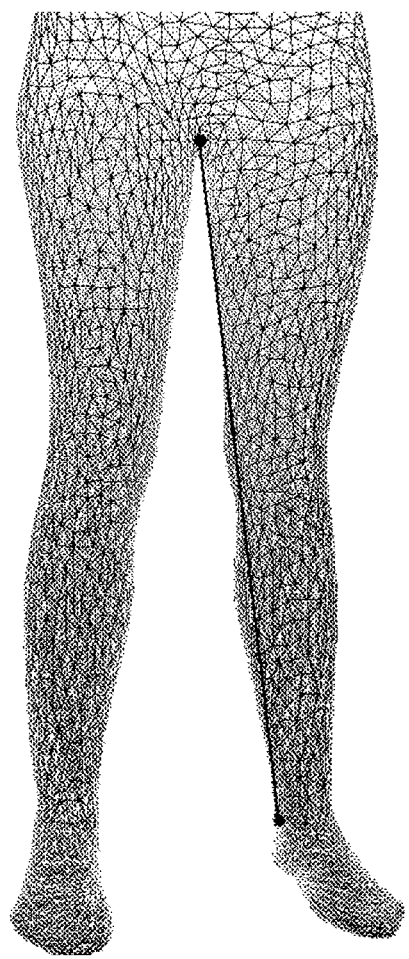

FIG. 27 shows a visualization of the anthropometric parameter as the distance between two anthropometric points (landmarks).

Figure 28:
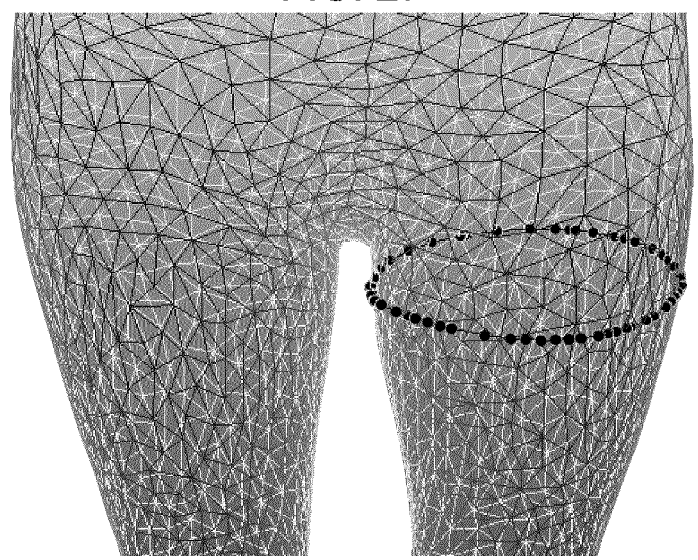

FIG. 28 shows the visualization of the anthropometric parameter represented by a girth.

Figure 29:
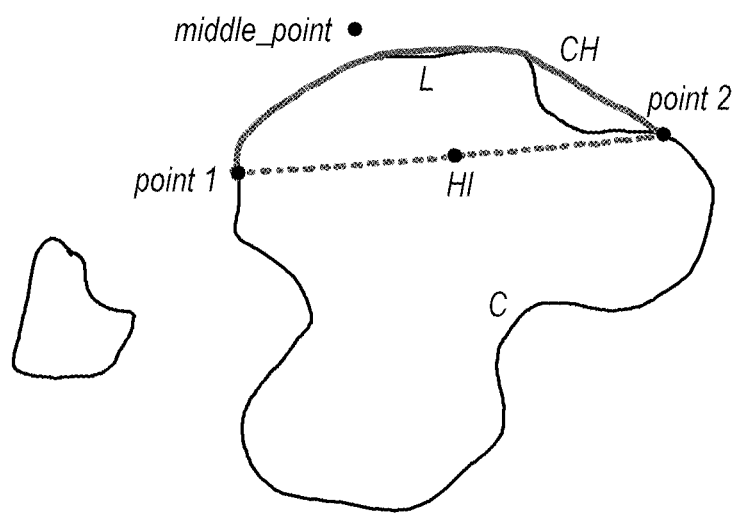

FIG. 29 illustrates a method of measuring the anthropometric parameter represented by a distance on a surface.

Figure 30:
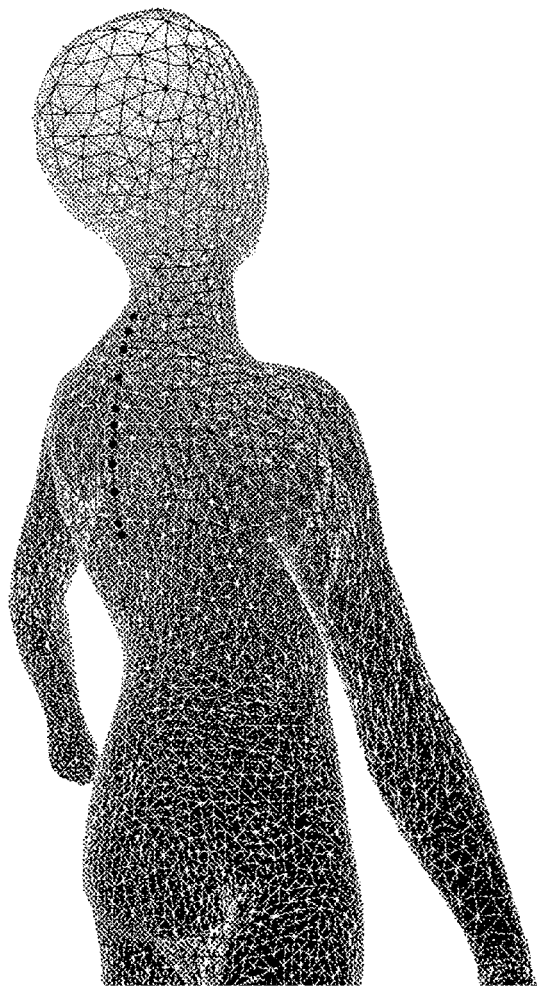

FIG. 30 shows visualization of the anthropometric parameter represented by a distance on a surface.

Figure 31:
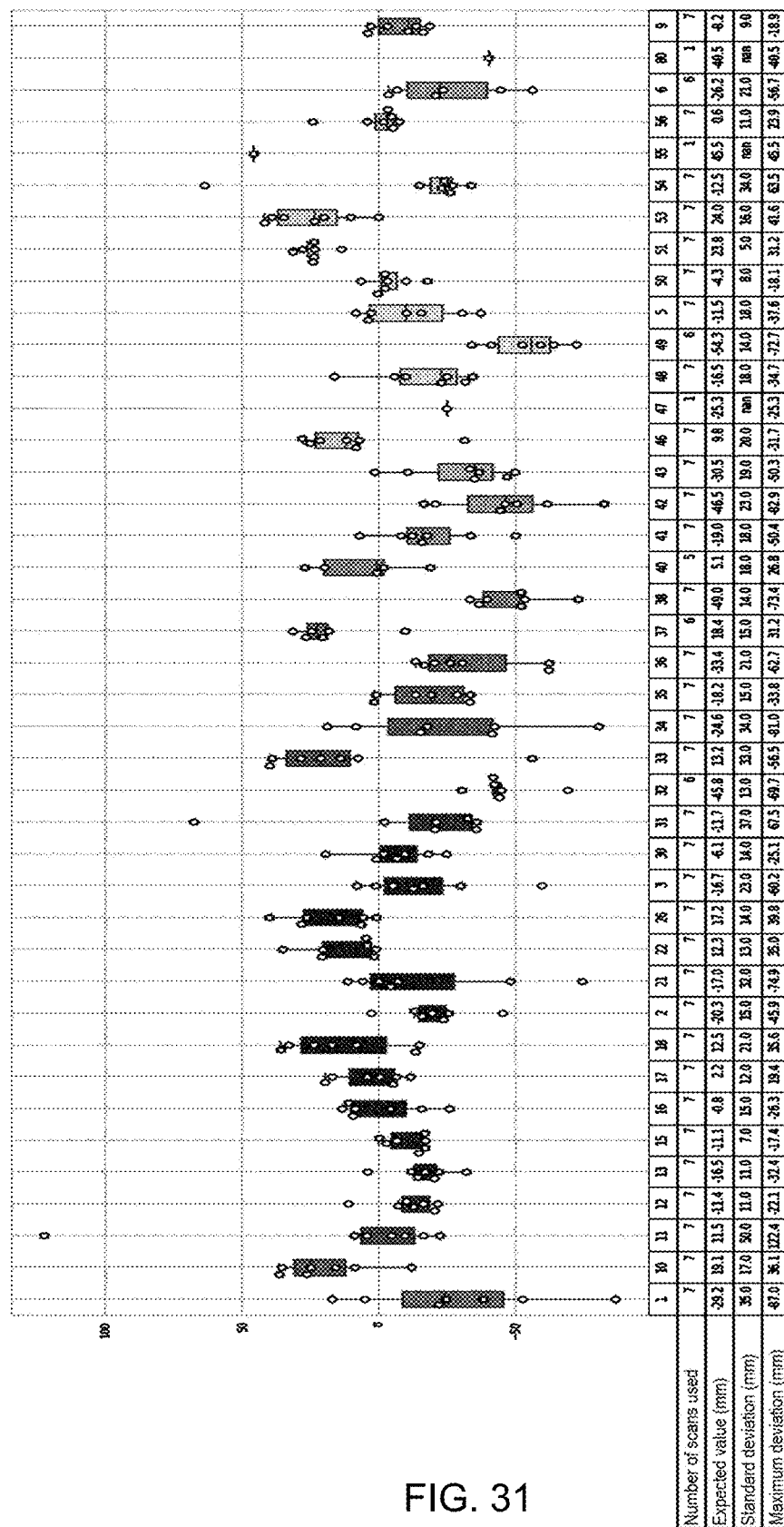

FIG. 31 shows the result of comparing the anthropometric parameters obtained using the proposed algorithm with the anthropometric parameters obtained by measuring the body manually.

Figure 32:
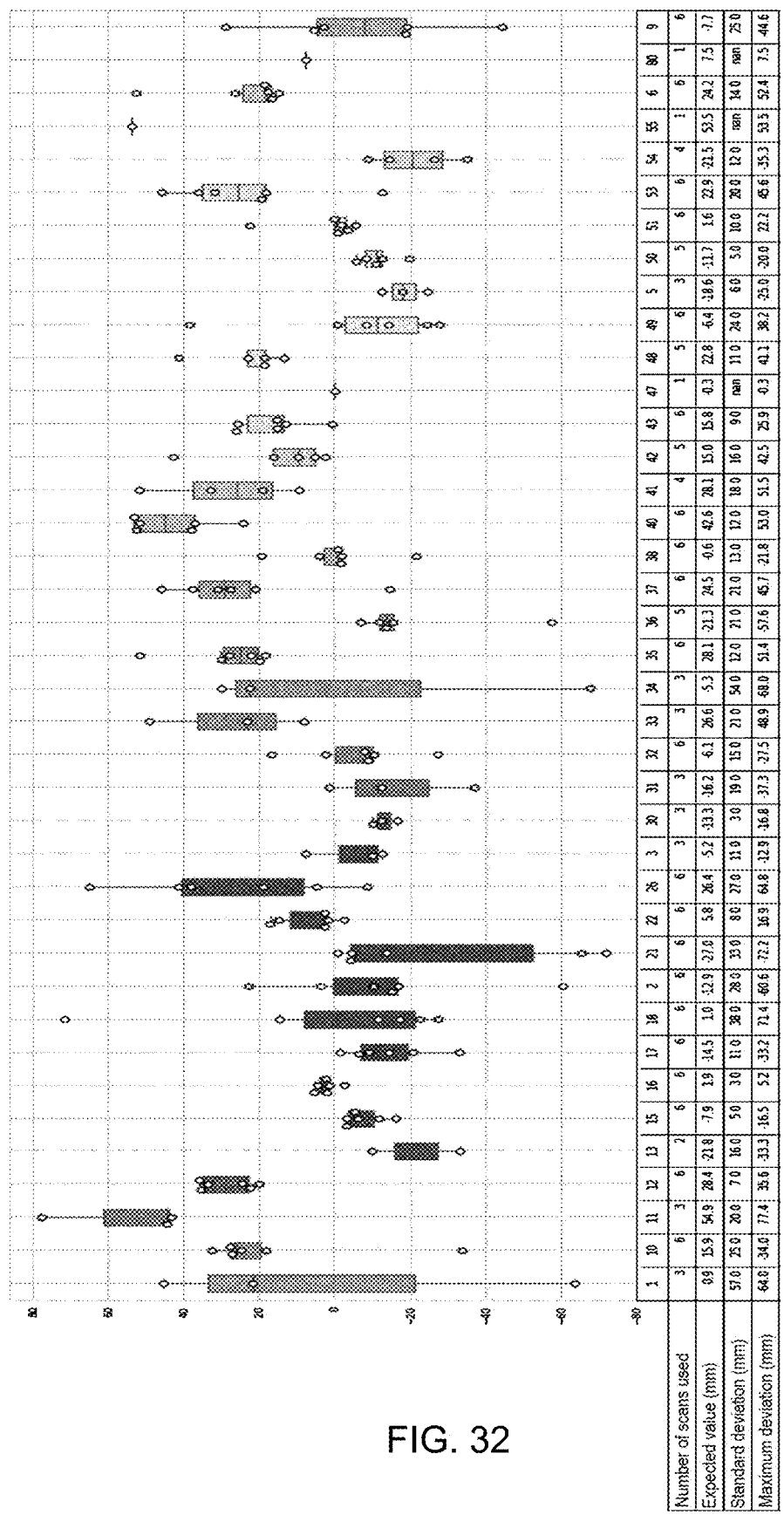

FIG. 32 shows the result of comparing parameters obtained using the proposed algorithm with parameters measured using a three-dimensional image.

Figure 33:
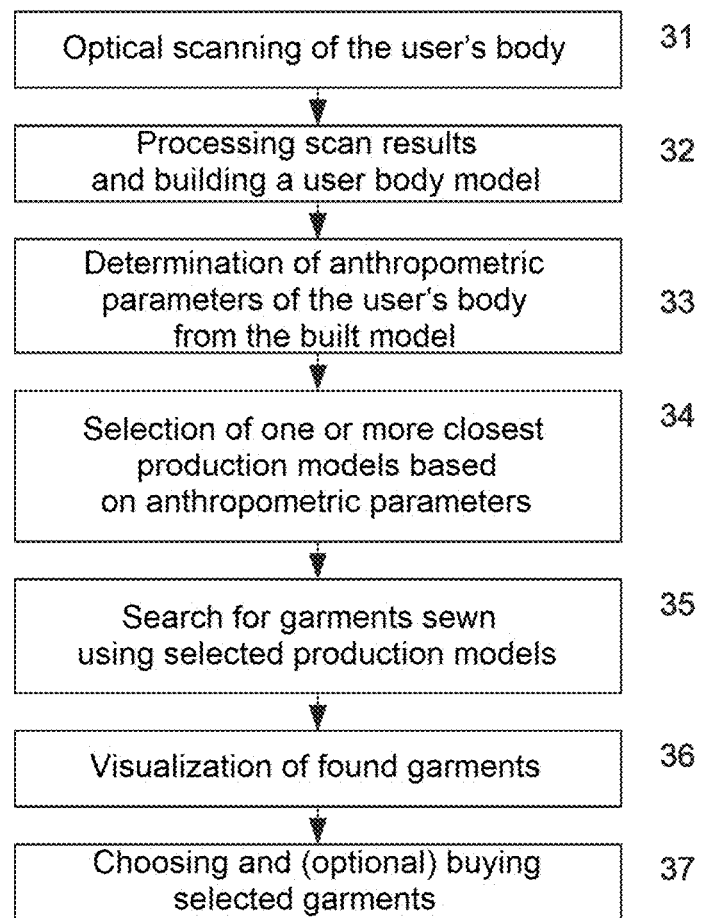

FIG. 33 shows a block diagram of an enlarged algorithm for the remote clothing selection.

Figure 34:
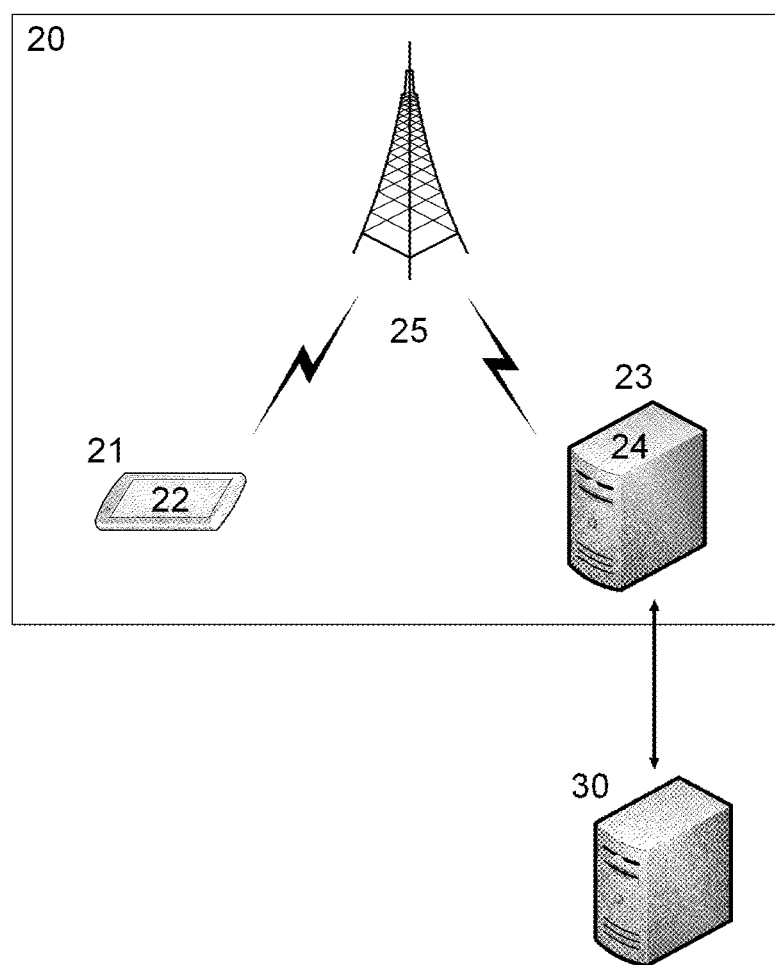

FIG. 34 shows an illustrative example of a system for implementing a method of remote clothing selection in a B2C environment.

Figure 35:
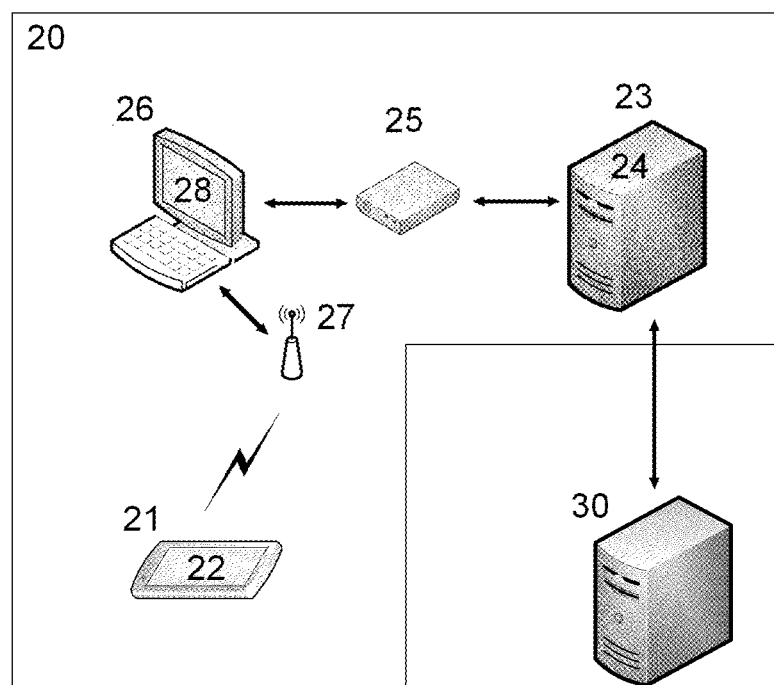

FIG. 35 shows an illustrative example of a system for implementing a method of remote clothing selection in a B2B environment.

Figure 36:
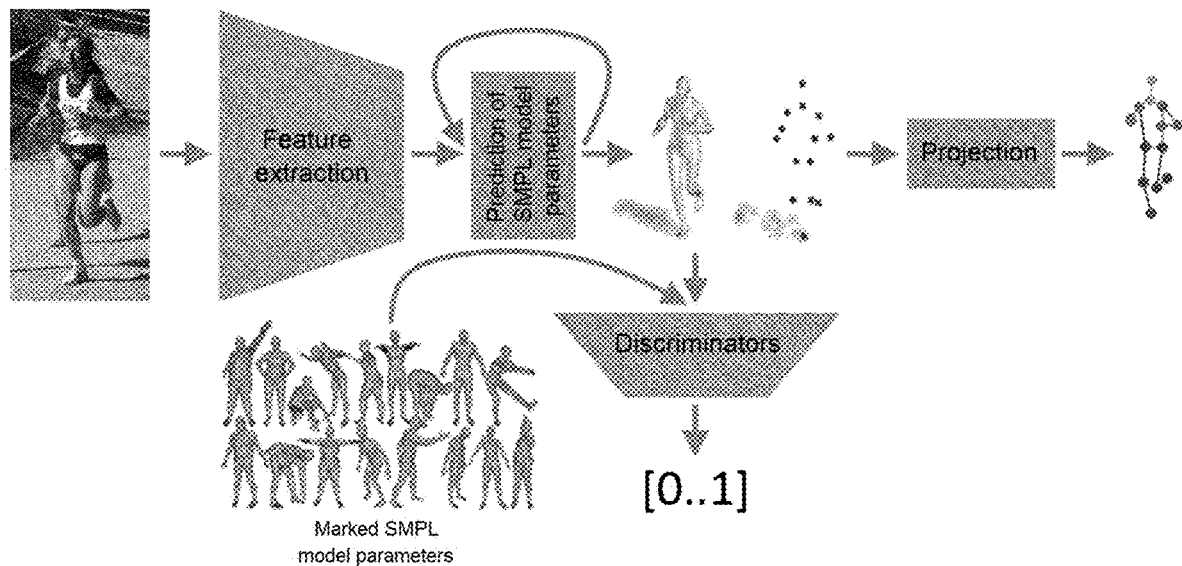

FIG. 36 illustrates schematically the architecture of the Human Mesh Recover algorithm.

Figure 37:
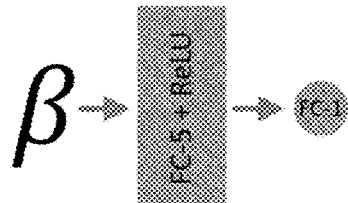
Figure 37:
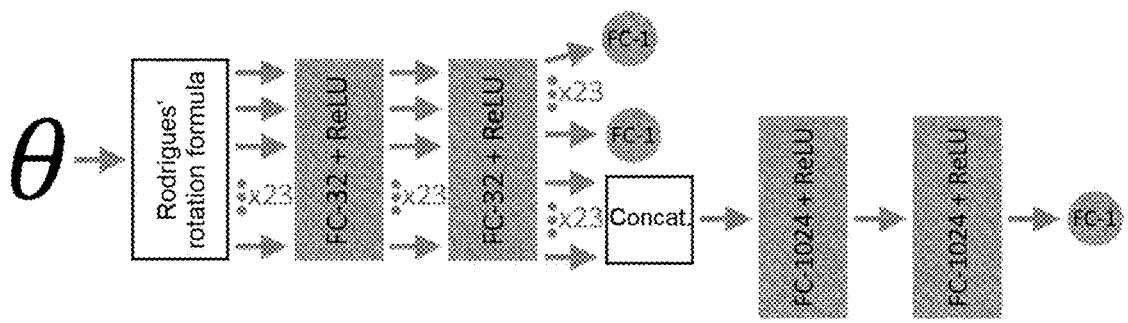

FIG. 37 illustrates schematically the architecture of the network discriminators for processing SMPL model parameters.

Figure 38:
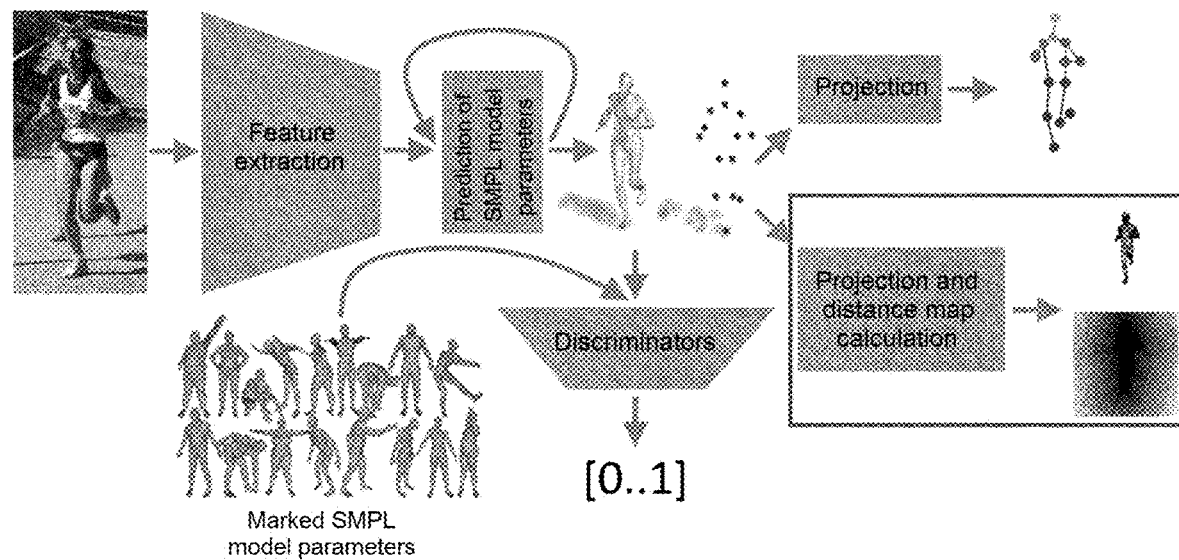

FIG. 38 illustrates schematically the architecture of the modified Human Mesh Recover algorithm and examples of vertex projection and distance maps.

Figure 39:
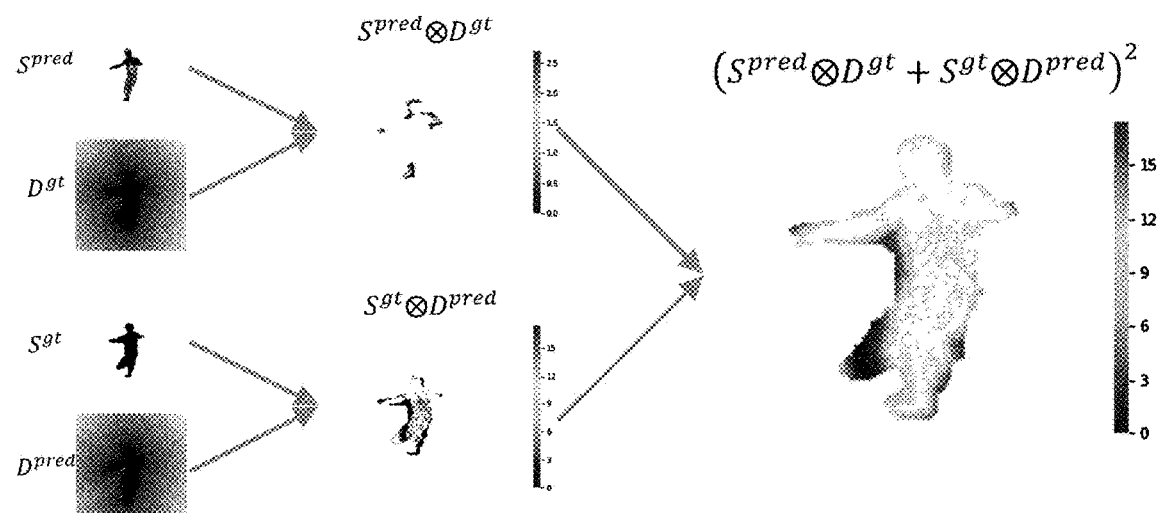

FIG. 39 shows an example of the error map of the predicted mesh parametric 3D model. Training of the algorithm may include a penalty for errors.

Figure 40:
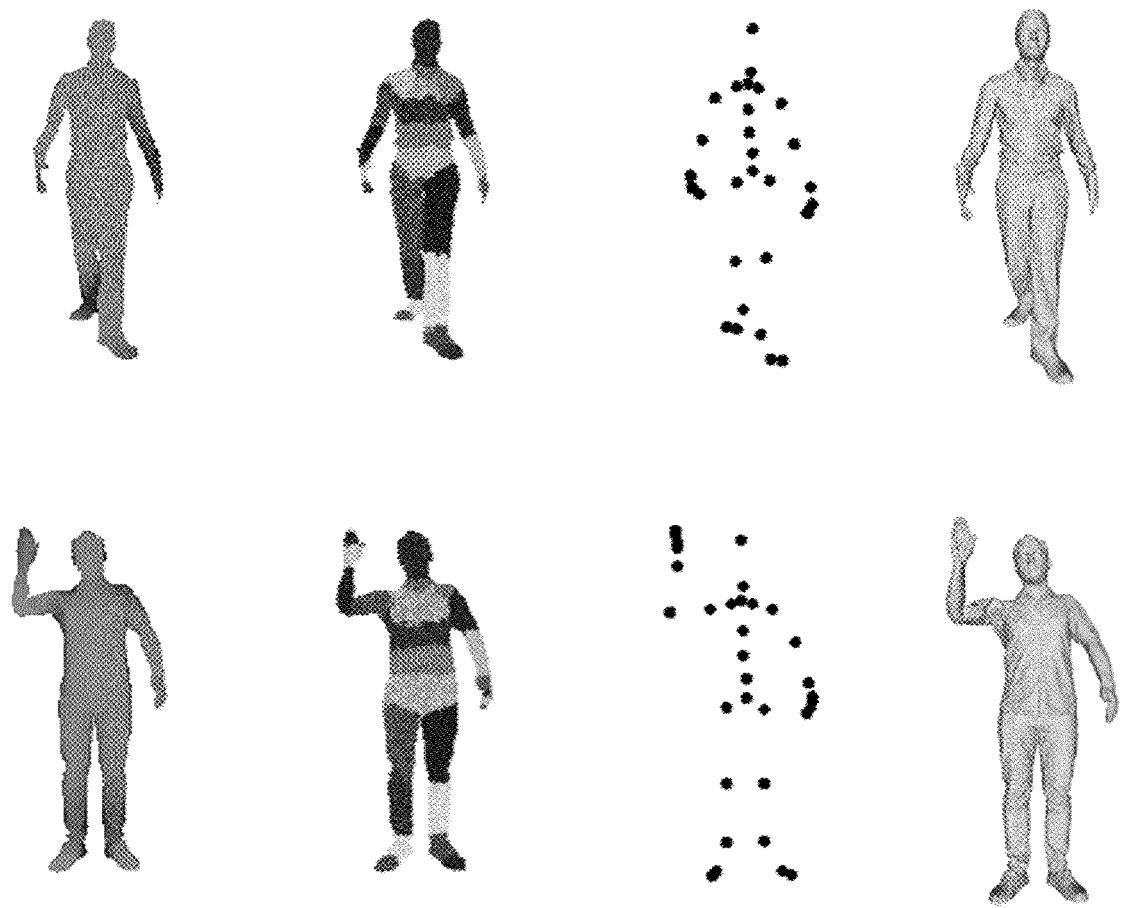

FIG. 40 shows the result of the system. From left to right: depth map, segmentation, key points (landmarks), reference model.

Figure 41:

FIG. 41 shows an example of the simplest installation for optical scanning of clothes.

Figure 42:
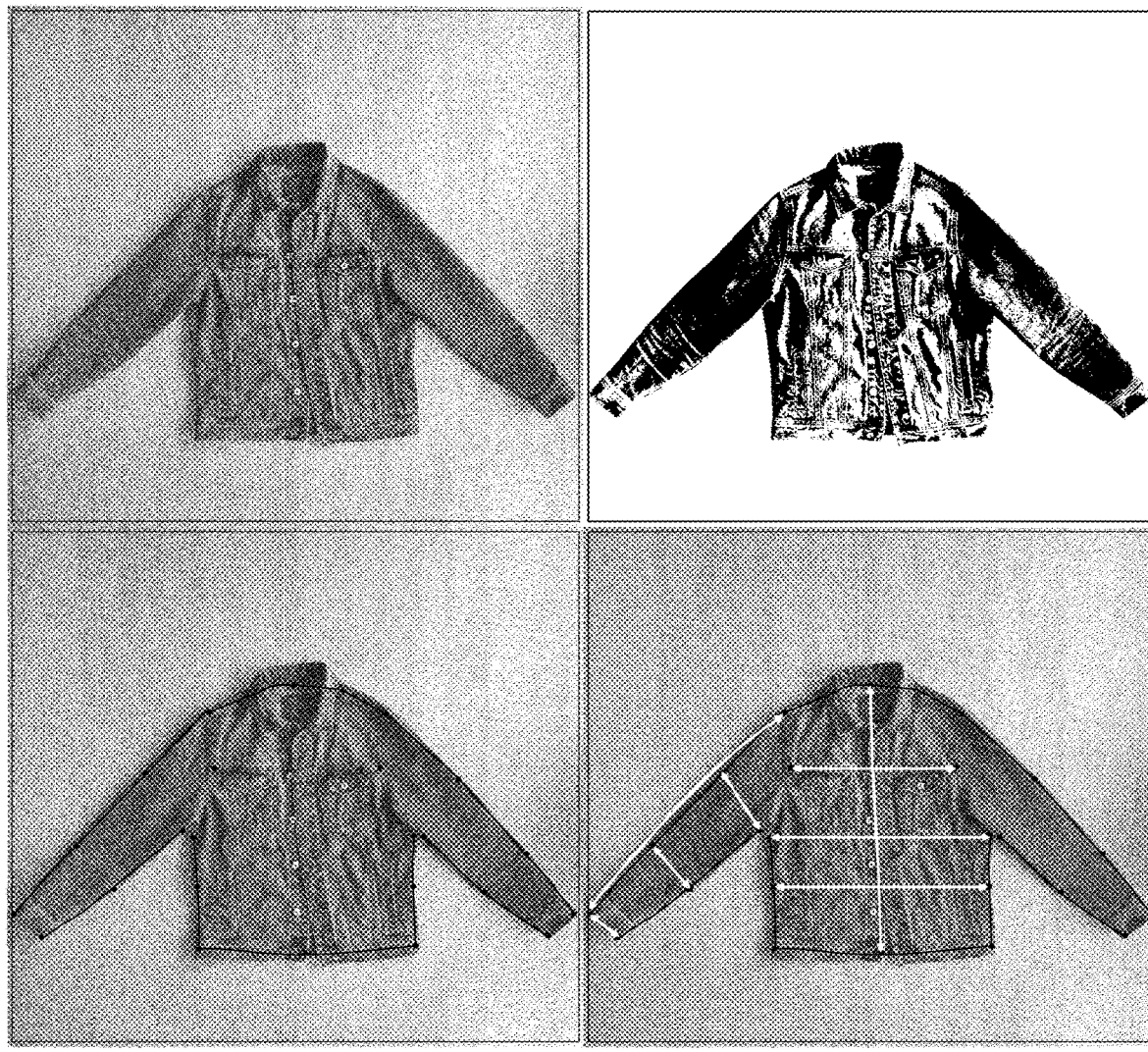

FIG. 42 illustrates the work of the computer vision algorithm, which determines the type or category of clothing, identifies key points (landmarks) in the image, calculates the contour of clothing and based on these data determines the size.

Figure 43:
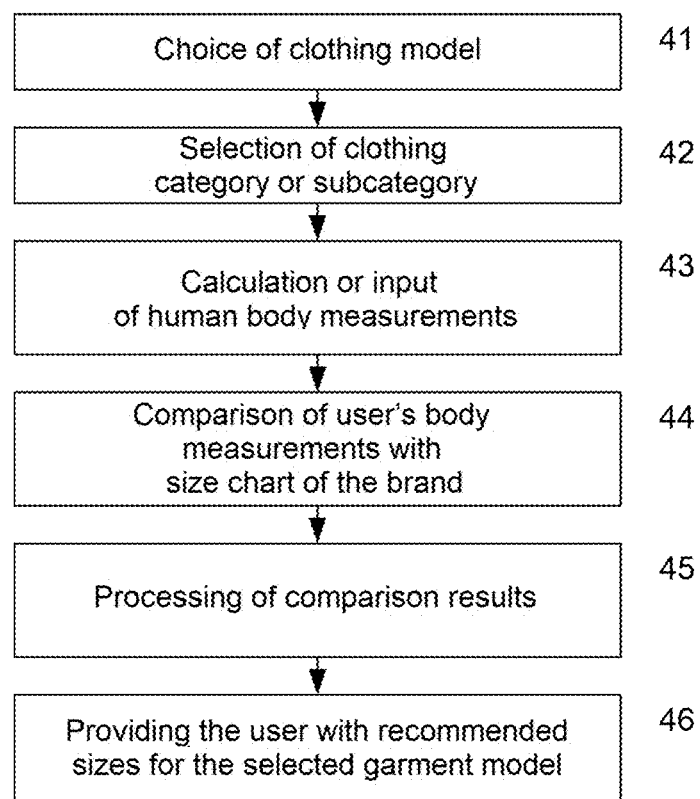

FIG. 43 shows a block diagram of an enlarged algorithm of recommendation of a suitable size for a particular clothing item.

Figure 44:
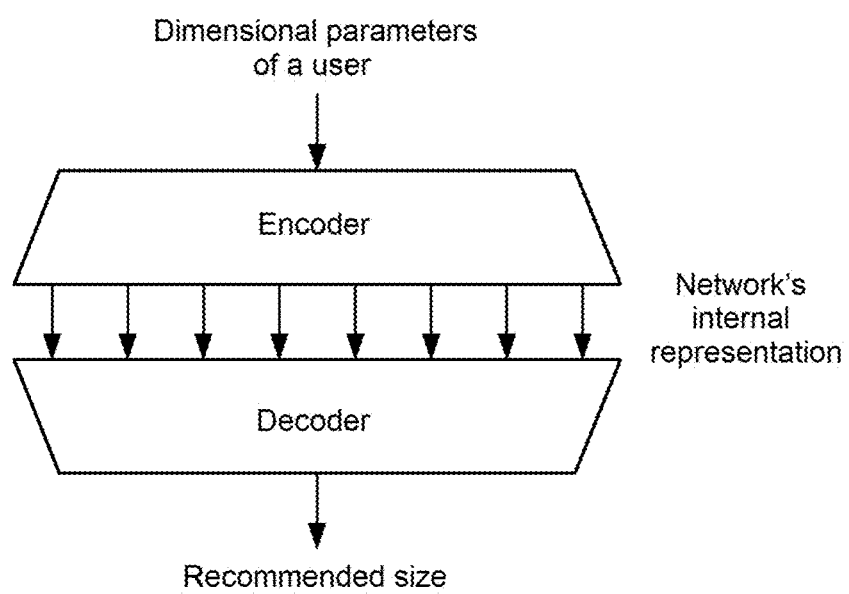

FIG. 44 illustrates schematically the structure of the neural network to implement the method of recommendation based on the algorithm of machine learning.

DETAILED DESCRIPTION OF EMBODIMENTS OF THE INVENTION

Non-restrictive options for practical implementation of the invention are described below. The purpose of the following description is to illustrate approaches to the practical implementation of the invention rather than to limit the scope of the invention to the described options.

The following expanded algorithm of actions (FIG. 33) is proposed to implement the above approach:
(31) optical scanning of the user's body;
(32) processing scan results and building a user body model;
(33) determination of anthropometric dimensional parameters of the user's body from the built model;
(34) selection of dimensional parameters of one or more closest production models from an array of production models of different clothing manufacturers;
(35) search for garments sewn using selected production models or sewn in any way and pre-measured with a camera or by hand;
(36) (optional) visualization of found garments;
(37) (optional) choosing and (optional) buying selected garments.

Instead of steps (31) and (32) it is possible to build a model of the user's body based on user data obtained using one or more of the following methods:
user completion of the questionnaire;
taking a picture of the user from one or more sides; and
physical measurements of the user's body.

Also, in some cases the stage of creation of user body model at step (32) can be omitted and anthropometric parameters of a user's body can be obtained directly from the aforementioned data about the user.

Examples of user's anthropometric parameters are parameters of statistical model of a human body or known-in-advance sizes of clothes of the chosen brands suitable for the user.

Instead of steps (34) and (35) user's anthropometric parameters can be compared with a brand size chart, with the results of measurements of clothes, etc. Detailed description of the proposed implementations is presented in Sections 4 and 5 below.

Steps (36) and (37) can be implemented in the way used in e-commerce. One or both of these steps may not be present in the method used in other situations, for example, in forming a user's virtual wardrobe, in deferred purchases, in individual tailoring with remote measurement taking, in statistical or marketing research, etc.

It should be noted that the term "optical scanning" is used in this text, but the concept applies to a more general case as well: i.e., everywhere in the text instead of the term "optical scanning" the broader term "three-dimensional scanning" can be used, and the validity of all statements is fully preserved.

It should also be noted that apart from optical/three-dimensional scanning, th concept also applies when capturing in any way any data needed to reconstruct a human model, including photo shooting and video shooting (for example, using a photogrammetry approach), as well as various measurement taking (height, weight, etc.).

It should also be noted that the search and selection can be done not only by anthropometric dimensional parameters, as indicated in step (34), but also by various other parameters (statistical model parameters, etc.). Thus, wherever the term "dimensional parameters" is found in this text (which includes, in particular, body measurements and shape type), it can be replaced by the broader term "model parameters" with full preservation of validity of all statements.

It should also be noted that the term "production models" used in this text may mean physical dummies, live human models (male and female models), computer models (of dummies, mannequins, live human models).

In case of recommendations of clothing based on comparison of user's anthropometric parameters and measurements of garments, examples of measurements of garments are measurements of sewn garments, measurements of patterns of garments or other parameters. They can be obtained from production documentation of garments (spec sheets, tech packs, grading rules) or by measuring garments or patterns of garments.

If it is impossible or takes a long time (due to business agreements, signing agreements) to obtain production documentation with garment measurement tables from clothing manufacturers, it is possible to obtain garment measurements using optical scanning.

Optical scanning of clothes is supposed to be performed on a special installation.

The system consists of a table, for example, with a light worktop and a static, pre-calibrated camera (FIG. 41). A computer vision algorithm (FIG. 42) is used for each garment scan that:

1) determines the type of garment;
2) calculates the key points (landmarks) in the image;
3) determines the contour of garment in the photo.

The applied algorithm consists of a set of convolution neural networks performing each task separately: classifier, regressor and segmenter, respectively.

The data obtained by the described algorithm are used to calculate measurements characteristic for each type of clothing. For this purpose, the rules for conversion of key points (landmarks) and contours into target measurements prepared in advance for each garment type are applied. At the end of the algorithm, using the parameters of camera calibration, the transformation of the obtained measurements into metric space is performed.

When recommending clothes by size, it is assumed that the following is available:

1) user's anthropometric parameters;
2) garments measurement database, divided by type of clothing;
3) rules for comparing user's anthropometric parameters and measurements of garments.

In this case the algorithm of recommendation of a certain type of clothes based on measurements is the algorithm of comparison of vectors in Euclidean space hnsw or faiss.

1. Optical Scanning of the User's Body

Optical scanning of the user's body can be performed in various ways, including laser scanning, structured backlight scanning, ToF-scanning (time-of-flight), fixed-view photography, video shooting, etc. Scanning can be performed from one or more points. Each point to be scanned can be fixed or can move along a specific path. In the following example of the invention implementation, a model is built using the point cloud obtained by scanning, but this example is only illustrative and other input data such as depth maps, projected structured backlight images, etc. can be used to build a model.

The point cloud can be obtained using optical means (so-called "depth cameras") capable of determining the depth of a three-dimensional scene with sufficient resolution. Such capabilities are available, in particular, in Stereolabs ZED, Carnegie Robotics MultiSense, Ensenso N35, Nerian SceneScan, Intel RealSense, Zivid One+, Arcure Omega etc. Application of ASUS Xtion, ASUS Xtion2, Orbbec Astra, Orbbec Persee, Microsoft Kinect, Microsoft Kinect 2, and Azure Kinect, and similar devices are also possible. It is expected that in the foreseeable future "depth cameras" of acceptable resolution (as well as acceptable noise level) can be integrated into some models of smartphones and other mobile devices (iPhone X, iPad Pro (2018), Huawei Mate 20 Pro, etc.).

Two approaches to the processing of scanning results are described below, allowing the resulting parametric model of the human body to be obtained (Section 2.8). The first approach is based on depth map processing and is described in Section 2. An alternative approach allows obtaining a parametric model of the human body using one or more color photographs of a person and is described in Section 3. These approaches can be used either independently or together. For example, a person's model built from a photograph can be used to initialize a method that performs three-dimensional reconstruction if the recorder can simultaneously capture color images and depth maps.

2. Processing Scan Results and Building a User Body Model Based on Depth Maps

Processing of the scan results is based on the principle of three-dimensional reconstruction of dynamic scenes using information about the human body from the parametric model and is based on ideas set out in [B1], with changes aimed at expanding the capabilities of the algorithm, namely, to reduce errors arising from sharp movements and overlaps, as well as to increase the diversity of possible initial user positions. The changes refer to the applying a segmentation of input depth maps by body parts and determining positions of skeleton key points (landmarks), as well as to the algorithm of initialization and optimization.

Figure 1:
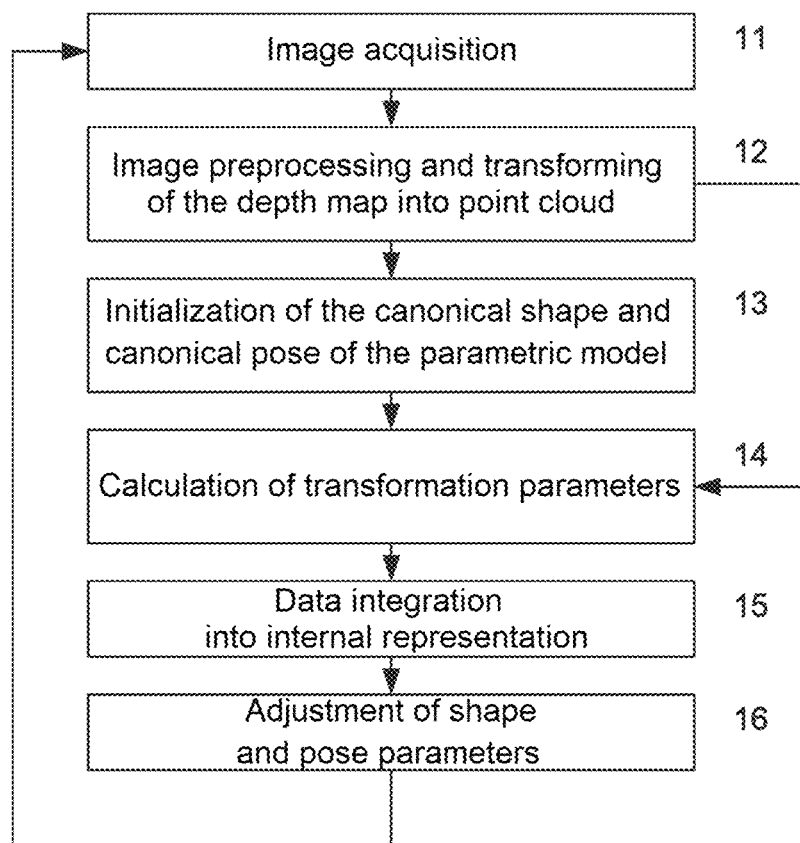
FIG. 1 shows a flow diagram of the algorithm for processing of the scanning results and building a model of the user's body based on depth maps.

The proposed method is shown graphically in FIG. 1. The algorithm starts working by filtering depth maps provided as the input data and by transforming them into point clouds using internal depth camera calibration matrix. The next step of the algorithm operation is initialization of the canonical shape and pose of the parametric model. Then changes in space transformation parameters as well as changes in model pose parameters are calculated to best fit the next image frame. The calculated parameters are used to integrate data into the internal representation, which contains a person in the initial (canonical) pose. After integration, the algorithm performs adjustment of shape and canonical pose parameters.

2.1. Input Data Pre-Processing

The work of the algorithm assumes searching for correspondences between the three-dimensional point cloud corresponding to the current depth measurements and the scene surface obtained from the data processed previously. For this reason the depth map input must be transformed into the point cloud. However, depth maps can be very noisy, as shown in [B2], which negatively affects the stability of the algorithm. Based on the assumption that the human body surface is characterized by the absence of sharp changes, we can assume that depth changes between neighboring pixels shall be sharp only at the boundaries, so to reduce noise a bilateral filter can be applied [B3], which smooths the depth map keeping boundaries unchanged. Pre-defined internal camera calibration matrix [B4] is used for depth map transformation into a point cloud.

2.2. Initialization of Parameters

Figure 2:
FIG. 2 shows an example of scene modification for matching the input data, from top to bottom: scene surface in the canonical state, the input frame point cloud, the scene surface modified for the input data.

The proposed algorithm is based on the gradual internal scene representation completion and requires determining a canonical state of the scene, which will be changed by the morphing field to ensure compliance with the current frame. FIG. 2 shows an example of scene modification for matching the input data, from top to bottom: scene surface in the canonical state, the input frame point cloud, the scene surface modified for the input data.

In algorithm [B1] the user should stand in a certain pose to initialize the algorithm, which creates additional limitations in context of method application in the consumer segment. Here it is proposed to bypass such restriction with the help of an initialization algorithm based on results described in reference [B5].

The first frame of the sequence, as well as information about segmentation and key points of the skeleton, are fed to the algorithm as input. Algorithm operation includes several steps: (1) calculation of initial approximation of pose parameters, (2) iterative minimization of error function by shape and pose parameters, and (3) initialization of morphing field graph with model vertices.

At the stage of initial approximation calculation, the information about position of key skeleton points in the parametric model and in the input frame is used. Since in general there is no clear correspondence between the key points specified on the input frame and the model key points, an auxiliary algorithm with two steps has been developed to determine the values of the model parameters by the key points obtained from the sensor.

The first step is to minimize the pose function parameters, which is equal to the sum of squares of angles between pairs of line segments: $\Sigma_{i=1}^{k} ang(M_V^i, K_V^i)^2$ where ang (a, b) is the angle between the line segments, $M_V^i$, $K_V^i$—line segment i from an ordered set of line segments between some key points of the model or some key points obtained from the sensor, $k=|M_V|=|K_V|$. The sections of the sets $M_V$ and $K_V$ correspond to the bones of the arms, legs, spine and shoulder and hip lines.

On the second step the sum of squares of distances between pairs of points $(M_J^i, K_J^i)$ are minimized with respect to pose parameters. These pairs come from the ordered sets of $M_J$ and $K_J$ of key points provided by model and sensor $\Sigma_{i=1}^{s}=\|M_j^i-K_j^i\|^2$, $s=|M_J|=|K_J|$.

Figure 3:
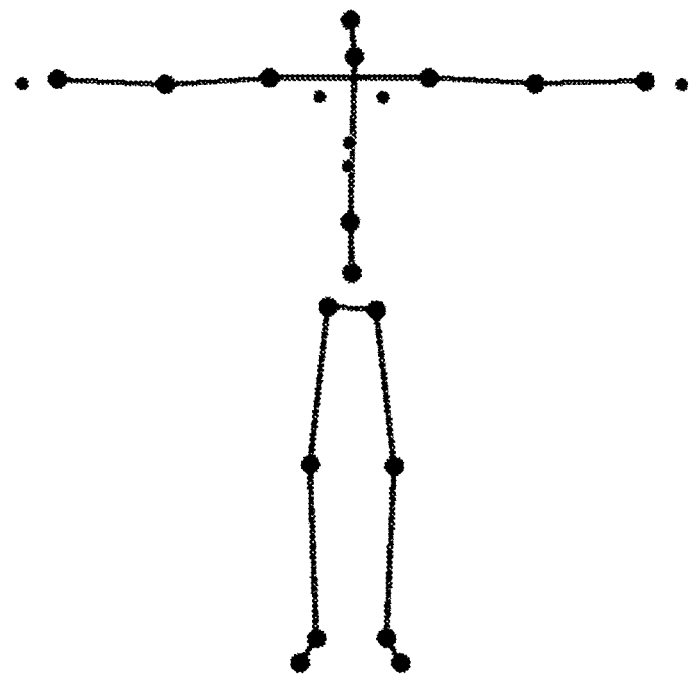
FIG. 3 shows an articulated model of the human body skeleton, in which red (large) points are included in many key points (landmarks) of the skeleton, blue (small) points are not included in it, and the green segments (connecting large key points) correspond to the bones of the hands, legs, spine, including the neck, as well as shoulder and pelvis lines.

An example of the $M_V$ and $M_J$ sets is shown in FIG. 3, where red (large) key points are part of the $M_J$ set, blue (small) points are not part of the $M_J$ set, and green line segments (connecting large key points) are part of the $M_V$ set.

In the second stage, to refine pose parameters as well as to determine model shape parameters, error minimization is performed with an error function defined as $$E_{init}(P, \theta, \beta) = \sum_{x \in P} \min_{v \in U} \rho(\|v - x\|) + \sum_{v \in U} \min_{x \in P} \rho(\|v - x\|) \quad (1)$$

where P—point cloud formed from depth map input, β—model shape parameters, θ—pose parameters, U—part of parametric model vertices with pose and shape parameters (θ, β), which is visible from the camera viewpoint. The problem of determining the visible vertices is discussed in detail below.

The p(x) function is a Huber function $L_\delta$ (x) with the parameter δ equal to 1:

$$\rho(x) = \begin{cases} \frac{1}{2}x^2, & |x| \le 1 \\ |x| - \frac{1}{2}, & |x| > 1 \end{cases}$$

As a result of the second stage of the algorithm, canonical pose and shape parameters are identified, according to which the initialization of the graph $G_f=(V_f, E_f)$ of the morphing field is performed at the final stage. Similar to approach described in [B6], the vertices $V_f$ of the graph contain coordinates in three-dimensional space, the Euclidian transformation parameters and its weight. The edges $E_f$ between the vertices are necessary to calculate the regularization that provides a smooth transition of transformation parameters in three-dimensional space.

Initialization of coordinates is performed by sampling the vertices of the parametric model in the canonical pose and shape. The method of sampling is described below. First, the neighborhood radius δ is selected, and the weight $v_w$ of each vertex from the set of vertices $V_f$ is initialized as $v_w=2\delta$. Then vertices $V_m$ of the model are grouped according to the index of the voxel into which each vertex would get if the space was divided into voxels with the side 2δ. Then the coordinates of the vertices in each group are averaged, and the nearest vertex to the result is selected. It becomes a member of the $V_f$ set.

The edges $E_f$ between the vertices are defined as follows: since edges are defined for the parametric model, it is possible to define a non-directional graph $G_m=(V_m, E_m)$, and to define the weights for the graph edges as distances between the corresponding vertices. Then the vertices v and u (v, u∈$V_f$) are considered to be connected in $G_f$ if u relates to v or v relates to u as one of N closest neighbors along the shortest path in the graph $G_m$. The value of N is assumed to be 8.

This procedure allows to avoid the problems associated with regularization of semantically unrelated vertices, such as right and left leg vertices (see FIG. 4), where the following is presented from left to right: the initial model; graph, initialized by the proposed method; and graph, initialized by the regular procedure of finding the nearest neighbors. Particular attention should be paid to the stickiness of the legs during the regular procedure.

2.3. Morphing Field

The vertices of the graph $G_f$ initialized in the previous section set the structure of the morphing field, which is used to transform the scene surface from the canonical shape to the shape corresponding to the current frame. As mentioned earlier, each vertex v∈$V_f$ contains coordinates $v_c$, weight $v_w$, and normalized double quaternion $v_{dq}$ that encodes the Euclidian transformation.

To calculate the transformation of a specific point x in three-dimensional space, an algorithm of double quaternion blending [B7] is applied, for which it is necessary to find nearest to x vertices in $V_f$, and then to calculate the weighted sum of the double quaternions of these vertices. The weight for each summand is either calculated according to the formula $$w = \exp\left(-\frac{\|x - v_c\|_2^2}{2v_w^2}\right)$$

or (for optimization of further calculations) is assumed to be 0 if $\|x-v_c\|_2 > 3v_w$. The summation result is a double quaternion, but it is not a normalized one, and therefore, it does not encode the Euclidean transformation, so the result is normalized further. After that, a matrix of the orthogonal transformation R and the translation vector t are computed from the result, and the transformed point is defined as Rx+t.

The morphing field is used not only to transform the surface from the canonical state to the current one, but also to perform a reverse transformation at the stage of integration of new data into the scene. For this purpose, a change is introduced into the integration process described in detail in [B2]—the center of each voxel is morphed by the field before projecting to a depth map. As a result of such integration, the inverse transformation of the new data is implemented without the need for additional computation of inverse matrices, see example on FIG. 5, where on the left is the visualization of the morphing field, in the center is the surface obtained from the depth map of the next frame, and on the right is the same surface after the conversion to the canonical pose.

2.4. Parametric Model

The SMPL model [B8] was used as a parametric model in the proposed algorithm. This model has the following advantages:
- the algorithm of model calculation includes matrix multiplication and skinning, which allows effective implementation on graphical processors;
- the parameters for the pose and shape are separated;
- the model is open-source;
- the largest CAESAR database [B9] was used as a training set for representing the parametric space of human body shapes.

It should be noted that instead of SMPL model it is possible to use other parametric models of a person, for example, HumanShape, S-SCAPE, own human parametric model created by Texel, LLC, etc.

It should also be noted that it is possible to use both the CAESAR database and other databases of human body models, including the own database of human body models created by Texel, LLC.

Several changes were made to the original algorithm of SMPL model building:

(1) a graphics processor (GPU)-accelerated version of the algorithm was created;

(2) in order to increase efficiency, the automatic calculation of derivative vertices by model parameters was replaced by a separate algorithm based on the results of manual calculation, and general performance optimization was carried out;

(3) a calculation of surface normals and their derivatives was added;

(4) according to the results [B1], the component affecting the shape by changing the pose parameters was removed from the model to improve convergence at the error minimization stage.

2.5. Optimization of Parameters

After preliminary processing of the new frame and its transformation into a point cloud, it is necessary to change the model pose and parameters of the morphing field so that the scene surface would correspond to the new observations, and the pose would correspond to the new user pose. To achieve these goals, minimization of the sum of error functions is implemented. These functions can be divided into several groups:
- morphing field error;
- model position error;
- difference between scene transformation and skinning;
- morphing field parameter regularization.

The proposed functions are based on ideas of [B1] with modifications to consider information about the position of individual body segments.

Morphing field error and model position error are defined as functions $$E_{field} = \sum_{(v,u) \in C} \tilde{n}_v^T (\tilde{v} - u) \tag{2}$$

$$E_{model} = \sum_{(v,u) \in C} \hat{n}_v^T (\hat{v} - u) \tag{3}$$

where C is a set of matches, i.e. a set of pairs (v, u), in which v is the vertex of the visible surface of the scene or model in the canonical state, u is the point from the point cloud of the current frame, $n_v$ is the surface normal at point v, $\tilde{v}$ and $\hat{v}$ ($\tilde{n}_v$ and $\hat{n}_v$) are the vertices (normals) transformed by the morphing field and model skinning function respectively.

The set of matches C is formed from pairs of adjacent points that belong to the same or neighboring segments. The neighborhood of segments is established in advance: each segment of a body is bound to one of the key point of a skeleton. The key points have a hierarchical structure—each point, except the root one, has a parent. Therefore, the segments are considered adjacent if their respective key points are connected by a parent-child relationship, with the exception of two special segments in the shoulder area that are defined manually. An example of segmentation and neighborhood relations are shown in FIG. 6, where different segments have different colors and neighboring segments are connected by lines.

Functions of transformation difference and regularization are defined as follows:

$$E_{bind} = \sum_{x \in V_f} \|\hat{x}_c - \tilde{x}_c\|_2^2 \tag{4}$$

$$E_{reg} = \sum_{x \in V_f} \sum_{y | (x,y) \in B_f} \rho(\|W_x - W_y\|_2^2) \|T_x y_c - T_y y_c\|_2^2 \tag{5}$$

where $W_x$ is the skinning weight for the vertex x and is defined by the parametric model for each vertex, $\rho$ is the Huber weight function [B10] with the parameter $\delta$=0.2, $T_x$ is the Euclidian transformation matrix of size 4×4 computed from the double quaternion of the vertex x. Regularization function has an intuitive meaning—to ensure that the surface changes smoothly, the neighboring vertices must be transformed by each vertex in the same way as they transform themselves. The Huber weight function, which decreases with the increase of its argument, will reduce the effect of regularization if the vertices are located in different parts of the body, because in this case their skinning weights will differ significantly. Regularization increases stability, but reduces the ability to adapt to sharp changes.

Thus, the following function is minimized with respect to model pose parameters and morphing field parameters:

$$E = \lambda_{field} E_{field} + \lambda_{model} E_{model} + \lambda_{bind} E_{bind} + \lambda_{reg} E_{reg} \quad (6)$$

Nevertheless, after performing unconditional optimization on transformation parameters of the morphing field, which are normalized double quaternions, they become un-normalized and do not represent the Euclidean transformation any longer. At the same time, setting a condition to maintain normalization during optimization often reduces performance and worsens convergence. To solve this problem, a logarithmic transformation over parameters of the field is additionally performed [B11] that allows to treat them as vectors from $\mathbb{R}^6$, where each such vector corresponds to the normalized double quaternion.

Note that the function (6) can be represented as a sum of squares. Therefore, the Gaussian-Newton method [B12] can be used to minimize such function. As in method [B2], since only N=5 nearest vertices affect each point transformed by the field, it is not necessary to store the whole Jacobian matrix, as it is enough to store only 6N=30 values for each summand of function $E_{field}$. For functions that have a dependence on the pose parameters, it is necessary to additionally store 3×25=75 values (by the number of the model pose parameters).

The system $J^T J x = J e$, where J is Jacobian, e is a vector of values of the summands of the error function, can be solved directly, for example, by Gauss method, or iteratively by the congruent gradients method [B13], in the latter case a limited number of iterations can be carried out for increased efficiency and additional regularization, leaving the solution approximate.

2.6. Determination of Visible Vertices

When calculating the error function, only the visible part of the scene surface is considered. In order to approximate the subset of the visible surface vertices, the following algorithm was developed and applied:
- the surface is rendered into a depth map, for which a standard rendering is performed, then the depth buffer is read. The camera parameters are the same as at the stage of integration of the previous frame;
- the surface vertices are projected onto the image plane, for each vertex the index of corresponding pixel of the depth map is calculated from the projection coordinates;
- the distance $z_{vert}$ from the plane to the vertex is compared with the value of $Z_{depth}$ in the corresponding pixel of the depth map: if $z_{vert} < z_{depth} + \varepsilon$, the vertex is considered to be visible. In our case the value $\varepsilon = 10^{-2}$ is used.

FIG. 7 on the left shows the result of rendering the surface into a depth map, and on the right—the original surface with visible vertices marked by red dots).

2.7. Model Shape and Canonical Pose Correction

After the stage of integration of a new frame, the internal representation of the scene is supplemented with new information, so it becomes possible to refine the canonical pose and shape of the model. For this purpose, an optimization algorithm from [B1] is used: the algorithm minimizes the function (7) with respect to parameters $\theta$, $\beta$:

$$E_{vol} = E_{data} + \lambda_{reg} E_{reg} \quad (7)$$

$$E_{data} = \sum_{v \in V_{canon}} D(v)^2 \quad (8)$$

$$E_{reg} = \|\theta - \theta_{prev}\|_2^2 + \|\beta - \beta_{prev}\|_2^2 \quad (9)$$

where $V_{canon}$ is a set of model vertices with pose and shape parameters $\theta$, $\beta$; parameters $\theta_{prev}$, $\beta_{prev}$ are the previous values of parameters, the function $D(x)$ outputs TSDF value of the internal scene representation at a given point using a trilinear interpolation by values of nearby voxels. A zero TSDF value corresponds to the surface or to the lack of information about the point. Consequently, the minimum of the function (7) will be reached if all model vertices are on the plane or outside the observation area. In order to prevent the model from leaving the observation area, regularization is applied with the use of previous parameter values. As with function (6), function (7) is the sum of squares, so it can be minimized using the methods described earlier.

The result of the actions described above is a 3D model of the user's body. It should be noted that scanning of the user's body and construction of its model can be done once and saved in an appropriate format in the computer or in the user's mobile device or in a cloud service. Further, the model of the user's body can be actualized or refined by another scanning or manual correction, for example, by adding measurements physically taken from the user.

It should also be noted that the user's body model may include a detailed model of the user's head (including face) used for photorealistic rendering when visualizing the user's appearance in clothing. This allows for a greater emotional response from the user and, ultimately, increases the volume of purchases in monetary terms.

2.8. Parametric Model of the Human Body

The parametric model of a human body allows to obtain 3D model of a body based on two low-dimensional vectors specifying the shape and a pose of a person. Example of models which can be obtained as a result of variation of shape parameters with fixed pose parameters is shown in FIG. 8, where models are obtained by variation of first three shape parameters of parametric SMPL model [B14]. Positions of skeletal joints are marked with red dots.

The parametric model requires substantially less hardware resources for its storage and processing and substantially less time expenses for the calculations related to it, than the corresponding geometrical model. Also, the parameters extracted from parametric model require smaller transformations for their comparison with dimensional parameters of garments, and in some cases such transformations may not be required at all.

To date, the task of parametric modeling of the human body is extremely relevant. Parametric models are used in many algorithms and areas of computer vision. In particular, many approaches to the problem of reconstruction of human shape by partial data, such as video, color images, information obtained from depth sensors, require some low-dimensional representation of human body shape, such as the parametric model.

Parametric 3D models of a human body can be used in algorithms of automatic acquisition of person's anthropometric parameters used in manufacture and sales of clothes, and in reconstruction systems of human virtual representation (so-called virtual avatar). Tasks related to design, ergonomics, determination of body shape by partial data, such as pictures from one view, by semantic parameters (height, weight, etc.) are solved with use of similar models. Parametric models can also be used to generate artificial training data sets for other tasks related to computer vision.

Sets of three-dimensional images of people, which are defined by a set of vertices and triangles connection the vertices into a uniform surface, are used as the initial data for construction of 3D parametric models. Also, some work require the additional information on available three-dimensional images. Thus, the authors of HumanShape model [B15] use the information about position of 69 key anthropometric points in space for each three-dimensional image in the process of parametric model construction. The use of anthropometric points is performed in many works on parametric models construction, in particular in [B16, B17]. Mapping of such points for each three-dimensional image requires knowledge about the human body anatomy, which makes this process slow and expensive.

Authors of many works on creation of parametric models [B14, B15, B17, B18] use data sets containing three-dimensional images of people in several poses for model construction. Such data sets can be difficult to obtain due to constructive limitations of the devices, with which three-dimensional images of people are obtained.

Scientific works on parametric models construction are often complicated by the fact that open collections of three-dimensional images of the human body, containing a sufficient number of unique people, are practically non-existent. The size of the used collection is a very important factor that directly affects the quality of the obtained space of human body shape. So, Brett Allen et al. [B16] have used only 125 male and female models, the authors of the model [B17] have used a total of 45 models. S-SCAPE model [B19] was built on a collection of about 100 models. One of the largest commercially available sets of three-dimensional images of human body is CAESAR [B20]. This set contains data of about 4300 unique people and is used by the authors of HumanShape [15] and SMPL [B14] models for building the shape space.

Many of the existing sets have scanning defects. For example, three-dimensional images of the CAESAR data set are characterized by the lack of body surface in the area of feet, hands and the outer surface of arms, shoulders, head with missing information, as well as "glued" areas (FIG. 9). In the presence of systematic defects (in the area of the same parts of the body), the shapes of those body parts may be represented inaccurately. In addition, the existing parametric models contain a relatively small number of vertices (about 6000-7000), which does not allow to capture small parts of the body relief.

Therefore, development of an automated, fast and exact approach for construction of highly detailed human parametric 3D model based on a set of three-dimensional images of a human body was addressed.

2.8.1. Review of Existing Approaches

The general idea of building a parametric model of human body is to perform the "registration" process for each three-dimensional image of a body from the data set. The process of registration includes deformation of a human body template towards the registered three-dimensional image of a body as accurately as possible, with preservation of functional correspondence of the template points. If each point performs a similar function on each of the deformed templates, it is possible to describe the human body shape space using PCA (principal component analysis) decomposition.

The existing approaches to parametric models building can be classified into two groups by the method of deformation of the template model. One of them, the SCAPE family of parametric models of a human body, describes the process of scan registration using transformations of triangles that make up the template surface. The other group of models describes the process of registration using transformations of the template vertices.

The SCAPE model family includes such models as SCAPE [B17], BlendSCAPE [B18], S-SCAPE [B19]. In 2005, an article presenting a model called SCAPE [B17] was published. During the creation of the parametric model, the authors used a set of three-dimensional images in which every person is represented in many poses. As mentioned above, this paper uses the deformation of individual triangles to register individual three-dimensional images. However, the process of obtaining a model from the deformation space of triangles is a complex optimization task that requires a solution of the Poisson's equation system. The result is a model that realistically reflects a wide range of deformation not only of the shape space, but also of the pose. The pose space was also described using the deformation space of individual triangles, and, consequently, the application of a specific human motion animation was difficult due to the inability of using skeletal animation.

The authors of the BlendSCAPE parametric models [B18] and S-SCAPE [B19] proposed their construction methods based on the approaches used in the SCAPE model. S-SCAPE, proposed in 2010, is an improved and at the same time simplified version of SCAPE that offers a way to restore a 3D model without the need to solve a complex system of Poisson equations. Launched in 2012, BlendSCAPE model offers a way to register a human body more accurately based on 3D images of the same person in different poses.

The second family of parametric models uses deformations of individual vertices to perform the registration process. One of the first parametric models using this approach is the model from Allen et al. 2002 [B16]. This approach was then developed by Pishchulin et al. (HumanShape model) [B15]. The best-performing parametric human body SMPL model [B14] also uses this approach.

One of the first statistical parametric models was the model [B16]. Here the algorithm of Non-Rigid Deformation (NRD) was applied for the first time. The optimization task of template surface transformation for a three-dimensional image of a specific person's body was formulated, and the method of its solution was proposed as well. This work used a highly detailed template of the human model, but the parametric model was built based only on 250 three-dimensional images. It was demonstrated that such an algorithm perfectly copes with scanning defects, such as missing vertices. The model could operate with semantic shape parameters, such as weight, height, etc., among others. However, work [B16] goes beyond the topic of creating a human pose space. The model was based on a set of three-dimensional images of people standing in the same pose, and as a result it did not describe the pose space.

In 2013 the model HumanShape [B15] was released, it developed the idea of the model [B16]. Model building took place iteratively using the existing parametric model and improving it with the help of NRD algorithm. In it, S-SCAPE (Simplified Scape) model [B19] was used as initialization, which is much less computationally expensive at the model building stage. The HumanShape model was trained on the full set of CAESAR three-dimensional images that allowed it to reflect a wide range of shapes. Application of Linear Blend Skinning (LBS) technique in this model allowed applying arbitrary animations to the parametric model. One of the purposes of this work was to provide the researchers with the open code written during this work. However, the process of registering a three-dimensional image used information about the position of key anthropometric landmarks, information about which is often not found in the databases of three-dimensional images. Obtaining such information is a laborious process that requires manual marking or photographing of people with special markers on the body.

In 2015, the SMPL model [B14] appeared, showing the best results to date and being used in most applications that require a parametric model. In this paper the authors show that the registration process based on vertex deformations leads to much more accurate results compared to the deformations of triangles, comparing the results of their work with the BlendSCAPE model [B18]. Similar to the method proposed by the authors of BlendSCAPE, the human pose space is first built using a data set containing three-dimensional images of the same people in different poses. Then the shape space is shaped using the CAESAR dataset. Also, researchers in this article are considering the deformation of the human body shape caused by change of pose. Thus, their model connects spaces of shape and pose together and it is capable to reflect changes, such as deformation of muscles. Also authors have implemented the dynamic version of parametric model —DMPL, which is predicting deformation of the shape based on parameters that include the previous animation pose parameters. It has allowed to implement deformation of soft tissues that has improved realism of the models.

In this proposed approach the registration process based on vertex deformations is used, which was marked by the authors of SMPL model as the most efficient and accurate one. Model registration is performed using the approach described in HumanShape model—Non-Rigid Deformation algorithm. However, the proposed modification of the algorithm makes it automated and does not require anthropometric points.

Additional two variants of parametric model based on initialization using two parametric models—HunnanShape and SMPL—are considered.

2.8.2. Model Shape Space

Most of the existing research on this topic has similar algorithms of construction. Since a set of points in three-dimensional images is often not structured, it is necessary to perform its structuring. Some template of a human body, described as a set of vertices and triangles, consisting of vertices shaping a surface, is chosen. Further for each vertex of the template the transformation is searched for, allowing the deformed template to describe three-dimensional image of the specific person as precisely as possible. The process of deformation of the template model to fit a three-dimensional image of a specific person is called registration. The deformation should take place in such a way that the functional correspondence of each point on all registrations is preserved. For example, if the point of the template corresponded to an elbow position of any of the hands, then on registrations it must correspond to the same position.

Then the point set of the template model are encoded as a vector, and PCA (Principal Component Analysis) decomposition is performed. During decomposition, a space is built from the eigenvectors of the covariance matrix of the samples. Then a subspace is selected from the first few eigenvectors with the largest eigenvalues. Thus, the obtained set of vectors represents the space of human body shape with the smallest deviations. Parametrization is carried out on coordinates in the obtained basis:

$$M = \overline{M} + \sum_{i=1}^{B} e_i \cdot \beta_i \quad (10)$$

where M is the coordinates of the final model vertices, B is the number of shape parameters left in the model, $e_i$ is the i-th eigenvector obtained by PCA decomposition, $\beta_i$ is the value of the i-th shape parameter, $\overline{M}$ is the coordinates of template vertices.

Each of the two mentioned works formulates and implements the registration process in its own way. The authors of HumanShape model use S-SCAPE model as initialization and then improve it with the help of NRD algorithm. In the SMPL model, the pose space is first constructed. Then, by selecting a person's pose in the next 3D image, the authors directly optimize the position of the registration vertices to get the maximum correspondence with the vertices of three-dimensional image.

2.8.3. Algorithm for Constructing the HumanShape Model Shape Space

The authors of HumanShape model perform the process of registering three-dimensional images of people in two stages. In the first stage, the registration of three-dimensional image is approximated using the existing parametric model. The authors use the S-SCAPE parametric model for this. In this stage, it is proposed to select the pose and shape parameters of the existing parametric model so that it describes the registered three-dimensional image as accurately as possible. This is done using an iterative two-step method, repeated until convergence is achieved:

(1) optimize pose parameters to reduce the standard deviation between the position of key anthropometric points in a 3D image and the parametric model;

(2) optimize pose and shape parameters to reduce the root-mean-square (RMS) deviation from the points on the model to the closest points in the 3D image.

Due to the need to use landmarks, this method is not applicable for the task. MatLab built-in optimizer fmincon, which uses finite differentiation to find the gradient of the parametric model, is used as the optimizer.

Further, the authors propose to refine the obtained registration using the Non-Rigid Deformation algorithm. The description of this algorithm, used by the authors of Human-Shape, is given in the next section.

2.8.4. Non-Rigid Deformation Algorithm

As mentioned earlier, this algorithm was first described in [B16]. In the article devoted to the HumanShape model, it was used with minor modifications. The general idea is to obtain per-vertex template affine transformations, described by the 4×4 $A_i$ matrix for the vertex i, such that the resulting template surface corresponds to the surface of the current three-dimensional image S, as accurately as possible.

The accuracy of fitting the template to a three-dimensional image is described using a set of the following three loss functions:

(i) Smoothness Term Function $$E_s = \sum_{(i,j) \in edges(T)} \|A_i - A_j\|_F^2 \quad (11)$$

where edges(T) is a set of all edges of the template, $A_i$ is a 4×4 transformation matrix for vertex i, $\|\cap\|_F$ is the matrix Frobenius norm, $E_s$ is the result of the Smoothness term function calculation. Since the difference of the transformation matrix norms is summed up by edges, this part of the loss function penalizes the model for the large differences between the transformations detected for the adjacent vertices;

(ii) Landmark Term Function $$E_l = \sum_{i=1}^{K} \|A_{k_i} p_{k_i} - l_i\|^2 \qquad (12)$$

where K is the number of landmarks used, $k_i$ is the number of the template vertex which is the i-th landmark, $p_{ki}$ is the coordinates of the source template vertex $k_i$, $A_{ki}$ is the transformation corresponding to the $k_i$-th landmark vertex, $l_i$ is the i-th landmark coordinate in the current 3D image. The use of the Euclidean norm is implied here. This part of the loss function must penalize the model for the mismatch between the landmarks of the template and the three-dimensional image. Since the HumanShape model was created based on the CAESAR data set, 64 landmarks were used in it describing anatomical features of the human body structure;

(iii) Data Term Function $$E_d = \sum_{i=1}^{N} w_i \|A_i p_i - NN(i)\|^2 \qquad (13)$$

where $w_i$ is the weight of the i-th vertex in the template, $A_i$ is the transformation matrix of the i-th vertex, $p_i$ is the coordinate of the i-th vertex in the template, NN(i) is the 3D scan vertex, the nearest neighbor of the i-th vertex of the template. This part of the loss function penalizes the model for big distance between the transformed template vertices and the nearest 3D image neighbor. Weight of each vertex was calculated as the confidence of the scanning unit in the position of the vertex, which was selected as the closest neighbor.

The final loss function is a linear combination of three loss functions, mentioned above:

$$E = \alpha E_d + \beta E_l + \gamma E_s \qquad (14)$$

In model building the authors of HumanShape used the following parameters: $\alpha=1$, $\beta=10^{-3}$, $\gamma=10^6$. Several iterations were performed, each having previous iteration component weights multiplied by some coefficients. In particular, the value of $\alpha$ remained unchanged, while the values of $\beta$ and $\gamma$ were reduced by 4 times. This optimization process continued until the condition $\gamma \geq 1000\alpha$ was reached or until the error stopped decreasing from one iteration to another. In addition, an initialization stage was used where $\alpha$ was assumed to be equal to zero and the deformation was performed only by $E_l$ and $E_s$ functions.

Optimization of the loss function was performed a quasi-Newton optimizer LBFGS-B. The recalculation of the closest neighbors was performed between iterations, and the closest neighbor was considered to be successfully found if the angle between the vertices' normals did not exceed 60° and the distance between the vertices did not exceed 5 centimeters.

2.8.5. Model Pose Space

Further, in such models as HumanShape and SMPL, to describe pose space skeleton animation technique—Linear Blend Skinning (LBS)—is used for the template with applied shape parameters, In this case, the skeleton is fitted into the template, this skeleton is a tree of skeletal points (joints), where each joint is characterized by its position in space and represents the point of articulation of "bones" of the skeleton (see FIG. 10, where the color shows the influence of each joint on the model vertices). The use of this character animation technique makes the model compatible with most 3D model animation and processing software.

More specifically, the LBS technique requires a weight matrix $\mathcal{W} \in \mathbb{R}^{n \times k}$, where n is the number of vertices in the model and k is the number of joints. This matrix describes the degree to which the transformation of individual joints affects a particular vertex. The position of skeletal joints is described by the matrix $J \in \mathbb{R}^{k \times 3}$. The transformation of each joint is described using the axis and angle of rotation relative to the joint ancestor in the skeleton tree. Let $$\frac{\vec{Q}_j}{\|\vec{Q}_j\|}$$

be the axis around which the j-th joint will rotate, $\|\vec{Q}_j\|$-rotation amplitude, then the rotation matrix for the j-th joint can be described using the Rodrigues' formula:

$$\exp(\vec{\theta}_j) = I_3 + \hat{\theta}_j \sin(\|\vec{\theta}_j\|) + \hat{\theta}_j^2 \cos(\|\vec{\theta}_j\|) \qquad (15)$$

where $I_3$ is a single matrix, and $\hat{\theta}_j$ is a vector $\vec{Q}_j$ recorded as a skew-symmetric matrix. Such matrix describes only the "local" transformation of the joint position, without considering the influence of all joints along the path from the skeleton tree root to the current point. Global transformation matrices can be calculated using the following formula:

$$G_k(\vec{\theta}, \mathcal{J}) = \prod_{i \in A(k)} \begin{bmatrix} \exp(\vec{\theta}_k) & J_k \\ 0 & 1 \end{bmatrix} \qquad (16)$$

where $G_k(\vec{\theta}, J)$ is a global transformation matrix for k-th joint, A(k) is an ordered set of all ancestral joints for k-th, in order from skeleton root, joint, $\exp(\zeta_k)$ is local rotation matrix for a joint calculated by formula (15), $J_k$ is initial position of a joint. Then the transformation for each vertex is described by a convex combination of transformation matrices of individual joints:

$$v'_1 = \left( \sum_{j=1}^{k} w_{ik} \cdot G_k(\vec{\theta}, \mathcal{J}) \right) v_i, \; w_{ik} \geq 0, \; \sum_{j=1}^{k} w_{ik} = 1 \; \forall i \qquad (17)$$

The greater the weight of a joint for a particular vertex, the greater its influence on changing its coordinates. Usually it is assumed that only the nearest joints have an influence on the vertex, while the joints farther away from the vertex have zero weight. This makes it possible to store the weight matrix in a sparse form. Thus, in HumanShape and SMPL models, the vertex is influenced by no more than 3-4 joints.

Encoding pose transformations using the Rodrigues' formula requires 3 parameters per skeleton joint (the normalized vector represents the rotation axis and its norm represents the amplitude). The skeleton of the SMPL model contains k=24 joints and therefore the human pose is encoded using 3×24=72 parameters. The HumanShape model allows the skeleton bones to rotate only around the axes defined in the model, which are defined in the S-SCAPE construction. It defines k=15 unique skeletal joints, but for some of them (e.g., femoral and shoulder joints) rotation is possible around several axes. The local rotation matrix for them can be obtained by multiplying the matrices for each axis derived from the Rodrigues' formula (15).

Changing the parameters of human body shape leads to changes in the position of skeletal points. Using the LBS technique with incorrect joint positions can lead to significant artifacts, such as in the HumanShape model (see FIG. 11). In HumanShape model, the authors suggest recalculating the positions of skeletal points using the matrix $L \in \mathbb{R}^{k \times n}$, $L_i = \min\{W_i, W_{p_i}\}$, where $W_i$ is the i-th column of the LBS weight matrix, $p_i$ is the ancestor of the i-th joint in the skeleton, and $\min\{\bullet, \bullet\}$ is the operation that takes the element-wise minimum. The coordinates of the joints are recalculated in the following way:

$$\mathcal{J} \in \mathbb{R}^{k \times 3}, \mathcal{J} = \frac{L^T \cdot V}{\sum_{i=1}^{n} L_i}$$

The authors of the SMPL model use a similar approach, but the L joint position regressor matrix is selected during the pose space construction, together with the weight matrix $\mathcal{W}$. This approach shows better results, ensuring that there are no such artifacts.

2.8.6. Pose Normalization

Performing PCA decomposition on multiple registrations without any changes will result in a large variance caused by pose changes entering the shape space. Therefore, before performing the decomposition, it is necessary to normalize the pose of each registration from the data set, resulting in a standard one. Such standard poses may be, for example, the A-pose or T-pose. The A-pose of a person is characterized by arms slightly set apart, feet shoulder-width apart and it is used more often, for example, during the measuring of anthropometric parameters of a person for clothing production. This pose is used as a standard in the HumanShape model. In the T-pose, a person stands with arms outstretched to the sides and feet shoulder-width apart. This pose is more typical for software related to 3D graphics and animation; it is used by the authors of SMPL.

As at the stage of building the SMPL model shape space, the pre-constructed pose space is used, during the model registration there is a possibility to find pose parameters quite accurately, and consequently, to restore an initial pose of registration. HumanShape model uses NRD algorithm to refine the registration process, as a result of which the pose can change significantly. To normalize the pose, the authors use the method proposed by Wuhrer et al. [B21] which is based on optimizing localized Laplace coordinates of an averaged body shape.

2.9. Proposed Approach to Building a Parametric Model

While virtually all approaches to parametric model building require a data set containing three-dimensional images of the same person's body in different poses, the goal of proposed approach is to describe the possible process of model building under conditions of a limited data set. The proposed approach allows to refine the shape space of the existing parametric model based on the set of three-dimensional images, where each person is present only once. In addition, the proposed process has a high speed, it is easily scalable when new data appear, as it does not require manual marking of additional information, such as the position of landmarks.

At first, preliminary processing of the three-dimensional image is performed, then initialization of registration with the help of the parametric model, then refining of registration with the NRD algorithm, then normalization of the template pose.

2.9.1. Preliminary Data Processing

One of the problems of the available dataset is an occurrence of noise geometrical structures inside a human body model if a person moved during scanning. Such structures can cause errors in the nearest neighbors search during NRD algorithm work and lead to registration defects. That's why the stage of preliminary data processing includes filtering of such geometrical structures. It often turns out that such structures on three-dimensional images lie in separate connected components if a 3D model is presented as a graph. More formally, let there be an undirected graph $G = (V, E)$, where V is a set of vertices corresponding to the vertices of a three-dimensional image of a human body, E is a set of edges. Let's say that an edge exists in case there is a triangle belonging to the surface of a three-dimensional image, the side of which connects these two vertices. In this case, having started search in depth on such graph, it is possible to obtain the list of connected components. Connectivity component with the largest number of vertices will be the result of filtering.

In some cases, this may not be enough. Such structures may actually be inside the body, but they are part of a closed body surface. An example of such a case is shown in FIG. 12, where the noise is marked in yellow and green. In this image there is a geometrical structure (A, highlighted with green color), which falls into a separate connected component of the graph, and therefore it can be removed using the algorithm described above.

In addition, there is a noise structure that is part of the left shoulder surface (B, highlighted in yellow). If such a structure is a part of a body surface of the person, then it cannot be filtered by the classical algorithm for checking the location of a point inside of a nonconvex shape that carries out calculation of number of crossings of an arbitrary ray released from the checked point.

The following approach is proposed for filtering such noisy vertices and triangles. The algorithm determines the visibility of each point for the observer. For this purpose, the model depth map is drawn from different angles and the distances from the camera to the point are compared to the depth map value.

More technically, let $\vec{c}$ is the camera's position in space, $\vec{c}_n$ is the camera's normal (i.e., its direction), $\theta_t \in \mathbb{R}^3$-rotation angle of the filtered 3D model at the current step t, $v_i$ is position of model vertices at the current step.

(1) The model is drawn into a depth map. This way the map $D \in \mathbb{R}^{N \times M}$ is obtained, where N×M is the drawing resolution. Let $\hat{v}_i$ be the projection position of point $v_i$ in the projection plane. Then $d_{ij}$ is the distance from $\hat{v}_i$ to $v_i$. An example of a depth map is shown in FIG. 13, where the color indicates the distance to the point and the scale is in meters. Thus, the depth map is the data on the distance from the camera projection plane to the model surface.

(2) The value $d_i = (\hat{v}_i - \vec{c}, \vec{c}_n)$ is calculated, which is the distance from the vertex to the corresponding point on the projection plane. If the obtained value of $d_i$ is greater than the corresponding value on the depth map, this means that the point is invisible from this angle.

(3) If the point is visible from at least one point of view, it is assumed to be visible.

The rotation angles of the model can be selected randomly. In the proposed approach, each of the three rotation angles on a linear grid from 0 to $2\pi$ in steps $\pi/10$ is used iteratively.

This algorithm allows filtering out all the invisible vertices that are inside a three-dimensional image of a person, which means they are noise.

Next, the 3D image is rotated around the y axis so that the person is facing the z axis. This is necessary for good initialization of registration by the algorithm described in the next section of the description.

Let $y_{min}$, $y_{max}$ be the minimum and maximum coordinates on y axis among all points of the rotating 3D model and $h=y_{max}-y_{min}$ be the model height. Then, after filtering out all points whose height meets the condition $y_i<y_{min}+0,03h$, the biggest part of the set will consist of vertices belonging to human feet. Then clustering into two components is performed using the KMeans algorithm. The resulting $c_{low1}$ and $c_{low2}$ centroids are the centers of human feet. If we take the area of points above, for example, $Y_{min}+0.09h<y_i<y_{min}+0.12h$, then such an area will contain the lower part of the human foot. Similarly, using the KMeans algorithm, one can find the centroids $c_{high1}$ and $c_{high2}$. Now we need to find the angle of rotation so that the lines passing through $c_{low1}$, $c_{low2}$, and $c_{high1}$, $c_{high2}$ are perpendicular to the z axis, and the line $c_{high1}$, $c_{high2}$ has smaller coordinates of z.

2.9.2. Initialization of Registration Using the Parametric Model

At this stage, the three-dimensional image registration is approximated using a parametric model. HumanShape and SMPL parametric models were tested for this purpose. For the parametric model the shape parameters $\vec{\beta}$, pose parameters $\vec{\theta}$ as well as general transformation parameters, such as translation $\vec{t}$ and the scale ratio s, are found.

The calculation graph of the initialization of registration by the parametric model is presented in FIG. 14, which shows a step-by-step application of shape and pose parameters, with a preliminary recalculation of the coordinates of the skeletal joints, and then with the application of common transformation parameters such as scaling and translation. A loss function based on the standard deviation from the nearest vertices is then calculated.

In this approach, the standard deviation between the vertices of the target point cloud and the nearest vertices of the parametric model is used as a loss function. Recalculation of the nearest vertices of the template is performed at each iteration of the gradient descent, but it is considered as a non-differentiable function. The nearest vertex is considered constant within one iteration of the descent. In FIG. 14 a visualization of the calculation graph is shown. If a typical pose is known for the models in the dataset, it is possible to initialize the parameters of the parametric model pose accordingly, as well as to introduce a regularization to the pose parameters:

$$\text{loss} = \sum_{i=1}^{n}(v_i - NN_T(v_i))^2 + \lambda\sum_{i\in I}\|\theta_i\|^2 \to \min_{\vec{\theta},\vec{\beta},s,\vec{t}} \quad (18)$$

where $v_i$ is the position of the i-th vertex in the three-dimensional image, T is the set of template vertices, $NN_T(v_i)$ is the coordinate of the vertex closest to $v_i$ from T, $\lambda$ is the regularization coefficient, I is the set of numbers of joints subject to regularization, $\vec{\theta}$ is pose parameters, $\vec{\beta}$ is model shape parameters, $\vec{t}$ is model translation relative to the origin, s is model scale.

The Adam gradient optimizer is proposed to perform the optimization. To accelerate the convergence rate and to avoid local minimums, the following optimization technique is proposed.

(1) Perform n iterations of the gradient descent using the Adam optimizer, optimizing the loss function only with regards to transformation parameters.

(2) Perform n iterations of gradient descent using the Adam optimizer, optimizing the loss function with regards to pose parameters only.

(3) Using four optimizers, produce 10 gradient descent steps using each optimizer (in the following order: pose, shape, transformation, all parameters) until the required level of convergence is reached or until 4n iterations at this step are performed.

In this approach the value n=100 is used. Since the values of parameters $\beta_i$, $\vec{t}$ can be quite large, they've had a scaling multiplier applied. An important factor is the selection of learning rate values for each of the optimizers. These values are shown in Table 1 below.

2.9.3. Modification of Non-Rigid Deformation Algorithm

Implementation of NRD algorithm performed during this work has the following features:

- the original algorithm uses quasi-Newton LBFGS-B as the optimizer, while the proposed approach uses Adam gradient optimizer. The following criterion is used as a criterion for stopping gradient descent at each of the iterations: stopping occurs if during the patience of the iterations there is no improvement of the loss function more than on tolerance or the maximum number of steps max_iter is reached;
- In the original implementation of the NRD algorithm, the vertex normals are calculated as the normal of a randomly selected adjacent triangle. In the proposed approach, the full calculation of normals is performed: the normal is determined by averaging all the normals of the triangles adjacent to the vertex;
- since most laser three-dimensional images contained gaps of points related to the feet, their optimization was prohibited in the original algorithm of the authors of HumanShape model. The collection available to the authors of this work does not contain such artifacts, so their optimization was allowed.

The authors of HumanShape model presented the results of registrations on the CAESAR dataset, which allowed to calculate for each triangle of the template its average area for all registrations. The presence of large triangles does not allow to make the surface of the human body on the registration smooth, and does not allow to capture small details. Therefore, n of the largest triangles of the template were divided into four parts by adding new vertices to the middle of each side of the triangle.

The function of losses in the initial algorithm optimizes the positions of the vertices without taking into account that the obtained point cloud forms the surface. As a result, the coordinates of the template vertices were eventually selected precisely, but when they were connected to the surface by triangles, there were relief defects—very sharp drops, troughs and hillocks.

To account for the features of the surface formed by the template, a new component has been added to the loss function, which penalizes too large angles between the normals of neighboring triangles:

$$E_{normal} = \frac{1}{|edges|} \sum_{(i,j) \in edges(T)} F(\widehat{n_i, n_j}) \quad (19)$$

where |edges| is the number of edges in the template, edges(T) is the set of edges in the template, $n_i$ is the vector of normal for triangle i, $\widehat{n_i, n_j}$ is angle between normals, $F(\bullet)$ is the activation function to the value of the angle.

The following function was used as an activation function (see also FIG. 15):

$$F(\alpha) = \begin{cases} \dfrac{\alpha^3}{90^3} & 0° \leq \alpha \leq 90° \\ 0.5 + \dfrac{\alpha}{180} & \alpha \geq 90° \end{cases}$$

The use of a higher quality method of registration initialization made it possible to avoid use of anthropometric points in the work of NRD algorithm. This made it possible to achieve full automation of the proposed NRD method. The new loss function minimized during the algorithm is as follows:

$$E = \alpha E_{data} + \gamma E_{smooth} + \beta E_{normal} \quad (20)$$

2.9.4. Pose Normalization

At the registration initialization stage the pose parameters were selected by the parametric model for the SMPL model. Then, as the result of NRD algorithm application, the human pose could change a bit if the pose parameters were chosen inaccurately. In this case it is necessary to refine the pose by optimization:

$$\sum_{i=1}^{n} (T_{nrd,i} - T_i)^2 \to \min_{\vec{\theta}} \quad (21)$$

where $T_{nrd,i}$ is the position of i-th vertex of the template, obtained as a result of registration with the NRD algorithm, $T_i$ is the position of i-th vertex of the parametric model.

Based on the obtained parameters of the pose, it is possible to calculate Linear Blend Skinning matrices, and then, after calculating the reverse, to multiply by the coordinates of the $T_{nrd}$ vertices. Thus, registration in the initial pose will be obtained. The initial pose for SMPL model is T-pose, when the human hands are extended to the sides and feet are shoulder-width apart.

The HumanShape model has a leak of pose to the shape parameters, i.e., changing the shape parameters causes a change in the parametric model pose. This leads to the fact that the initial pose for the parametric model changes with the changes in the shape parameters. Therefore, the approach described above is not applicable for the model based on HumanShape. Here, it is proposed to correct this effect by drawing the skeleton in a neutral pose, and then, by optimizing the skeleton points positions:

$$\sum_{i=1}^{k} (J_{nrd,i} - \hat{J}_i)^2 \to \min_{\vec{\theta}_{nrd}} \quad (22)$$

where $\hat{J}_i$ is the position of the i-th joint of the built skeleton in A-pose, $J_{nrd,i}$ is the position of the i-th joint of the registration skeleton obtained with the help of NRD algorithm. Here, optimization is performed by the parameters of the registration pose obtained with the help of NRD algorithm.

2.10. Experimental Study

The conditions of experimental approbation of the proposed approach are described below.

2.10.1. Data Set Used

As an initial set of three-dimensional images, the collection obtained with Texel Portal human body 3D scanner was used. The scanner has high accuracy with scanning error of about 1.4 mm. A set of 500 3D images of people containing approximately the same number of male and female 3D models was selected for experiments. The obtained images were highly detailed and contained 250000 vertices and 500000 triangles each.

In addition, to test and compare the quality of the obtained parametric model, the CAESAR data set was used, CAESAR is a set of three-dimensional images used by the authors of SMPL and HumanShape parametric models for building the pose space. It contains three-dimensional images of 4394 different people, each represented in three poses. Only pictures of a person standing in an A-pose were used. No additional meta-information, including information about positions of key anthropometric points (landmarks), was used during the registration process.

2.10.2. Implementation of the Registration Initialization Algorithm

Initialization of registration using the parametric model is an important part of the proposed approach of registration of three-dimensional images. The quality of obtained vectors describing the parametric model shape space depends on the quality of execution of this stage. If the pose parameters are chosen incorrectly during initialization, then incorrect vertices of the three-dimensional image will be chosen as the nearest neighbors during the implementation of NRD algorithm, and functional matching of the template vertices will be broken as the result. Optimization task (18) is a complicated task with many local minima. In order to avoid getting the Adam optimizer to the local minima, it is important to find appropriate learning rate values. The values of the parameters used in this work are shown in Table 1.

TABLE 1

|  | SMPL | HumanShape |
|---|---|---|
| Multiplicator $\vec{\beta}$ | 2 | 10 |
| Multiplicator $\vec{t}$ | 3 | 3 |
| Optimizer $\vec{\beta}$, lr | 0.01 | 0.005 |
| Optimizer $\vec{\theta}$, lr | 0.005 | 0.005 |
| Optimizer $\vec{t}$ and s, lr | 0.01 | 0.01 |
| Optimizer for all parameters, lr | for $\vec{\beta}$: 0.01<br>for $\vec{\theta}$: 0.005<br>for $\vec{t}$ and s: 0.01 | 0.005 |

Since the templates of the used parametric models contain a small number of vertices (SMPL template contains 6890 vertices, HumanShape template contains 6449 vertices), it is not necessary to use all vertices of a 3D image at this stage. In the proposed approach, a set of 7000 vertices of the original 3D image was randomly selected before optimization. Then the optimization task (18) was solved for the obtained set of vertices.

Since the approximate pose of all people on the available set of three-dimensional images was known, the parametric model was initialized by the A-pose, while the head and feet joint rotations were regularized using the value λ=10.

2.10.3. Testing of Non-Rigid Deformation Algorithm Implementation

Since the new data collection does not contain information about the confidence of the scanning unit in the position of the vertices of three-dimensional images, corresponding weighting coefficients of the formula (13) were set for all vertices equal to 1. The previously described criterion with values of parameters patience=70, tolerance=$10^{-2}$ and the maximum number of gradient descent steps per iteration max_iter=300 was used as the stopping criterion.

During the search for the nearest vertices, it was considered that the nearest neighbor was found successfully if it is not more than 3 cm away, and the angle between the vertex normal of the 3D image and the vertex normal of the parametric model is less than 45°. Optimization of the template vertices position during the initialization by SMPL parametric model was prohibited, because in many of the three-dimensional images fingers are curled up into fists, while SMPL parametric model has a straight palm.

Head template vertices position optimization was also prohibited, because majority of three-dimensional images contain voluminous haircuts that distort the shape of the head. The weights used for the loss function (20) are shown in Table 2. Loss function parts weight reduction coefficients are shown in table as $r_\alpha$, $r_\beta$, $r_\gamma$.

TABLE 2

| | SMPL | HumanShape |
|---|---|---|
| α | 1 | 1 |
| β | 300 | 1000 |
| γ | 2·10^7 | 2·10^7 |
| $r_\alpha$ | 1.0 | 1.0 |
| $r_\beta$ | 0.75 | 0.75 |
| $r_\gamma$ | 0.25 | 0.25 |

FIGS. 16-18 shows the comparison of the results of the proposed modification of NRD algorithm and the original algorithm [B15] on the three-dimensional image from the CAESAR set. From left to right there are presented: the proposed improved version of NRD, the original three-dimensional image and the original version of NRD. Three-dimensional image contains gaps—areas with missing data. The algorithm's quality was determined by the distance from the vertices of the obtained registration to the vertices of the three-dimensional image. On FIGS. 16-18 each registration vertex color indicates distances to the nearest vertices of three-dimensional image. White color means zero deviation, and red color means deviations of 15 mm and more. In this experiment during operation of the proposed algorithm the number of vertices in a template did not increase.

Better results are obtained for most of the body surface, as indicated by the lighter areas of the surface. The advantage of the proposed algorithm is especially noticeable on the relief of the upper back and abdomen. Vertices of feet are displayed in red, because the initial 3D image has defects of scanning in this area of a body. There are almost no vertices corresponding to the feet on it. Vertices of hands also have high registration error here as in the initial 3D image fingers are straight, and on a template they are curled up into fists.

In addition, a speed performance measurement was made. Initial implementation of NRD algorithm spends 235-239 seconds on registration building while the proposed implementation spends 7-8 seconds. Initialization of registration by parametric model lasts 26-29 minutes in the initial implementation of HumanShape authors, while the proposed implementation takes 13 seconds at this stage.

Effect of the new component (19) is illustrated in FIG. 19, where from left to right the results of NRD algorithm are presented: with original loss function, 25000 vertices in three-dimensional image; with original loss function, 250000 vertices in three-dimensional image; and modified loss function, 250000 vertices in three-dimensional image. It is possible to see that on the right image the surface of a body is smoother, and on the left image the surface of a body is angular, with relief drops which are not occurring in human body. Also, without use of the component (19), there are intersections of triangles of a body surface which are shown in the left image in black.

The registration process was performed for three-dimensional images in full resolution (250000 vertices), while the initial implementation of NRD algorithm [B15] randomly selected 19347 vertices of three-dimensional image and worked only with them. For construction of parametric model, the increase in number of vertices in a template up to 18000-19000 was used.

An example of a three-dimensional image used to build a parametric model, as well as the results of its registration based on the initialization by the parametric models HumanShape and SMPL are shown in FIG. 20, which presents a comparison of registration of the same three-dimensional image using different parametric models. From left to right: registration based on HumanShape (18659 vertices), initial three-dimensional snapshot (250000 vertices), registration based on SMPL (18890 vertices). The SMPL parametric model template gives better detail to the head, fingers and toes, so registration based on this parametric model appears to be more realistic. However, registrations based on both parametric models—HumanShape and SMPL—have relatively small deviations from the original images.

The authors of HumanShape model use in their work the distance from the points of the template to the nearest points of the three-dimensional image as the metric of registration success. This metric reflects the quality of three-dimensional image approach by the template point cloud. The relief of the surface formed by the template is not considered. To consider the surface relief of the obtained registration the following metric is proposed:

$$err_i = \min_{t \in T_s} d(v_i, t) \quad (23)$$

where $T_s$ is the set of all triangles of the template, t is the considered triangle of the surface, $v_i$ is the i-th vertex of the three-dimensional image, $d(v_i, t)$ is the distance from the vertex $v_i$ to the triangle t, $err_i$ is the deviation for the i-th vertex of the three-dimensional image.

Thus, in the formula (23) the distances from each vertex of the three-dimensional image to the surface of the 3D model, obtained as a result of registration, are calculated. It is proposed to calculate these values for each vertex of three-dimensional image, and then, for example, to group them by quantiles.

The results of registering the own data set are shown in FIGS. 21A-21B. In this graph, all deviations for one 3D scan were divided into quantiles, and then the values of individual quantiles are averaged over all three-dimensional images.

Orange color indicates registration results that are obtained using the HumanShape parametric model, and blue color indicates registration results obtained using the SMPL parametric model. A solid line indicates the results of registration initialization by the method described in section 2.9.2, and a dotted line indicates registration improvement, using the proposed modification of NRD algorithm.

FIG. 21A shows that SMPL parametric model approximates the body shape of people on existing three-dimensional images better than HumanShape parametric model. Use of the proposed modification of NRD algorithm gives a significant improvement of registration quality on both models. At the same time registrations based on SMPL parametric model also have better quality in comparison with registrations based on HumanShape parametric model.

Together with the software implementation of the algorithms, the authors of HumanShape posted the results of registration of CAESAR data set in the public domain. These registration results can be used to compare the quality of the algorithms directly. However, publicly available CAESAR registrations have a neutral pose. To conduct the experiment pose parameters were selected for each registration in accordance with three-dimensional images by minimizing the functional (18) only by $\vec{\theta}, \vec{t}$. The results of comparison with the method proposed in this paper are presented in FIG. 21B, where the blue color indicates the results of registration obtained by the proposed method, and the orange color indicates the results of registration obtained by the original method.

From the results of the experiments it can be concluded that the method of three-dimensional images registration, proposed in this approach, has significantly better quality and faster speed than the original method of the authors of HumanShape parametric model. The proposed method of increasing the number of vertices in the template allows describing the relief of the human body more accurately, taking into account the small details.

2.10.4. Results of the Parametric Model Construction

As described earlier, building a new shape space of the parametric model was carried out by performing PCA decomposition on the set of all available registrations. As a result, two parametric models (male and female bodies) were built based on SMPL parametric model. While the initial template of the SMPL model contains 6890 vertices, the templates of the obtained parametric models contain 18890 vertices. Since the addition of new vertices was made by adding the vertex to the middle edges of the template surface triangles, the Linear Blend Skinning vector of scales (formula 17) was calculated as follows: $w_i+w_j/2$, where $w_i$, $w_j$ are vectors of LBS weights for the vertices forming an edge. The position regressor of the skeletal joints remained unchanged, i.e., the influence of the new vertices on the positions of the skeletal joints was assumed to be zero.

During the PCA decomposition, eigenvalues $\lambda_i$ of the covariance matrix of the sampling are calculated. The squares of obtained eigenvalues $\lambda_i^2$ may be interpreted as the value of human body shape variance explained by parameter i. In such case, it is possible to calculate the share of the explained variance of the human body shape by the first k parameters (Explained Variance Ratio):

$$EVR@k = \frac{\sum_{i=1}^{k} \lambda_i^2}{\sum_{i=1}^{n} \lambda_i^2} \quad (24)$$

The graph of dependence of the EV R metric on the number of used components is shown in FIG. 22. Here the percentage of explained variance is calculated separately for the obtained male and female parametric models.

In FIG. 22 about 97.5% of the variance of body shape is explained by the first 10 parameters of the shape space. The use of 20 parameters can explain almost 99% of the variance. So, using 10-20 shape space parameters should be enough to describe any three-dimensional image of the human body. Thus, the obtained representation is really low-dimensional.

FIG. 23 shows a comparison of the initial pose and shape of the parametric SMPL model and the resulting parametric model for male and female bodies. It can be seen that the obtained parametric model is more detailed. In particular, the breast is smoother and more accurate, there are small details of body structure present, such as collarbones.

However, the head shape space of the parametric model was not refined in this work. During the work of the proposed modification of NRD algorithm the positions of the vertices were not changed. Such decision was made, because many original three-dimensional images of people contained voluminous haircuts that distorted the head shape as the result of NRD algorithm's work. As a development of this work it is proposed to add segmentation of hair and details of clothes on three-dimensional photos of people using information about color. The vertices of three-dimensional image related to the hair elements should have lower values of confidence in the loss function of NRD algorithm (formula 13).

Visualization of the result of changing the first four parameters of the shape with fixed other parameters of the obtained female parametric model is shown in FIG. 24.

Thus, the proposed modifications of NRD algorithm and initialization of registration with the help of parametric model allowed to fully automate the method. The proposed approach doesn't require using information about the position of key anthropometric points (landmarks), manual marking of which is an extremely time-consuming process.

Experiments have proven the significant increase in quality of registration of three-dimensional images of a human body in comparison with the initial algorithm [B15]. At the same time, the speed of the algorithm has increased significantly. Increased detail of the template allowed to reflect small details of the body relief on the registrations of three-dimensional images. Novel parametric model based on the parametric SMPL model, which is a human body shape space refinement on a new data set, was obtained.

2.10.5. Evaluation of Scan Results

Determination of degree of matching between the obtained three-dimensional model and the system's user represents a difficult problem, which is best resolved by comparison of result with the three-dimensional model of the user considered as a reference. To obtain 3D images 3D scanners, or the systems consisting of multiple synchronized RGB cameras, are used. However, there is a problem of obtaining images suitable as models to be tested in the task under consideration. Use of the 3D scanners designed for static objects is impossible in this case for two reasons: first, since the person cannot stand absolutely motionless, the artifacts distorting an estimation will appear in the 3D image, and second, even without considering artifacts of scanning which may not appear if scanning occurs quickly enough, the person cannot reproduce exactly the same pose in which he/she stood in the first frame of the sequence. Hence, to solve this problem it is necessary to use multi-camera systems. The system should obtain a three-dimensional image of a person at a moment when the depth sensor obtains the first frame of the sequence, what results in synchronization difficulties. Besides, it should be noted that such systems are not available everywhere because of their high cost and necessity of fine tuning.

Considering these problems, and due to the lack of publicly available sets containing the data necessary for the assessment, a tool has been developed to obtain a synthetic data set that is close to real world data. The tool obtains a three-dimensional image of a person created, for example, with a three-dimensional scanner. Before using this tool the skeleton is determined using the rigging technique. The tool then applies the skeleton animation, which is transferred to the image using the LBS skinning algorithm. After that for each frame of the animation the necessary data is generated: the depth map is rendered from the point of view of the virtual camera, the position of the key points of the skeleton is recorded. In addition, for each frame semantic segmentation is generated according to the following algorithm: the number of the key point is recorded in each pixel with the greatest influence on the performance of the skinning for those vertices that fall into this pixel when projected on the image plane. Once the generation is complete, Gaussian noise can be added to depth maps to simulate the errors produced by the real sensor.

The system provides the generation of all necessary data for the algorithm's work and generates a three-dimensional model of a person in a pose exactly coinciding with a pose in the first frame of the sequence, which makes it possible to make an accurate assessment. At the same time, the universal interface allows using arbitrary skeleton animation to test the algorithm with different user behavior. Examples of the generated data are shown in FIG. 40: from left to right are depth map, segmentation, key points, reference model.

The base created for experimental testing in this paper contains about 2000 frames with resolution of 420×880 pixels and added noise and consists of 4 video sequences reflecting different situations of the algorithm application:
- a person stands and makes small involuntary movements (breathing, hand movements);
- a similar scene with a rotation of 1° per frame;
- a person waves his/her hand;
- a person walks.

The first two sequences are designed to test a scanning scenario where a person tries to keep the same position, the subsequent sequences are designed to test a scanning scenario where a person has fast natural motion. The following two metrics were used to experimentally evaluate the algorithm, evaluating different components of the system:

$$L_{surface} = \frac{1}{|V|} \sum_{v \in V} |n_{s_v}^T (v - s_v)|$$

$$L_{model} = \frac{1}{2|M|} \sum_{v \in M} |n_{s_v}^T (v - s_v)| + \frac{1}{2|S|} \sum_{v \in S} |n_{m_v}^T (v - m_v)|$$

where V, S, M are the sets of vertices of the resulting surface, the reference surface and the surface of the parametric model with canonical parameters, respectively, $s_v$ is a vertex of S closest to the vertex v, $m_v$ is a vertex of M closest to the vertex v, $n_x$ is a normal to the surface at point x.

The first metric is an average value of distance from the vertices of the result to the surface plane of the reference model, the second is an average of similar distance metrics from the model to the standard and vice versa.

2.11. Creating a User's 3D Avatar

To visualize garments on a person, as well as for a more visual presentation of the results of the algorithm, it is proposed to create a 3D avatar of a person using data obtained during optical scanning. By 3D avatar we mean a three-dimensional textured model of a human body consistent with its anthropometric data. Texture extraction uses data from a color camera, processed together with depth maps at the user model creation stage.

To accelerate texture extraction, a deep neural network approach can be used as an alternative to the classic texture extraction method. The neural network approach allows you to quickly and with acceptable accuracy extract the texture of the user from one or more color images. Texture extraction uses a neural network trained on a set of matches between a user's photo and its texture. During the training, images of different people from different angles with a known texture map are submitted to the neural network input, and the error in restoring such a texture map is penalized.

In order to generate a realistic body texture, it is important to determine the skin tone from a photo or a three-dimensional head shot. In the case of a three-dimensional photograph, the face is rendered in full-face and the task is reduced to the case of a two-dimensional image. The algorithm for determining skin tone can be described in the following basic steps.

1. Preparation of a photo (scaling and cropping to 512×512 pixels) or rendering of a 3D model of the head to an image of 512×512 pixels.
2. Neural segmentation of the face using ready-made or newly trained models to highlight segments such as face skin, hair, neck, eyes, eyebrows, etc.
3. The generation of a face mask based on the results of segmentation.
4. Morphological mask erosion to reduce artefacts at the edges of the area
5. (Optionally) Applying a bilateral filter or Gaussian blur to the original image.
6. Selection of pixels from the original (pre-processed) image by mask and conversion of colors into Lab space.
7. Clustering of pixel colors in Lab space using K Means method with the number of clusters equal to 3.
8. The largest cluster centroid is taken for skin tone.
9. Texture coloring in the Lab color space while maintaining relative illumination of areas:
   - the average L across the texture is determined;
   - the average value of L is subtracted from the L component of each texture pixel;
   - to each pixel of texture, the L value of a certain skin tone is added;
   - The ab channels for each pixel of texture are taken from the skin tone.

3. Processing Scan Results and Building a User Body Model Based on Color Images

This section contains a brief description of the basic algorithm Human Mesh Recovery (HMR), proposed in the work "End-to-end Recovery of Human Shape and Pose" [B37], and reveals the proposed modifications as well. More details on the proposed approach can be found in [B33].

3.1 Human Mesh Recovery

The Human Mesh Recovery (HMR) algorithm [B37] is based on the SMPL parametric 3D human model [B39], but can work with an arbitrary parametric model. Section 3.1.1 contains a description of the HMR architecture and the method of restoring the 3D model parameters. To train this method, an adversarial training procedure is used, the main element of which is the discriminator network, the description of which architecture is presented in section 3.1.2. Section 3.1.3 contains a description of loss functions used to train HMR and discriminator neural network.

3.1.1 Algorithm to Restore Human Model Parameters

Consider the architecture of the Human Mesh Recovery (HMR) algorithm [B37] in detail, whose schematic is shown in FIG. 36. ResNet-50 v2 [B36] without fully connected layers, pre-trained on the task of classification ImageNet [B38], is used for extracting features from the input image. Algorithm 1 below describes the procedure of restoring SMPL 3D model parameters based on the extracted features. The features extracted from the image are linearly stretched into a vector of 2048 elements ($\phi \in R^{2048}$), which is concatenated with the standard parameters of the SMPL model ($\beta_0$—average shape parameters calculated from a collection of 3D images used to train the parametric model, and $\theta_0$—pose parameters corresponding to a person's T-pose: legs at shoulder width, arms extended to the sides at right angles to the body) and passed as an input to the iterative parameter recovery module (Regressor), which consists of two fully interconnected layers separated by a dropout and a fully connected layer producing an offset for the SMPL model shape and pose parameters ($\Delta\beta$, $\Delta\theta$).

| Algorithm 1. Iterative recovery of SMPL model parameters |
| --- |
| 1   $\phi$ = ResNet50v2(Image) |
| 2   $\beta_0, \theta_0$ = standart SMPL parameters |
| 3   for t = 1 ... T do |
| 4       $\psi$ = concat($\phi, B_{t-1}, \theta_{t-1}$) |
| 5       $\Delta\beta, \Delta\theta$ = Regressor($\psi$) |
| 6       $\beta_t = \beta_{t-1} + \Delta\beta$ |
| 7       $\theta_t = \theta_{t-1} + \Delta\theta$ |
| 8   end |
| 9   HMR(Image) := [$\beta_T, \theta_T$] |

3.1.2 Discriminators

The SMPL model parameters obtained by the neural network algorithm are passed to the several discriminator networks, the architecture of which is shown in FIG. 37. To determine the shape realism, one fully connected neural network with two layers is used, which takes a shape parameter vector as an input and estimates the shape parameters realism by outputting the number from 0 to 1. For pose parameters, 24 fully connected neural networks are used (one for each pose parameter and one for all parameters) with shared weights. First, a Rodrigues' rotation formula is used for the three pose parameters (direction of rotation axis and angle value) for each joint, converting the parameters into a matrix representation (rotation matrix) 3×3. After that the obtained view is passed as an input to two fully connected layers with the size 32 shared for all pose parameters, transforming the input vector into a common 32 dimensional embedding space. The resulting embedding vectors are passed as an input to 23 neurons that output predictions for each joint separately, and are also concatenated with each other and passed as an input to two fully connected layers of size 1024, the output of which is a prediction for all pose parameters together. The values obtained from all discriminators are concatenated, giving the output vector length 25, describing the realism of the predicted parameters of the 3D model.

3.1.3 Training

To train the algorithm, the authors suggested using a loss function consisting of four penalties. For each image algorithm outputs parameters of the pose and shape of the SMPL model ($\hat{\theta}$ и $\hat{\beta}$), discriminator prediction vector ($D_{pred}$=Disc(HMR(Image))), camera parameters, as well as the coordinates of the 3D human pose ($\hat{J}^{3d}$) extracted from the SMPL model based on predicted parameters. To model the camera, the authors use the weak perspective projection model, for which the following projection formula is correct:

$$x = s * \Pi(R*X) + t, \tag{25}$$

where $X \in \mathbb{R}^3$—the coordinates of a point in three-dimensional space, $x \in \mathbb{R}^2$—the coordinate of the projected point, $R \in \mathbb{R}^{3 \times 3}$—the global rotation predicted by the algorithm, $s \in \mathbb{R}$ and $t \in \mathbb{R}^2$—scale and shift vector in two-dimensional space, also predicted by the algorithm, and P—orthographic projection. Reprojection error with L1 norm is used to penalize for deviation of the predicted 2D pose from the reference one:

$$\hat{\mathcal{J}}^{3d} = s * \prod (R*\hat{\mathcal{J}}^{3d}) + t, \quad L_{reproj} = \frac{1}{N}\sum_{i=1}^{N}\sum_{j=1}^{N_{joints}} \left\| v_{ij} * (\mathcal{J}_{ij}^{2d} - \hat{\mathcal{J}}_{ij}^{2d}) \right\|_1, \tag{26}$$

where N—the number of examples, $N_{joints}$—the number of joints in the skeleton model, $v_{ij} \in \{0,1\}$—the visibility of the j-th key point of the i-th example (taken from the reference markup), $J_{ij}^{2d}$ and $\hat{J}_{ij}^{2d}$—the coordinates of the reference and predicted j-th key point of the i-th example. Also, if there is a 3D pose markup and SMPL model parameters, the corresponding penalties (MSE deviation for both parameter groups) are applied:

$$L_{3D\,joints} = \frac{1}{N}\sum_{i=1}^{N}\sum_{j=1}^{N_{joints}} \left\| \mathcal{J}_{ij}^{3d} - \hat{\mathcal{J}}_{ij}^{3d} \right\|_2^2, \tag{27}$$

$$L_{3D\,smpl} = \frac{1}{N}\sum_{i=1}^{N} \left\| [\beta; \theta]_i - [\hat{\beta}, \hat{\theta}]_i \right\|_2^2$$

Another penalty in the loss function is a penalty for the discriminator's predictions, aimed at making them as close to 1 as possible (i.e., for the discriminator to consider all the predicted parameters realistic):

$$L_{adv} = \sum_{i=1}^{N} (Disc(HMR(Image_i)) - 1)^2, \tag{28}$$

where $\overline{1} \in \mathbb{R}^{25}$—a vector of 1 that matches the size of the concatenated output of the discriminators. The general loss function for learning the HMR algorithm [37] is defined by the following formula:

$$L_{HMR} = \lambda(L_{reproj} + 1_{3D}[L_{3D\,joints} + L_{3Dsmpl}]) + L_{adv}, \tag{29}$$

where $\lambda$—the coefficient selected by the validation set, $1_{3D}$—indicator function equal to 1 only for examples with 3D poses and SMPL model parameters.

To train networks of discriminators, along with the predicted parameters of the SMPL 3D model, reference data obtained from marked data collections are used. The function of losses for training i-th discriminator is as follows:

$$L_{Disc} = \frac{1}{N_{gt}} \sum_{i=1}^{N_{gt}} (Disc([\beta; \theta]_i) - 1)^2 + \frac{1}{N_{pred}} \sum_{i=1}^{N_{pred}} Disc(HMR(Image_i))^2, \quad (30)$$

where $N_{gt}$—the number of examples from the reference collection, $N_{pred}$—the number of examples obtained from the HMR model.

3.2 Proposed Modifications of Human Mesh Recovery Algorithm

The proposed modifications of the Human Mesh Recovery method [37] are aimed at eliminating the drawbacks detected during the analysis of the basic algorithm. To improve the accuracy of the method, including improving the quality of human mesh recovery, an architecture modification (Section 3.2.1) and a modification of the training procedure (Section 3.2.2) are proposed.

3.2.1 Architectural Modifications

Human segmentation is a rather simple but informative representation that allows obtaining information about a person's shape. To increase accuracy of restoration of parameters of 3D model of a human shape and pose it is proposed to restore a segmentation map for the predicted 3D model and to use the obtained segmentation map for algorithm training.

Several modern methods use approximate differential rendering [B40] or trainable rendering [B41] to obtain a segmentation map based on a predicted 3D model, but this increases the time spent on training and complicates the training procedure itself. Instead, it is proposed to use a different approach similar to that used in some early two-step methods to reconstruct the parameters of a human 3D model, for example, in [B35].

Projection of the vertices of the mesh parametric 3D model to the original image is the easiest way to get a silhouette approximation (the resulting single-channel image contains a value of 255 in pixels, on which the vertices were projected, and 0 in all others). But without pre-processing this approximation is difficult to use, because there will be an empty space between the projected points, which when using a pixel penalty with a segmentation reference map will be treated as an algorithm error. In addition to the projection of vertices, it is proposed to calculate for the obtained single-channel image a distance transformation using the strikethrough distance (chamfer distance), which will result in a single-channel image, each pixel of which will contain the distance to the nearest projected point. Such a distance map will allow weighing the penalty in proportion to the distance. The schematic of the modified method and examples of vertex projection and distance map are shown in FIG. 38.

3.2.2 Training Procedure Modifications

Based on the calculated distance map (FIG. 39, $D^{pred}$) and the reference map of segmentation FIG. 39, $S^{gt}$) it is possible to obtain a map of the most distant from the predicted points of the reference map by elementwise multiplication of two maps (FIG. 39, $S^{gt} \otimes D^{pred}$). Thus we get a single-channel image, each pixel of which contains 0 in those areas where the reference class is the background, and for areas with human reference class—the greater the value, the farther from this pixel is the closest projected vertex of the predicted mesh parametric 3D model. Penalizing for high values in the distance map calculated in this way, it is possible to achieve reduction of the area of the human reference silhouette not covered by the predicted silhouette.

To achieve the opposite effect: to reduce the area of the predicted silhouette not covered by the reference silhouette, it is proposed to use the distance map (FIG. 39, $S^{pred} \otimes D^{gt}$), which is calculated from a predicted segmentation map (FIG. 39, $S^{pred}$) and a distance map for the reference map of segmentation (FIG. 39, $D^{gt}$), obtained in the same way as the distance map $D^{pred}$. Thus, the total result from the obtained distance maps can be expressed by the following formula:

$$(S^{pred} \otimes D^{gt} + S^{gt} \otimes D^{pred})^2, \quad (31)$$

where $S^{pred}$—the predicted segmentation map, $S^{gt}$—a reference segmentation map, $D^{pred}$—a distance map computed from a predicted segmentation map, $D^{gt}$—a distance map computed for a reference segmentation map, and the symbol $\otimes$ denotes elementwise multiplication. The visualization of the stages of formula calculation (31) is shown in FIG. 39.

The final expression for the proposed penalty based on segmentation is as follows:

$$L_{seg} = \frac{1}{N} \sum_{i=1}^{N} \frac{1}{H_i * W_i} \sum_{j=1}^{H_i} \sum_{k=1}^{W_i} (S_{ijk}^{pred} * D_{ijk}^{gt} + S_{ijk}^{gt} * D_{ijk}^{pred})^2, \quad (32)$$

where $H_i$ и $W_i$—height and width of the segmentation maps. The final loss function used to train the modified algorithm (HMR-seg) is as follows:

$$L_{HMR\text{-}seg} = \lambda(L_{reproj} + \mathbb{1}_{3D}[L_{3D\,joints} + L_{3Dsmpl}]) + L_{adv} + \gamma \mathbb{1}_{seg} \quad (33)$$

where $\gamma$—the coefficient selected on the validation set, $\mathbb{1}_s$—indicator function equal to 1 only for examples that have a segmentation markup.

4. Determination of a User's Body Anthropometric Parameters

Body anthropometric parameters determination algorithm of the user includes (a) reception of body measurements of the person and (b) estimation of body type of the person based on the fitted model and the 3D image.

4.1. Getting User's Body Measurements

Body measurements can be calculated by different methods: linear algebra methods, machine learning methods, combined methods. Body measurements calculation based on linear algebra methods are performed similarly to tape measurements methods, the only difference is that it is taken from three-dimensional representation of a human body. Machine learning-based algorithms are constructed based on the models trained on preliminary labeled data. Combined methods are implemented partly based on linear algebra algorithms, partly on machine learning algorithms. For example, preliminary anthropometric parameters are calculated using a three-dimensional image, which are then used to train the regression model.

It is also possible to use different methods to calculate different measurements, i.e., each measurement can be calculated by the method that gives the minimum error on the test sample.

4.1.1 Obtaining Body Measurements Using Linear Algebra Methods

Anthropometric parameters were determined based on numerical values, called measurements. At measurements implementation the following standards were considered: ISO 8559, ISO 7250, GOST 17522-72, GOST 31396-2009, OST 17-326-81 [23-30]. Often measurements from different standards are duplicated, sometimes measurement methods conflict with each other [B31]. In such cases, preference was given to ISO 8559. A total of 89 measurements were implemented, of which 25 were symmetrical, i.e., consisting of three measurements: right, left and medium. A complete list of Body Measurements (BM) is given in Table 3.

TABLE 3

| Body measurement number | Name of body measurement | Relevant body measurement as per ISO 8559 |
|---|---|---|
| 1 | Width of shoulders at the back | 5.4.3. Across back shoulder width |
| 2 (symmetr.) | Arm to wrist length | 5.7.8 Outer arm length |
| 3 | Distance from the neck to the waist at the back | 5.4.5 Back neck point to waist |
| 5 | Chest girth third | 5.3.4 Bust girth |
| 6 | Gluteal fold height | N/A |
| 9 (symmetr.) | Knee girth | 5.3.22 Knee girth |
| 10 | Hip girth at hip height | 5.3.13 Hip girth |
| 11 | Neck girth at neck base level | 5.3.3 Neck base girth |
| 12 | Stature | 5.1.1 Stature |
| 13 (symmetr.) | Thigh girth | 5.3.20 Thigh girth |
| 14 | Total crotch length | 5.4.18 Total crotch length |
| 15 (symmetr.) | Upper arm girth | 5.3.16 Upper arm girth |
| 16 | Waist girth | 5.3.10 Waist girth |
| 17 (symmetr.) | Wrist girth | 5.3.19 Wrist girth |
| 18 | Chest girth fourth | 5.3.8 Under bust girth |
| 21 (symmetr.) | Calf girth | 5.3.24 Calf girth |
| 22 (symmetr.) | Elbow girth | 5.3.17 Elbow girth |
| 26 | Distance from neck to waist in front | 5.4.8 Front neck point to waist |
| 30 (symmetr.) | Distance from the back of the neck base to the nipple point | 5.4.12 Back neck point to bust point |
| 31 (symmetr.) | Distance from the back of the neck to the waistline | 5.4.13 Back neck point to waist level |
| 32 (symmetr.) | Distance from waistline to floor at side | 5.4.22 Outside leg length |
| 33 | Distance from the base of the neck at the back to the level of the armpit. | 5.4.6 Scye depth length |
| 34 | Width of shoulders on the back in a straight line | 5.4.2 Back shoulder width |
| 35 (symmetr.) | Shoulder point height | N/A |
| 36 (symmetr.) | The width of the shoulder stingray | 5.4.1 Shoulder Length |
| 37 (symmetr.) | Side waist to hip | 5.4.21 Side waist to hip |
| 38 (symmetr.) | Knee-point height | 5.1.16 Knee height |
| 40 | Neck height at the front | 5.1.4 Front neck height |
| 41 | Neck height at the back | 5.1.5 Back neck height |
| 42 | Nipple point height | 5.1.7 Bust height |
| 43 (symmetr.) | Waistline height | 5.1.10 Waist height |
| 44 | Chest girth contoured | 5.3.5 Bust Girth Contoured |
| 45 | Chest girth second | 5.3.6 Chest Girth |
| 46 | Chest girth first | 5.3.7 Upper chest girth |
| 47 (symmetr.) | Collarbone height | N/A |
| 48 (symmetr.) | Neck base point height | N/A |
| 49 (symmetr.) | Hip height | 5.1.13 Hip height |
| 50 (symmetr.) | Distance from neck base from side to nipple point | 5.4.10 Side neck point to bust point |
| 51 (symmetr.) | Ankle girth | 5.3.25 Minimum leg girth |
| 53 | Distance between nipple points | 5.2.3 Bust point width |
| 54 (symmetr.) | Distance from the base of the neck at the side to the waistline | 5.4.11 Side neck point to waist level |
| 55 (symmetr.) | Distance from the back of the neck to the wrist | 5.4.17 Back neck point to wrist |
| 56 (symmetr.) | Arm width at armhole level | 5.2.4 Arnnscye front to back width |
| 80 (symmetr.) | Crotch height side | 5.1.15 Inside leg height |
| 86 (symmetr.) | Leg length from heel to crotch | 5.7.6 Inside leg length |
| 87 | Mid-neck girth | 5.3.2 Neck (middle) |
| 88 | Torso height | 5.7.3 Torso height |
| 89 | Distance from neck to hips at the back | N/A |

Each measurement is implemented as a separate function and is based on one of the functions of measurements of the given type. Each measurement can be carried out both on a three-dimensional image, and on the fitted model of a human body. Measurements on a three-dimensional image are the closest to measurements in reality, and it is assumed that their values give more accurate results. Sometimes on three-dimensional images there are scanning artifacts, which are manifested in the hands sticking to the body or legs sticking to each other at crotch. In such cases, it is more convenient to determine some measurements by model, such as thigh girth, upper arm girth and others. Sometimes a person is scanned with long loose hair and it is not possible to obtain some measurements, such as neck thickness, only from a three-dimensional image. In this case, the model is also measured.

To get the measurements one needs to call the method get all measurements of Measurements class. The proposed method calculates all measurements listed in measurement_functions dictionary. Each field of the dictionary contains one measurement, as well as parameters model_cut and dependencies. Parameter model_cut specifies a point cloud, which should be measured—a three-dimensional image or model, and the parameter dependencies specifies the list of measurements, on which this measurement depends. Before making a measurement, it is checked whether the measurement has dependencies, and if so, then measurements on which the measurement depends are recursively performed first. This method allows saving time on performing measurements that partially coincide with other measurements.

As a result, at the output of the get_all_measurements method, a dictionary is formed with the results of measurements and visualizations of measurements in three-dimensional space.

Thanks to the parametric model, which has the property of functional reduction of vertices (the same vertices are in the same places of a human body for all three-dimensional images), anthropometric points were marked directly on the model. In other words, each anthropometric point used in the measurement algorithm was matched with a point on the model with a fixed index.

The measurements are divided into four types:
(1) heights (relative to floor level);
(2) distances (between two given points);
(3) girths;
(4) distances on body surface.

4.1.1.1 Heights

Body measurements of this type correspond to the distances from fixed levels on the human body to the floor level. To measure each body measurement from this group one anthropometric point corresponding to body measurement is used.

In addition to all height measurements, a correction for the human posture is applied. The standards describing the measurement process of this body measurement group assume that a person stands by placing his or her legs together, while the implemented algorithm uses three-dimensional images of the person in the A-pose, where the legs are placed on the shoulder width and the arms are straight and at an angle of about 20 degrees from the torso.

The following algorithm is used for correction. The leg angles to the vertical are calculated based on the joints of the model "right thigh", "right ankle" and "left thigh", "left ankle". The correction value for each leg is then calculated as the difference between the actual length of the leg and its projection to the vertical axis. For all points above the hip level, the measurement is corrected by a fixed value equal to the mean value of the correction for both legs. For points below the hip level, the measurement value is corrected by a smaller value according to the graph in FIG. 25. The visualization of this type of measurement is the coordinate of the point (FIG. 26).

4.1.1.2 Distances

The distance between two anthropometric points is calculated by the known formula as the root of the sum of the squares of the coordinate differences. The visualization of this type of measurement is two points connected by an edge (FIG. 27).

4.1.1.3 the Girths

This anthropometric parameter corresponds to length of the flat convex contour located at the certain level of a body or passing through the set of anthropometric points. On a human body it is measured by a measuring tape.

The following algorithm is used to determine this body measurement type. The plane in which the tape should lie to obtain the desired girth is determined. A point cloud cross section of a given plane is made. The result is one or more convex contours. For example, if the point cloud is crossed by a plane at waist level, you will get three contours: the waist and two hands. To select the desired contour one has to use the distance from the contour to the given point and then has to select the contour with the minimum distance. After selecting the contour, a convex contour is drawn on the selected contour, simulating the measuring tape approach. The length of the convex contour will be the desired girth value.

In the function of "girth" type measurement the possibility of specifying the necessary number of contours at the section is implemented. If the number of contours is smaller or larger, the plane is shifted by a small value until the number of contours is equal to the specified value. This allows to increase the accuracy of plane selection and avoid additional errors. For example, this functionality is used to search for chest girth when the plane can pass just above the armpits. Then the selected contour will capture the shoulder and thus give an inflated result. In this body measurement, the required number of contours is set to three. The visualization of this type of measurement is a set of points on the convex contour, connected with each other by edges (FIG. 28).

4.1.1.4 Distances on Body Surface

To measure this measurement on the human body it is necessary to connect two or more anthropometric points (in series) on the body surface with a measuring tape and calculate the resulting length.

The body measurement implementation algorithm of this type in the proposed method can be broken down into several steps (FIG. 29). The first two steps of this type of measurement and the measurement of the "girth" type are similar, but the next steps are different.

The point cloud is crossed by a plane, resulting in one or more contours. If the contours number is smaller or larger than the specified number, the plane is shifted by a small amount until the number of contours is equal to the specified number.

2. When several contours were obtained, the C contour closest to the middle_point is selected.

3. The contour is divided into two parts by the end points point 1 and point 2.

4. The distance from each contour part to the point middle_point is compared, the closer part of the contour to the point L (line) is selected.

5. The convex contour CH (convex hull) is built on the selected part of the L contour.

6. The convex contour CH is divided by the end points point 1 and point 2 into two parts, one of which will be on the outside of the body and the other on the inside of the body.

7. The part of the convex contour external to the body is selected. To determine this, a special method has been developed, which is described below.

A method for determining the external part of the convex contour is as follows: each point of the convex contour corresponds to one of the line points. Determine the point on the convex contour CH corresponding to one of the end points of the line L. Then it is checked if the neighboring points on the convex contour are equal to the neighboring points on the line. On the other side where they are not equal (at least for one side they will not be equal), the "jump" of the convex contour over the line points occurs, i.e., the corresponding segment of the convex contour is on the same side of the line. Therefore, it is further checked if the middle of the given segment (HI) is outside the C contour or inside it. If it is on the outside, the part of the convex contour CH to which the segment belongs is on the outside of the body and is searched. If it is inside, the second remaining part of the convex contour is searched for. The visualization of this type of measurement is a set of points of the selected segment of the convex contour, connected with each other by edges (FIG. 30).

4.1.2 Measurement Results Correction

It may turn out that some anthropometric points are not quite accurate. This can increase an error of measurements results obtained by methods of linear algebra.

To minimize this effect, it is proposed to use the measurement correction method. This requires a database of three-dimensional images of people and manually measured body measurement values. For each body measurement, the average value of the algorithm minus manual measurement values is determined. Then, for each measurement, a correction is made to compensate for the average error value.

This method allows you to reduce the average measurement errors by about 40-60%.

4.1.3 Obtaining Body Measurements Based on Machine Learning Methods

It is proposed to use a regression model. Training of the model is as follows. At first the model of a human body which has parameters of a shape and a pose is fitted to a three-dimensional image of the person. Then the regressive model providing transformation from model parameters to body measurement values is trained.

To obtain measurements of a person it is necessary to fit the model of the human body to his/her three-dimensional image and, using a trained regression model, to obtain the desired measurements.

The model was trained using data from the CAESAR digital image database, which includes more than 4000 3D images of people from different regions. For each person in this database there was a set of measurement values measured manually from the human body.

The advantages of this method are the speed of measurement determination, but the disadvantages include the dependence of measurement accuracy on the size of the training sample, and the limited number of measurements by those presented in the training sample.

4.1.4 Obtaining Body Measurements Based on Combined Methods

These algorithms can be implemented in various ways. The general idea is that at first methods of linear algebra obtain certain intermediate anthropometric parameters which then are used for target measurements calculation.

Intermediate anthropometric parameters can be, for example, the girths of a human torso or another part of a three-dimensional image made at different heights and angles to the floor plane. Other variant of intermediate anthropometric parameters can be distances between points of intersection of a line and a contour of a human body projection on one of vertical axes.

Further, the set of intermediate parameters can be processed both by methods of functional analysis (search for maximum, minimum, kink points, etc.) and by machine learning methods.

4.1.5 Determination of User's Anthropometric Parameters Through Questionnaires As an alternative to the methods described above, it is possible to determine the anthropometric parameters of a user by completing a questionnaire. This method can be implemented as an application on a smartphone, as a service on a website or in another way. Questions can be about height, weight, age, body shape or any other anthropometric parameters. Answers can be entered as a real number or by selection of one of several options. Also, optionally the user can add one or several photos of a body to the input data.

The data entered in the questionnaire are transferred to a special module, which calculates anthropometric parameters of a person based on this input.

The task of this module is to determine unknown anthropometric parameters of the body based on the entered parameters. This task can be solved by using statistical models. For example, knowing gender, height, weight, and body shape, it is possible to construct the most probable model of a user's body for such parameters to which certain anthropometric parameters will correspond.

The model can be built using regression analysis methods, classification and clustering methods, as well as deep learning or mixed methods.

Qualitative characteristics of a person may be asked as questions with several answers, e.g., back bend (the level of slouch), body muscle and fat ratio (athletic build, normal build, obese build), etc.

If the user considers that the result anthropometric parameters are incorrect, he/she can leave a feedback by entering the correct values of these parameters in the special form. The feedback can be used for a more precise adjustment of the module, considering the real statistics about users.

The incoming data may include both continuous and discrete values, as well as photographic images. Several approaches are available for processing these data.

1. Conversion of category-type parameters into continuous. In this case only the gender of the user can remain a category type. The statistical model is constructed either separately for men and women, or one for both genders. With the help of regression method the unknown parameters are determined by known ones.

2. Conversion of continuous parameters into category-type ones. In this case, the space of continuous parameters is displayed in clusters using voxelization or other clustering method. For each cluster the most probable values of anthropometric parameters are determined. Based on the data entered by the user, the cluster to which the user belongs is determined, and then its anthropometric parameters are specified with additional information. The result is user body measurements.

3. Processing full-body photos. It is possible to extract either continuous or categorical anthropometric parameters from photographic images using deep learning methods. For example, the ratio of waist girth to hip girth, leg length to height or other body relative parameters may be continuous. Type of the shape can be interpreted as a category parameter. These data can be used for computing anthropometric parameters of the user as described above in item 1 and item 2.

4. Mixed approach. The initial problem can also be solved with combined variants of p. 1, p. 2 and p. 2. 3.

4.2 Determination of the User's Body Type

Various methods can be used to determine the type (to perform the typing) of a user's body shape, which include both purely algorithmic methods and machine learning methods.

The input data of algorithm of person's shape typing are person's gender and the table of the measurements taken. Typing of shapes for women and men is implemented by different functions.

4.2.1. Typing of Men

To type men, the algorithm uses information from three measurements: breast girth, waist girth, and hip girth, and refers the shape to one of three types: thin, normal, and thick.

First, the algorithm checks if the shape is thin. It is considered that thin men are those who have no pronounced pelvis, abdomen or trapezoidal muscles. Therefore, it is first checked whether all three dimensions are within the given limits. If so, the shape refers to the type of "thin".

Then the algorithm checks whether the person belongs to the full type. A man is considered thick if he/she is overweight in the abdomen or pelvis area, so it is checked whether the waist or hip girth exceeds the threshold for a thick person. If at least one of these measurements is above the threshold, the shape is of the "thick" type.

The rest of the shapes are considered to be of the "normal" type. That is men of conditionally average weight, thus the person can have the big muscle mass (for example, the expressed trapezoid muscles) or not to have it.

The following results were obtained on the test base of three-dimensional images of 126 men: "thin"—23, "normal"—80, "thick"—23. At visual check types of men's shapes corresponded to results of automatic testing.

4.2.2 Typing of Women

For women, typing is also based on measurements of the girths of the bust, waist and hips. Five types of shapes are used: "thin", "normal with a pronounced waist", "normal without a pronounced waist", "wide (plus-size) with a pronounced waist", "wide (plus-size) without a pronounced waist".

Four parameters are used for typing: thin_thresh, flat_coef, wide_contoured_thresh, wide_flat_thresh. The verification of belonging to a certain type is carried out step by step and at each subsequent step only the remaining shapes after the previous steps are typed.

First, as with men, the algorithm checks whether the woman is thin, that is done on the condition that all three dimensions are less than thin_thresh. Next, the algorithm checks to see whether the shape if wide (plus-size): the hips should be larger than wide_contoured_thresh and the waist to hips ratio should be smaller than flat_coef. After that it is checked if the shape "full without a pronounced waist" corresponds to the type of user's shape: the waist is larger than wide_flat_thresh. Then it remains to type "normal" shapes. If the remaining models have less than flat_coef waist to hip ratio, then the shape is "normal with a pronounced waist". If none of the above conditions are met, then algorithm considers that the type of the shape is "normal without a pronounced waist".

The results of testing based on 146 female three-dimensional images are as follows: "thin"—8.9% (13), "normal with pronounced waist"—43.8% (64), "normal without pronounced waist"—27.4% (40), "wide with pronounced waist"—5.5% (8), "wide without pronounced waist"—14.4% (21). These data correspond to the statistical data. At visual checking, types of female shapes also corresponded to results of automatic testing.

4.3 Data Analysis and Results

The quality of the algorithm's performance was determined on a test sample consisting of three-dimensional images (3D scans; 3D scanograms). Comparison with two types of reference data was made:

(a) the body measurements (BM) of a person, measured manually from the body;

(b) body measurements (BM) measured from a 3D scan using a clothing design software (CAD). Examples of such CAD are CLO, Optitex, Browzwear, etc.

A comparison of body measurements obtained using the algorithm described above with those measured manually by body is shown in FIG. 31. The average error was 23.3 mm. A comparison of body measurements obtained using the algorithm described above with body measurements measured using a three-dimensional image is shown in FIG. 32. The average error was 21.2 mm. In FIG. 31 and FIG. 32 the abscissa axis are the numbers of measurements in the internal system, on the ordinate axis—the difference between the measurements results obtained using the proposed algorithm and the results measured manually from a person using measuring tape or from a three-dimensional image. Each point corresponds to the error of the result of a particular person's measurement.

Thus, the average error on all measurements was less than 2.5 cm. It can be seen that the distribution centers are shifted relative to zero, which indicates that the positions of anthropometric points are not quite accurate, in addition, there are outliers on the diagram, which may be associated with both algorithm errors and reference data errors. In the future, it is planned to test the algorithm on the marked sample of a larger size, which will make it possible to select the optimal parameters of the algorithm.

5. Selecting the Closest Production Models

The next stage is the selection on anthropometric parameters of one or several closest production models from an array of production models of different manufacturers of clothes.

5.1 Production Model Parametrization

For comparison of production models with a user's body model 3D production models are subject to "registration" similarly to the 3D models obtained by results of scanning of a user's body as it is described above.

If digital models are used, such registration can be done directly from the digital model or after the necessary data conversion. The task of such data conversion is trivial for a specialist, so the details of the conversion are omitted here for brevity. If physical dummies are used, they are scanned in the same way as the user's body.

In the case of parametric production models, anthropometric parameters can be derived from such models—either directly (if the methods for determining anthropometric parameters are the same as those used in the proposed approach) or by conversion. In this case, the method of such transformation depends on the specific implementation of the parameters of a certain production model.

5.2 Matching Production Models with a User's Body Model

Matching production models with a user's body model can be done using the target function $$\mathcal{F} = \Sigma_{i=1}^{M} |DP_{cust} - DP_{prod}| a_i \quad (34)$$

where $\mathcal{F}$ is the target divergence function to be minimized, M is the number of dimensional parameters, $DP_{cust}$ is user's anthropometric dimensional parameter, $DP_{prod}$ is the production model dimensional parameter corresponding to the user's dimensional parameter, $a_i$ is a weighting factor that takes into account the importance of each attribute in terms of influencing the "fit" of a particular garment on a user, i.e., user's subjective assessment of whether the garment "fits" well or badly. M may represent both the number of all dimensional parameters of a user and/or a production model, and a subset of dimensional parameters that include only those parameters that are essential to a particular garment (e.g., only leg measurements for jeans or only hand measurements for gloves).

The model matching criterion can be based, for example, on the evaluation of $\mathcal{F} < \varepsilon_0$, where $\varepsilon_0$ is a threshold value, the value of which can be uniform (i.e., valid for all types of clothing, all clothing manufacturers and all users) or differentiated (i.e., set individually for different types of clothing, different clothing manufacturers and different users). It should be clear that the above criterion is only given as an illustration and that the invention includes the full variety of possible criteria.

It should be noted that the comparison can be performed not only by means of the target function (34), but also by more general known methods, for example, by registering two models to be compared with each other and calculating the error between these three-dimensional model surfaces. This allows the models to be compared not only at selected locations (waist girth, hip girth, etc.), but also to perform the entire model comparison.

The selected production models can be recorded in any suitable form on any suitable media as suitable for a specific user and can be further used in the remote clothing selection process. Such recording can be done in the appropriate format on a user's computer or mobile device or on a cloud service server.

The described algorithm assumes existence of production model (geometric or parametric), suitable for comparison with a user's body model. However, there may be situations where there is no production model or where the existing production model contains significant errors leading to unsatisfactory results of model comparison. At the same time, it may not be possible or economically feasible to build a production model and/or verify it.

In this case, remote clothing selection is possible without using a production model based on comparing the measurements of a user with a size chart of a particular brand or based on comparing the measurements of a user with the results of measuring the garment.

5.3 Comparison of the User's Body Measurements with the Brand Size Chart

In this approach, the user chooses a garment model and the system determines the appropriate size for that model. Here, the term "garment model" does not mean a mathematical or computer model, but a sample of garment embodied in the material, characterized by certain sizes, silhouette, cut, composite and structural solution, materials and decorative elements.

An extended algorithm for recommending a suitable size for a specific garment model is shown in FIG. 43. The algorithm includes the following actions:
  (41) the user chooses the model or category of garment he/she is interested in;
  (42) if the user selects a garment model, a category (subcategory) is found for it;
  (43) human body measurements are calculated or entered, from these measurements a suitable size can be determined;
  (44) the user's body measurements are compared with the size chart of the brand to which the selected garment model belongs;
  (45) the results of the comparison are processed to determine the recommended size for the selected garment model;
  (46) the recommended size is communicated to the user.

The preliminary selection of the model or category of clothes is done by any suitable means, for example, through an electronic catalog. It is also possible to use for this purpose paper catalogs, flyers, publications in social networks, video clips and other information and advertising materials to identify the garment of interest to the user.

The electronic catalog can be monobrand or multibrand, functional or thematic. All models of clothes in the catalog are pre-distributed by categories and, if necessary, by subcategories. For each category (subcategory) of clothing there are pre-defined parameters (particularly, body measurements) based on which the appropriate size can be determined.

These parameters are defined by the system or entered into it (if they have been pre-defined) or extracted from a geometric or parametric model of the user's body (for example, if it is contained in the user's profile). User's body measurements can be determined, for example, in the ways described in section 4.1 above.

The size chart can be obtained either directly or by calculating the body measurements of the production mannequins.

For each body measurement, the corresponding size is calculated according to the brand size chart in a numerical form (for example, as a float number). Then, based on the obtained sizes, the recommended size of the garment is calculated according to the formula.

In the simplest case, a size chart containing only two body measurements, such as chest girth and hip girth, can be used to make recommendations. In this case, the size related to the upper body will be determined by the chest girth and the size related to the lower body by the hip girth.

More accurate recommendation can be made by using a size chart with many body measurements, e.g., for slim-fit shirts, jackets, dresses, etc. It may be appropriate to consider the girth of the neck, chest and waist, width of shoulders, as well as human height and sleeve length.

For a more accurate recommendation, a size chart containing more body measurements is required.

The list of human body measurements is given in Table 3 above.

It is possible to use different approaches to determine a size based on several body measurements. For example, for each body measurement you can enter a coefficient that determines the extent to which the measurement affects the recommended garment size. In this case, the size can be calculated by using a weighted arithmetic mean formula:

$$S=\Sigma(w_i s_i)/\Sigma w_i, \qquad (35)$$

where $s_i$ is the size (e.g., as a float number) corresponding to the i-th body measurement, $w_i$ is the weight of the i-th body measurement when determining the size, S is the recommended size (e.g., as a float number).

For some models of clothing it may turn out that the user's preferences do not quite correspond to the idea of the clothing designer. It may also appear that the material used to make the garment affects individual fit preferences. To account for such cases, one or more correction values may be entered for each garment model. In this case, the formula (35) is as follows:

$$S=\Sigma(w_i s_i)/\Sigma w_i + ds_1 + ds_2 + \ldots \qquad (36)$$

where $ds_1$ is the first correction value, $ds_2$ is the second correction value, etc. The number, types and values of correction values can be individual for each user or for some users. In particular, individual correction values can compensate the lack (small number) of dimensional parameters that are considered when comparing, taking into account the peculiarities of the user's shape.

Then it is necessary to convert these numerical values in the size set according to the brand size set. This can be done, for example, by rounding the resulting numerical size value to the closest size in a size set. The rules of such rounding can be different, for example, upward, downward or to the closest value in the size set.

In the simplest case, this way the size of the garment by length and width can be calculated. The result of the recommendation algorithm in this case is a pair of numerical sizes: the size by length and the size by width.

If necessary, the algorithm of garment size recommendation can be extended by additionally implementing the algorithm of stylistic recommendations (discussed in more detail in Section 5.7). In order to prepare stylistic recommendations, the stylist expert should first determine the rules of compliance of the body characteristics and characteristics of suitable garments. Body characteristics may be based on the user's age, build, skin color, type, hair color and length, cut and eye color, etc. The stylistic recommendation algorithm calculates the necessary characteristics of the person's body, determines the parameters of the garment suitable for the person, and recommends the most appropriate garment by style.

5.4 Comparison of the User's Dimensional Parameters with the Results of Measuring a Garment In the absence of information on model lines and size charts of brands, recommendations can be made by comparing the user's anthropometric dimensional parameters with measurements of specific items of clothing.

If a garment is available for physical measurement, it can be measured explicitly, for example, using a traditional tailor's measuring tape. In most cases, physical measurement may not be possible, or it may not be economically feasible due to the high labor intensity and high cost of manual labor. Therefore, in mass service systems, measurement of a garment may be performed indirectly, for example, by optical scanning using conventional 2D photographic images of the garment being measured.

Optical scanning of clothes can be performed on a special automated unit. The unit can consist of a work surface and a static camera. The work surface can be marked to allow automatic calibration of the system to determine measurements based on camera images. In the simplest case, such a mark-up can be a grid with a square cell of a predetermined size. In other cases, the grid may consist of reference points located at predetermined locations at a predetermined distance from each other.

To determine the measurements of a garment the computer vision algorithm can be used, which determines the type or category of clothing, identifies landmarks in the image, calculates the contour of clothing and based on these data determines the size (FIG. 42). For this purpose, rules for conversion of landmarks and contour into measurement results can be applied predefined for each kind (category) of clothes.

The measurement results can then be converted into dimensional parameters, which can be used to compare directly or from which a corresponding to the garment parametric model can be built if necessary. In essence, these dimensional parameters or parametric model describe the production mannequin on which the garment model is sewn.

Dimensional parameters of the user's body may be compared with dimensional parameters of the apparel as described in section 5.3 with reference to formula (35) and (36).

An illustrative example of an algorithm for recommending clothes of a given category is described below. In this example the system considers different sizes of one model of garments as different models of garments and gives out the list of garments, sorted in the order of fit score.

A system that implements a recommendation algorithm may contain:
- a garments database containing a dictionary of clothes categories, a dictionary of subcategories of garments for each category, a list of garment models for each subcategory, the results of measurements (hereinafter—measurements) and their respective sizes for each garment model;
- rules for converting human dimensional parameters and garments parameters (measurements) to a single format;
- rules for calculating missing measurements (in particular, for those sizes of a particular garment model for which no measurements are available);
- rules specifying the importance of measurement results for each garment model, specifying for each model whether the measurement result should be equal or greater than the corresponding person's dimensional parameter; any combination of rules may be specified for a particular garment model;
- rules for grading garments by size.

User's anthropometric dimensional parameters form the algorithm input. In the database of clothes available for selection, the search is performed considering the number of recommended garments M and the target category (subcategory) in which the search must be performed. The number M and one or more categories (subcategories) to be searched can be specified by the user or determined by the system itself based on various criteria. Such criteria may be user preferences identified based on an analysis of that user's past actions in the system, current system load, etc.

At the output of the algorithm, a list of no more than M models of garments with indication of the size of each model is provided, ranked by the descending fit score (i.e., coefficient showing how much a particular garment suits the user).

The recommendation algorithm involves initializing, pre-processing and calculating the fit score of the garment.

At the initialization stage, data on garments is imported from an external data source and the imported data format is converted into the system's internal data format. Sources of data on garments can be numerous and varied in terms of data formats. Converting the format allows to create a database of garments of the recommendation system. Clothing data can be measurements of clothing. If the imported data contain measurements not for the entire size range of a particular garment model, the missing measurements are calculated by interpolation or extrapolation based on available measurements according to predefined rules.

Data pre-processing, if necessary, involves converting the format of the user's body measurements and/or the format of garment measurements into a format that allows comparison. In particular, garment measurements may be converted to a format that describes the production mannequin on which the garment is sewn. The dimensional parameters of the production mannequin correspond to the ideal fit of the garment. Since this format may coincide with the user's body model, they can be compared directly. However, another variant is also possible when the user's dimensional parameters (measurements) are converted into a garment measurement format, or another variant when both formats are converted into a third format providing for comparison of dimensional parameters.

The result of the comparison can be expressed by a fit score—a numerical evaluation of the matching between a garment and a user's body shape. In particular, the fit score can be calculated for two vectors—a vector of dimensional parameters of a user and a vector of dimensional parameters of a garment.

Due to the specifics of such a task it is not possible to use L-norm as a fit score for the following reasons.

First, each garment measurement has a permissible range in which the measurement can vary without impairing the technical fit of the garment. Accordingly, deviation of the dimensional parameter from the corresponding measurement within this range must not impair the fit score.

Secondly, if one of the measurements of clothes is smaller than the corresponding measurements of the user, considering the permissible range—clothes should not be recommended to the user.

Thirdly, in general, not all measurements of garment are equally important for a comfortable fit. For example, for a classic shirt, freedom at the waist may not be as important as shoulder width and neck girth.

Therefore, an algorithm has been developed to calculate the fit score, which calculates the scalar value, the range of which is between 0 and 1, where "0" means that the garment is completely unsuitable for the user, and "1" means that the garment is perfect fit for the person.

Before calculating the fit score, the values of the difference between the corresponding vector coordinates are divided into 3 groups: "fit", "small" and "big", where:
  "fit" means fulfillment of at least one of the following conditions: the value of the dimensional parameter of a garment is within the permissible range and the value of the dimensional parameter of a garment is greater than the value of the corresponding user's dimensional parameter, but is in the group of "greater" rules of importance;
  "small" means that the size of a garment is less than the acceptable range;
  "big" means that the dimensional parameter of a garment is larger than the acceptable range and is in the group of "equal" rules of importance.

If at least one measurement of a garment of a certain size appears in the "small" group, it is excluded from the issue. In the simplest case, the fit score may be equal to the number of measurements in the "fit" group divided by the total number of measurements of the garment.

To rank items of clothing with an acceptable fit score, an additional fit error value can be calculated. For this purpose, L2-norms for each of the groups "fit", "big" and "small" separately are calculated. The results of the calculations are summed up using weighting factors such as 1*fit+2*big and the sum is the value of the fit error. The fit error value allows for a ranking of fully fit clothing (for which the fit score is 1) and, if there are items of clothing with measurements in the "big" category in the recommended issue, to raise the position in the issue of garment with the smallest exit over the permissible range.

Thus, the following data are going to the input of the ranking algorithm:
  K vectors of garment measurements (one vector for each garment);
  one vector of user's dimensional parameters;
  information about the perfect fit for every garment.

Vectors of garment measurements and vector of dimensional parameters have N coordinates. The coordinates of all vectors are in the same order (i.e., expressed in a single coordinate system).

The "brute force" method is used to search all clothing models from a given category (subcategory). At each i-th step of the search the fit score is calculated for the i-th vector of garment measurements and vector of user's body measurements.

After calculating the fit error for each garment and the fit score, two consecutive sortings are performed in the sample: sorting by fit score in descending order and sorting by fit error in ascending order (optional).

At the last step of the algorithm, the first M elements are selected from the sorted sample. Thus, at the output of the algorithm there is a sample of no more than M elements ordered by decreasing accuracy of technical fit of clothes.

It should be clear to one of ordinary skill in the art that the described algorithms can replace and/or complement each other and can and should be used both for comparing the user's body measurements with the results of measuring the garments and for comparing them with the brand size chart. For this purpose, it is enough to switch places of the measurements of a garment and dimensional parameters of the brand size chart provided as algorithm input.

5.5 Comparison of the Size or Measurement Results of a Reference Garment with the Size or Measurement Results of the Selected Garment The system may be able to implement an algorithm of recommendation even in the absence of anthropometric measurements of the user's body. In this case, instead of the user's body measurements, the algorithm input data can be measurement data of reference garments, i.e., such garments that are guaranteed to have an acceptable fit on the user. One of ordinary skill in the art should understand that such variant of the recommendation algorithm has certain limitations, but can provide satisfactory results for the garments of the same category (subcategory).

5.6. Recommendations Based on Machine Learning Algorithm

The principles of recommendations described above are implemented based on heuristic algorithms, so the accuracy of such recommendations may strongly depend on the human factor—the developers' ideas about the ideal fit of clothes and their ability to express these ideas as rules for the algorithm.

In order to remove this shortcoming and to increase the accuracy of the recommendations, it is possible to use neural network-based machine learning algorithms (MLA, Machine Learning Algorithm), based on previous experience of selecting rules and dependencies, which can best recommend garments to the user.

The main limitation of this approach is that such systems require a large amount of data for training. It is therefore possible to initially use the system described above, and if sufficient data are accumulated for learning the MLA algorithm, the heuristic algorithm can be replaced by the MLA algorithm described below. At the same time, the recommendations of MLA algorithm can be developed by comparing the user's dimensional parameters with both the brand size chart and the measurement results.

The MLA algorithm can be implemented as a classifier, that take to the input the user's dimensional parameters and the scalar values are the output, indicating the probability that a particular brand (or a particular garment) will suit the user.

The principles of operation of the MLA algorithm implementing the brand size recommendation are described below as an illustrative example.

The MLA algorithm is based on a neural network with two or more layers. The need to implement a multilayer neural network is caused by the fact that different brands do not have the same size charts. The multilayer structure of a neural network allows to divide a network's hidden view of the user's dimensional parameters and convert the network's hidden view of the user's dimensional parameters into a recommendation of the size of a particular brand.

In this case, one layer responsible for converting the network's hidden view of the user's body measurements to a brand-specific size recommendation is an encoder, while another layer responsible for converting the network's view of the user's body measurements to a brand-specific size recommendation is a decoder (see FIG. 44). An encoder role can by performed by several layers of a neural network. In this case, the encoder and the decoder can be trained separately. This allows the encoder to be trained on large sets of brand-independent training data and the decoder to be trained on a subset of brand-specific training data. Then all one needs to do to introduce a new brand is to train the encoder on a new set of tutorial data of that brand and train the decoder on a new part of training data. This approach enhances the accuracy of the recommendations, while speeding up the addition of new brands to the product line and accelerating time to market.

For primary training of the neural network (i.e., for training of the encoder) the database can be used, containing a set of data containing a set of dimensional parameters of one person, a set of sizes of one garment and data on whether the garment suited or not suited this person. A set of such data sets can cover all types of user shapes and sets, and size ranges of multiple brands. The types of shapes and sets in training sets may be determined by national and/or regional statistics on population size.

Subsequent training of the neural network can be conducted for one or more decoders, each of which is activated only when a set of training data corresponding to this decoder (i.e., brand-specific data) is submitted to the encoder. Thus, the decoder is trained on the training data of the relevant brand and the encoder is ultimately trained on the full set of training data.

Training on the data of a particular brand may be conducted on marked sets of training data. Each data set may contain a set of dimensional parameters of one person, a set of sizes of one garment of a particular brand, and data on whether that garment suited that person. Optionally, each data set may contain one dimensional parameter of one person, one size of one garment of a particular brand, and whether that garment suited that person.

As an alternative to the use of encoder and decoder layers in a neural network, the MLA algorithm can be implemented as a gradient solution tree busting algorithm (GBRT, Gradient Boosted Decision Tree), based on the solution trees, with which the predictive model is formed as a forest of solution trees. The forest is built in stages. Each subsequent decision tree of such a forest focuses learning on those parts of the previous decision tree that led to an unjustified forecast or significant error. In general, it is designed to improve the quality of forecasting by the MLA algorithm. In this case, the system uses the forecast of not one trained algorithm (one decision tree), but a set of trained algorithms (decision tree forest) and makes the final decision based on a set of prediction results of these algorithms.

5.7. Recommendation of Clothing Based on Images Obtained by the User Himself/Herself To simplify the user experience and to be able to deploy the system without the use of stationary scanners, a clothes selection system based on multiple photos can be used.

This system works based on several pictures of the user, which he/she can take on his/her own using devices available to him, such as a smartphone or laptop with a web camera. In addition, the user is required to enter several parameters, such as height, weight, etc.

The system obtains several images of the user from different angles, for example, in profile and in full-face. These images are entered into a convolution neural network, which converts the user's image data into a segmented map, where each pixel has a value of either 0 or 1. In this case pixels that do not belong to a person have the value 0, and pixels that do not belong to a person have the value 1. After that these images are submitted to the input of a convolution neural network, which converts them into a vector of features. After that this vector is searched for matching parametric models in the clustered space. Next, for this cluster is looking for a corresponding size from the size chart or the size of clothing from the previously compared to this cluster.

The image segmentation map is obtained using a UNet-like convolution neural network containing an encoder and a decoder. One color image of the user is fed to the network input, and a segmentation card is expected at the output. A detailed description of the UNet network can be found at arxiv.org/abs/1505.04597.

To train such a network, a set of images is used, in which each image corresponds to a precise segmentation map.

A weighted sum is used as a loss function $$Loss = \alpha D + \beta H_p,$$

$$\text{where}: D = \frac{2\sum_{i}^{N} p_i y_i}{\sum_{i}^{N} p_i + \sum_{i}^{N} y_i} - \text{Dice's similarity coefficient,}$$

$$H_p = -\frac{1}{N}\sum_{i=1}^{N} y_i \cdot \log(p_i) + (1 - y_i) \cdot \log(1 - p_i) - \text{binary cross entropy,}$$

where p is the predicted value, y is the real value, α and β—scalar coefficients selected by the parameter search method.

Suppose that the input to the neural network includes N images of H×W×3, where 3—the number of colors in a pixel. In this case the neural network acts as a conversion operator T: X→Y, where X—the image space, and Y is the feature vector space.

The vector of features itself is produced by a conventional architecture neural network. For this purpose, an ordinary encoder is taken, which has several convolution layers, for example, ResNet, Inception, or MobileNet. Output data are smoothed out into the vector by the encoder and fed to a fully-connected layer. Output data of this fully-connected layer is a feature vector.

A neural network with any nonzero values of weights will perform extraction of the feature vector. However, better matching to clusters is achieved if the neural network is trained on the appropriate dataset containing images similar to those that will be submitted to the input.

Therefore, the neural network is trained on existing scans, augmented by random noise in the model pose parameters. In this case, the preparation of one data set is performed according to the following algorithm.

1. A single scan of a person and parametric model fitted to it are selected.
2. Random noise with predetermined parameters is added to the parameters of the given parametric model shape. These parameters are calculated in such a way that the distribution is similar to the distribution of real pose parameters from the data set.
3. A random pose of the model is selected from the whole data set and random noise is also added to it.
4. The model is placed in the center of coordinates.
5. The camera is initialized with random parameters $c_x$, $c_y$, $f_x$, and $f_y$.
6. The camera is positioned so that the model looks strictly at the camera.
7. A small random offset is applied to the model.

8. Small random transformations are applied to the camera position, the observation point and the vector looking to the right in the camera coordinate system.

9. The rendering of this model is performed.

10. The camera rotates at random angles of −100° to −80° or 80° to 100° around the model and repeats steps 7, 8, and 9.

The model is rendered in a binary mask, where each pixel has a value of either 0 or 1, where 0 means that the pixel belongs to the background and 1 means that the pixel belongs to the model. These images are then fed to the input of the neural network.

After the training of the neural network, the algorithm that puts the cluster in accordance with the features vector is trained.

Since a parametric model is set for each cluster, the training of the matching algorithm is performed on the data set obtained as follows.

1. A model receive to the input of the neural network.

2. The parameters of this model are used to search for the cluster number.

3. The parameters of the found cluster are paired with the feature vector.

With the use of the obtained data set it becomes possible to validate the algorithms of attribute vectors and clusters comparison.

5.8. Search for Suitable Clothing Items

Search for clothing items that are sewn using selected production models is carried out in any suitable way. The implementation of any such method is known, so its description is omitted for brevity. It is necessary for each clothing item to have information about the production model that was used in its design and/or cutting.

The order in which these clothing items are displayed may depend on the size of the divergence function F (formula 34) or may be determined by the user based on personal preferences. The interface of the remote clothing selection system may include the quick switching of the principle of the clothing items display order. This switching can be done by the user: manually (e.g., if the default order does not provide results that are sufficiently relevant) or automatically (e.g., based on analysis of the statistics of the user's actions).

Also search for suitable clothing items can be done by determining the shape type described above in section 4.2, which makes it possible to select clothing items not just according to the parameters of the body (so that the clothes do not fit too tightly or, conversely, do not hang baggily, for example), but also according to the body type (so that the clothes stylistically adorn the figure), recommending, for example, dresses like empire line and clothing items that visually enlarge shoulders (with shoulder pads, lush sleeves, bolero, etc.) to women with a "pear" body shape, etc. (see, for example, typical stylistic recommendations for clothes for 7 types of body shapes at joyofclothes.com/style-advice/shape-guides/body-shapes-overview.php or in similar style guides).

5.9. Visualization of Found Clothing Items

Visualization of clothing items for which the used production model is known is also known in the art, so the description of its practical implementation is omitted for brevity. It would be enough to mention that a clothing item can be visualized as it is (i.e., without a mannequin or person image) or it can be visualized on a mannequin or person.

In particular, one of the options for implementing the invention may include the visualization of the clothing item on a 3D model of the user himself/herself, and the rendering of the image may include reproduction of the realistic image of the user's head to enhance the emotional impression. 3D model of the head, including the user's face and hairdo, can be a separate model, but not a part of the model of the user's body in the sense described in the description of the algorithm, and can be intended exclusively for decorative purposes.

The interface of the remote clothing selection system may include the quick switching of the principle of the clothes visualization. Along with the order in which the results of the clothing items search are displayed, such switching can be done by the user: manually (e.g., if the user wishes to examine the interior (lining) of the clothing item, he/she can disable the visualization of a mannequin or a person) or automatically (e.g., based on analysis of the statistics of the user's actions).

For the user the interface of the remote clothing selection system can provide the control of the visualization by changing the angle, zooming in or out, etc. to allow the user to examine clothing properly.

As mentioned earlier, the visualization of clothing items is possible on different situational background (which can be selected from the library or can be downloaded by the user), with lighting from different points (in particular, with the choice of the number and/or position of virtual light emitters), with different intensity, with different diffusivity (for example, light can be directed or scattered) and/or with different spectrum (for example, light can be artificial, daytime, evening, it can imitate sunrise or sunset), etc. The interface of the remote clothing selection system can provide user control of all these features. The implementation of these features is also known, so the details of the respective technical solutions are omitted for brevity.

6. Performing the Selection and Purchase of Selected Clothing Items

After evaluating the proposed garments options the user can make a choice and make a purchase in the traditional way. Principles of work of the online stores are well known in this field of technology; therefore, details of corresponding technical solutions are omitted for brevity.

It should be noted that the technology described above can be used not only for remote sale of clothing (e.g., in the online store), but also for remote clothing rental (e.g., official or festive clothing, etc.). Moreover, the technology described above can be used for remote selection of other goods other than clothing (for example, medical goods—corsets, bandages, etc., which require to fit the patient's body shape) with slight changes.

It should also be noted that the user can make a purchase or rental not only remotely (online, via the Internet), but also in offline store or boutique. In this case, the help of assistant who brings clothes to the user after the user has chosen these clothes in the application interface is also possible. The assistant can either pass clothes directly into the user's hands, or use special cells (boxes, baskets, etc.), so that the assistant does not see the user (which may be convenient, for example, if the user is in the dressing room and he/she is currently undressed). The assistant can also be either a human or a robotic system.

7. System for Remote Clothing Selection

A system implementing the described algorithm of the clothing remote selection is described below.

The system for remote clothing selection includes computing devices that perform the actions of the algorithm for remote clothing selection which is described above. In addition, this system may contain the equipment for optical scanning of the user body described above and used at the initial stage of the algorithm.

In particular, in a Business-to-Customer (B2C) environment, the system includes potential user equipment, hereinafter referred to as the user device, and service provider equipment related to remote clothing selection.

The user device may be any computer hardware capable of executing programs suitable for the task. Some (non-restrictive) examples of user devices include personal computers (desktop computers, laptops, netbooks, etc.), smartphones and tablets as well as network equipment (routers, switches, gateways, etc.).

The equipment of the service provider may also be any computer hardware capable of executing programs suitable for the task. Some (non-restrictive) examples include individual computers and computer systems. Computer systems may be concentrated or distributed.

In a Business-to-Business (B2B) environment, the system may include an additional part, conventionally called retailer equipment, functionally linked to the user device and to the equipment of the service provider. In this case, the remote clothing selection algorithm can be mostly performed by the retailer and service provider equipment, while the user device can be used mainly in terminal mode, for example, for visualization and/or for obtaining control commands through the user interface.

In some embodiments of the invention, a system may have a client-server architecture, while the user device may be a client device and the service provider equipment may include a server device. Here the term "server" refers to a computer program executed by appropriate hardware and capable of receiving requests (for example, from client devices) through the network and executing or initiating execution of these requests. The term "client" means a computer program executed by appropriate hardware and capable of generating requests to the server, receiving response from the server and processing it.

It should be noted that a device that functions as a client device can also function as a server device for other client devices. The use of the expression "client device" does not preclude the use of multiple client devices to receive, send, execute or initiate the execution of any task or request, or the results of any task or request, or the steps of any method described herein.

In other versions of the invention, the system may have a peer-to-peer architecture, for example, based on a peer-to-peer network. The system may also have any hybrid architecture.

FIG. 34 shows an illustrative example of a system (20) for remote clothing selection in a B2C environment containing the user device (21) running the program (22) and the service provider equipment (23) running the program (24). The user's device (21) is connected to the service provider equipment (23) via network connection (25). In some embodiments of the invention, a network connection (25) may be implemented using the Internet. In other embodiments of the invention, a network connection (25) may be implemented using any global communication network, local communication network, private communication network, etc. Implementation of the network connection (25) depends, among other things, on the implementation of the user device (21) and the service provider equipment (23). The system (20) is functionally connected to the system (30) of the service provider. In some embodiments of the invention, systems (20) and (30) may be combined into one system. In other embodiments of the invention, the system (20) may be functionally connected to several systems (30) of different clothing suppliers.

FIG. 35 shows another illustrative example of a system (20) for remote clothing selection in a B2B environment, where the system (20) includes the retailer equipment (26) running the program (28) and associated with the service provider equipment (23) over the network connection (25) and the user device (21) over the local network connection (27).

As an example, in those embodiments of the invention where the user's device (21) is implemented as a wireless communication device (e.g., smartphone), the network connection (25) can be implemented using a wireless communication line (e.g., 3G network channel, 4G network channel, Wi-Fi, Bluetooth, etc.). In other implementation options where the user's device (21) is implemented as a remote computer, the network connection (25) can be implemented using a wireless communication line (as Wi-Fi, Bluetooth, etc.), a wired communication line, or an optical communication line (as an Ethernet connection). The network connection (27) can be implemented in the same way.

FIG. 34 and FIG. 35 show only one user device (21), one equipment unit (23) of a service provider and one clothing provider system (30) for simplicity. In practice, a system (20) may contain multiple user devices (21) (for example, hundreds, thousands or millions of such devices), multiple equipment (23) of a service provider (for example, tens or hundreds of service provider regional sites) and may be associated with multiple systems (30) of clothing providers (for example, tens or hundreds of clothing providers). Meanwhile the software implementation of the remote clothing selection algorithm is distributed among programs (22), (24), and (28). For simplicity, FIG. 34 and FIG. 35 do not show the equipment for optical scanning of the user's body.

It should be noted that the above description reflects only those actions that are most essential to achieve the goal of the invention. It should be clear to the specialist that for the functioning of the system (20) other necessary actions should also be performed, for example, connection of equipment, its initialization, start of the corresponding software, transmission and reception of commands and confirmations, exchange of service data, synchronization, etc., the description of which is omitted for brevity.

Devices and their parts, mentioned in the description, drawings and claims represent hardware and software, and the hardware parts of some devices may differ, overlap in part, or overlap in full with the hardware parts of other devices, unless explicitly stated otherwise. Hardware parts of devices may be located on different parts of other devices unless explicitly stated otherwise. Software parts (modules) can be implemented as program code contained in any kind of storage device.

The sequence of actions in the process description is illustrative, and in various embodiments of the invention this sequence may differ from that described, provided that the performed function and the achieved result are kept the same.

Having thus described a preferred embodiment, it should be apparent to those skilled in the art that certain advantages of the described method and system have been achieved. It should also be appreciated that various modifications, adaptations, and alternative embodiments thereof may be made within the scope and spirit of the present invention. The invention is further defined by the following claims.

Below are sources of information (references), all contents of which are incorporated in this application by reference.

REFERENCES

A1. Brett Allen, Curless Brian, Popovic Zoran, Hertzmann Aaron. Learning a correlated model of identity and pose-dependent body shape variation for real-time synthesis. Eurographics/SIGGRAPH Symposium on Computer Animation 2006, DOI: 10.2312/SCA/SCA06/147-156.

A2. Dragomir Anguelov, Praveen Srinivasan, Daphne Koller, Sebastian Thrun, Jim Rodgers, James Davis. SCAPE: shape completion and animation of people. ACM SIGGRAPH 2005 Papers, pp. 408-416, DOI: 10.1145/1186822.1073207.

A3. Alexandru O. Balan. Detailed Human Shape and Pose from Images. Doctoral Theses, Department of Computer Science at Brown University, Providence, R.I., May 2010.

A4. Ilya Baran, Jovan Popovic. Automatic rigging and animation of 3D characters. ACM SIGGRAPH 2007 papers, article 72, DOI: 10.1145/1275808.1276467.

A5. Federica Bogo, Javier Romero, Matthew Loper, Michael J. Black. FAUST: Dataset and evaluation for 3D mesh registration. IEEE Conference on Computer Vision and Pattern Recognition, Columbus, Ohio, USA, 23-28 Jun. 2014, DOI: 10.1109/CVPR.2014.491.

A6. Federica Bogo, Angjoo Kanazawa, Christoph Lassner, Peter Gehler, Javier Romero, Michael J. Blac. Keep it SMPL: Automatic Estimation of 3D human pose and shape from a single image. Computer Vision—ECCV 2016: 14th European Conference, Amsterdam, The Netherlands, Oct. 11-14, 2016, Proceedings, Part V (pp. 561-578), DOI: 10.1007/978-3-319-46454-1_34.

A7. Zhi-Quan Cheng, Yin Chen, Ralph R. Martin, Tong Wu, Zhan Song. Parametric modeling of 3D human body shape—a survey. Computers & Graphics. Volume 71, April 2018, pp. 88-100, DOI: 10.1016/j.cag.2017.11.008.

A8. Nils Hasler, Carsten Stoll, Martin Sunkel, Bodo Rosenhahn, Hans-Peter Seidel. A statistical model of human pose and body shape. Computer Graphics Forum (Proc. Eurographics 2009), Munich, Germany, March 2009, DOI: 10.1111/j.1467-8659.2009.01373.x.

A9. Doug L. James, Christopher D. Twigg. Skinning mesh animations. ACM Transactions on Graphics (SIGGRAPH 2005), Volume 24, Issue 3, July 2005, pp. 399-407, DOI: 10.1145/1186822.1073206.

A10. Ladislav Kavan, Steven Collins, Jiří Zára, Carol O'Sullivan. Geometric skinning with approximate dual quaternion blending. ACM Transactions on Graphics (TOG) Volume 27 Issue 4, October 2008, Article No. 105, DOI: 10.1145/1409625.1409627.

A11. Zorah Lahner, Daniel Cremers, Tony Tung. DeepWrinkles: Accurate and Realistic Clothing Modeling. Computer Vision—ECCV 2018, pp. 698-715, DOI: 10.1007/978-3-030-01225-0_41.

A12. Binh Huy Le, Zhigang Deng. Robust and accurate skeletal rigging from mesh sequences. ACM Transactions on Graphics (TOG) Volume 33, Issue 4, July 2014, Article No. 84, DOI: 10.1145/2601097.2601161.

A13. J. P. Lewis, Matt Cordner, Nickson Fong. Pose space deformation: a unified approach to shape interpolation and skeleton-driven deformation. SIGGRAPH '00. Proceedings of the 27$^{th}$ annual conference on Computer graphics and interactive techniques, pp. 165-172, DOI: 10.1145β 44779.344862.

A14. Matthew Loper, Naureen Mahmood, Javier Romero, Gerard Pons-Moll, Michael J. Black. SMPL: A skinned multi-person linear model. ACM Transactions on Graphics (TOG) Volume 34 Issue 6, November 2015 Article No. 248, DOI: 10.1145/2816795.2818013.

A15. Akihiko Murai, Yui Endo, Mitsunori Tada. Anatomographic volumetric skin-musculoskeletal model and its kinematic deformation with surface-based SSD. IEEE Robotics and Automation Letters, Volume: 1, Issue: 2, July 2016, pp. 1103-1109, DOI: 10.1109/LRA.2016.2524069.

A16. Leonid Pishchulin, Stefanie Wuhrer, Thomas Helten, Christian Theobalt, Bernt Schiele Building statistical shape spaces for 3D human modeling. Pattern Recognition, Volume 67, July 2017, Pp. 276-286, DOI: 10.1016/j.patcog.2017.02.018.

A17. Thomas Probst, Andrea Fossati, Mathieu Salzmann, Luc Van Gool. Efficient model-free anthropometry from depth data. 2017 International Conference on 3D Vision (3DV), Qingdao, China, 10-12 Oct. 2017, DOI: 10.1109/3DV.2017.00062.

A18. Yassir Saquil, Qun-Ce Xu, Yong-Liang Yang, Peter Hall. Rank3DGAN: Semantic mesh generation using relative. arxiv.org/abs/1905.10257.

A19. Hyewon Seo, Frederic Cordier, Nadia Magnenat-Thalmann. Synthesizing animatable body models with parameterized shape modifications. Proceedings of the 2003 ACM SIGGRAPH/Eurographics symposium on Computer animation, pp. 120-125, DOI: 10.2312/SCA03/120-125.

A20. Chang Shu, Stefanie Wuhrer, Pengcheng Xi. 3D anthropometric data processing. Int. J. Human Factors Modelling and Simulation, Vol. 3, No. 2, 2012, DOI: 10.1504/IJHFMS.2012.051093.

A21. Miroslava Slavcheva, Maximilian Baust, Slobodan Ilic. SobolevFusion: 3D reconstruction of scenes undergoing free non-rigid motion. IEEE/CVF Conference on Computer Vision and Pattern Recognition, Salt Lake City, Utah, USA, 18-23 Jun. 2018, DOI:10.1109/CVPR.2018.00280.

A22. Qiaosong Wang, Vignesh Jagadeesh, Bryan Ressler, Robinson Piramuthu. Im2Fit: Fast 3D model fitting and anthropometrics using single consumer depth camera and synthetic data. Electronic Imaging, 3D Image Processing, Measurement (3DIPM), and Applications 2016, pp. 3DIPM-045.1-3DIPM-045.7, DOI: 10.2352/ISSN.2470-1173.2016.21.3D1 PM-045.

A23. Ofir Weber, Olga Sorkine, Yaron Lipman, Craig Gotsman. Context-aware skeletal shape deformation. Computer Graphics Forum, Volume 26, Issue 3, September 2007, pp. 285-274, DOI: 10.1111/j.1467-8659.2007.01048.x.

A24. Yipin Yang, Yao Yu, Yu Zhou, Sidan Du, James Davis, Ruigang Yang. Semantic parametric reshaping of human body models. 2nd International Conference on 3D Vision, Tokyo, Japan, 8-11 Dec. 2014, DOI: 10.1109/3DV.2014.47.

A25. Mao Ye, Xianwang Wang, Ruigang Yang, Liu Ren, Marc Pollefeys. Accurate 3D pose estimation from a single depth image. 2011 International Conference on Computer Vision, Barcelona, Spain, 6-13 Nov. 2011, DOI: 10.1109/ICCV.2011.6128310.

A26. Tao Yu, Kaiwen Guo, Feng Xu, Yuan Dong, Zhaoqi Su, Jianhui Zhao, Jianguo Li, Qionghai Dai, Yebin Liu. BodyFusion: Real-time capture of human motion and surface geometry using a single depth camera. IEEE International Conference on Computer Vision (ICCV), Venice, Italy, 22-29 Oct. 2017, DOI: 10.1109/ICCV.2017.104.

A27. Tao Yu, Zerong Zheng, Kaiwen Guo, Jianhui Zhao, Qionghai Dai, Hao Li, Gerard Pons-Moll, Yebin Liu. DoubleFusion: Real-Time capture of human performances with inner body shapes from a single depth sensor. IEEE/CVF Conference on Computer Vision and Pattern Recognition, Salt Lake City, Utah, USA, 18-23 Jun. 2018, DOI:10.1109/CVPR.2018.00761.

A28. Chao Zhang, Sergi Pujades, Michael J. Black, Gerard Pons-Moll. Detailed, accurate, human shape estimation from clothed 3D scan sequences. IEEE Conference on Computer Vision and Pattern Recognition (CVPR), 2017, pp. 4191-4200, DOI: 10.1109/CVPR.2017.582.

A29. Yingliang Zhang, Xi Luo, Wei Yang, Jingyi Yu. Fragmentation guided human shape reconstruction. IEEE Access, Volume 7, pp. 45651-45661, DOI: 10.1109/ACCESS.2019.2905879.

A30. Zerong Zheng, Tao Yu, Hao Li, Kaiwen Guo, Qionghai Dai, Lu Fang, Yebin Liu. HybridFusion: Real-time performance capture using a single depth sensor and sparse IMUs. The European Conference on Computer Vision (ECCV), 2018, part 9, pp. 389-406, DOI: 10.1007/978-3-030-01240-3_24.

B1. Tao Yu, Zerong Zheng, Kaiwen Guo, Jianhui Zhao, Qionghai Dai, Hao Li, Gerard Pons-Moll, Yebin Liu. DoubleFusion: Real-Time capture of human performances with inner body shapes from a single depth sensor. IEEE/CVF Conference on Computer Vision and Pattern Recognition, 18-23 Jun. 2018, Salt Lake City, Utah, USA, DOI:10.1109/CVPR.2018.00761.

B2. Richard A. Newcombe, Shahram Izadi, Otmar Hilliges, David Molyneaux, David Kim, Andrew J. Davison, Pushmeet Kohi, Jamie Shotton, Steve Hodges, Andrew Fitzgibbon. Kinectfusion: Real-time dense surface mapping and tracking. $10^{th}$ IEEE International Symposium on Mixed and Augmented Reality, 2δ-29 Oct. 2011, Basel, Switzerland, DOI: 10.1109/ISMAR.2011.6092378.

B3. Sylvain Paris, Pierre Kornprobst, Jack Tumblin, Fredo Durand. Bilateral filtering: Theory and applications Foundations and Trends in Computer Graphics and Vision, Vol. 4, No. 1 (2009), Pp. 1-73, DOI: 10.1561/0600000020.

B4. Konushin A. Geometrical properties of several images// Computer graphics and multimedia, 2006, No. 4, C. 3.

B5. Guzov, V. V. Calculation of the pose parameters and the shape of a three-dimensional model of a human based on depth sensor data (in Russian)//Collection of abstracts of the XXVI International Scientific Conference of students, post-graduates and young scientists "Lomonosov-2019": section "Computational mathematics and cybernetics". —Moscow: Publishing department of the Moscow State University, 2019, P. 45-47.

B6. Richard A. Newcombe, Dieter Fox, Steven M. Seitz. DynamicFusion: Reconstruction and tracking of non-rigid scenes in real-time. Conference on Computer Vision and Pattern Recognition (CVPR), 7-12 Jun. 2015, Boston, Mass., USA, DOI: 10.1109/CVPR.2015.7298631.

B7. Ladislav Kavan, Steven Collins, Jiri Zara, Carol O'Sullivan. Skinning with dual quaternions. Symposium on Interactive 3D Graphics, 513D 2007, April 30-May 2, 2007, Seattle, Wash., USA, DOI: 10.1145/1230100.1230107.

B8. Matthew Loper, Naureen Mahmood, Javier Romero, Gerard Pons-Moll, Michael J. Black. SMPL: A skinned multi-person linear model. ACM Transactions on Graphics (TOG), Volume 34, Issue 6, November 2015, Article No. 248, DOI: 10.1145/2816795.2818013.

B9. Robinette K. M., Daanen H., Paquet E. The CAESAR project: a 3-D surface anthropometry survey. Second International Conference on 3-D Digital Imaging and Modeling, 8 Oct. 1999, Ottawa, Ontario, Canada, DOI: 10.1109/IM.1999.805368.

B10. Kirk MacTavish, Timothy D. Barfoot. At all costs: A comparison of robust cost functions for camera correspondence outliers. $12^{th}$ Conference on Computer and Robot Vision, 3-5 Jun. 2015, Halifax, NS, Canada, DOI: 10.1109/CRV.2015.52.

B11. Jose Luis Blanco Claraco. A tutorial on SE(3) transformation parameterizations and on-manifold optimization. University of Malaga, Technical report #012010, 2010, Last update: 18/03/2019.

B12. Ake Bjorck. Numerical methods for least squares problems. Linkoping University, Linkoping, Sweden, 1996, DOI: 10.1137/1.9781611971484.

B13. Hestenes M. R., Stiefel E. Methods of Conjugate Gradients for Solving Linear Systems. Journal of Research of the National Bureau of Standards, 49, pp. 409-435, DOI: 10.6028/jres.049.044.

B14. Matthew Loper, Naureen Mahmood, Javier Romero, Gerard Pons-Moll, Michael J. Black. SMPL: A skinned multi-person linear model. ACM Transactions on Graphics (TOG) Volume 34 Issue 6, November 2015 Article No. 248, DOI: 10.1145/2816795.2818013

B15. Leonid Pishchulin, Stefanie Wuhrer, Thomas Helten, Christian Theobalt, Bernt Schiele. Building statistical shape spaces for 3D human modeling. Pattern Recognition, Volume 67, July 2017, Pages 276-286, DOI: 10.1016/j.patcog.2017.02.018

B16. Allen Brett, Curless Brian, Popovic Zoran. Articulated body deformation from range scan data. ACM Transactions on Graphics (TOG), Volume 21 Issue 3, July 2002, Pages 612-619, DOI: 10.1145/566570.566626.

B17. Dragomir Anguelov, Praveen Srinivasan, Daphne Koller, Sebastian Thrun, Jim Rodgers, James Davis. SCAPE: shape completion and animation of people. ACM SIGGRAPH 2005 Papers, Pages 408-416, DOI: 10.1145/1186822.1073207.

B18. David A. Hirshberg, Matthew Loper, Eric Rachlin, Michael J. Black. Coregistration: Simultaneous Alignment and Modeling of Articulated 3D Shape. In: Fitzgibbon A., Lazebnik S., Perona P., Sato Y., Schmid C. (eds) Computer Vision—ECCV 2012. ECCV 2012. Lecture Notes in Computer Science, vol. 7577, Springer, Berlin, Heidelberg, DOI: 10.1007/978-3-642-33783-3_18.

B19. Arjun Jain, Thorsten Thormahlen, Hans-Peter Seidel, Christian Theobalt. MovieReshape: Tracking and Reshaping of Humans in Videos. ACM Transactions on Graphics (TOG), Volume 29, Issue 6, December 2010, Article No. 148, DOI:10.1145/1866158.1866174.

B20. Kathleen M. Robinette, Sherri Blackwell, Hein Daanen, Mark Boehmer, Scott Fleming. Civilian American and European Surface Anthropometry Resource (CAESAR), Final Report. Volume 1. Summary. 2002, DOI: 10.21236/ada406704.

B21. Wuhrer Stefanie, Shu Chang, Xi Pengcheng. Pose-invariant statistical shape analysis using Laplace operator. Computers & Graphics, 36(5), August 2012, Pages 410-416, DOI: 10.1016/j.cag.2012.03.026.

B22. Adam Paszke, Sam Gross, Soumith Chintala, Gregory Chanan, Edward Yang, Zachary DeVito, Zeming Lin, Alban Desmaison, Luca Antiga, Adam Lerer. Automatic differentiation in PyTorch. $31^{st}$ Conference on Neural Information Processing Systems (NIPS 2017), 4-9 December, 2017, Long Beach, Calif., USA.

B23. ISO 8559-1:2017 Size designation of clothes. Part 1: Anthropometric definitions for body measurement.

B24. ISO 8559-2:2017 Size designation of clothes. Part 2: Primary and secondary dimension indicators.

B25. ISO 7250-1:2017 Basic human body measurements for technological design. Part 1: Body measurement definitions and landmarks.

B26. ISO/TR 7250-2:2017 Basic human body measurements for technological design. Part 2: Statistical summaries of body measurements from national populations.

B27. ISO 7250-3:2017 Basic human body measurements for technological design. Part 3: Worldwide and regional design ranges for use in product standards.

B28. GOST 17522-72 Typical shapes of women. Dimensional parameters for designing of clothes.

B29. GOST 31396-2009 Classification of typical shapes of women by height, sizes and full groups for designing of clothes.

B30. OST 17-326-81 Products sewing, knitwear, fur. Typical shapes of women. Dimensional parameters for the design of clothes.

B31. Daisy Veitch. Where is the human waist? Definitions, manual compared to scanner measurements. Work 41 (2012), pp. 4018-4024, DOI: 10.3233/WOR-2012-0065-4018.

B32. Vladimir Vladimirovich Guzov. Construction of a three-dimensional model of a person by video from the depth sensor. Master's thesis. Department of Computational Mathematics and Cybernetics of the Federal State Budgetary Educational Institution of Higher Education "Lomonosov Moscow State University", Department of Intellectual Information Technologies, defense 01.06.2019.

B33. Petrov Ilya Alekseevich. Neural network algorithm for recovery of parameters of 3D model of human shape and pose from images. Master's thesis. Department of Computational Mathematics and Cybernetics of the Federal State Budgetary Educational Institution of Higher Education "Lomonosov Moscow State University", Department of Intellectual Information Technologies, defense 01.06.2019.

B34. Patakin Nikolai. Development of parametric 3D model of human body. Federal State Autonomous Educational Institution of Higher Education "National Research University "Higher School of Economics", Department of Computer Sciences, Defence 06.06.2019.

B35. Balan A. O. et al. Detailed human shape and pose from images.//2007 IEEE Conference on Computer Vision and Pattern Recognition. —IEEE, 2007, pp. 1-8.

B36. He K. et al. Identity mappings in deep residual networks.//European conference on computer vision. —Springer, Cham, 2016, pp. 630-645.

B37. Kanazawa A. et al. End-to-end recovery of human shape and pose//The IEEE Conference on Computer Vision and Pattern Recognition (CVPR), 2018.

B38. Krizhevsky A., Sutskever I., Hinton G. E. Imagenet classification with deep convolutional neural networks.// Advances in neural information processing systems, 2012, pp. 1097-1105.

B39. Loper M. et al. SMPL: A skinned multi-person linear model.//ACM Transactions on Graphics (TOG), 2015, Vol. 34, No. 6, p. 248.

B40. Pavlakos G. et al. Learning to estimate 3D human pose and shape from a single color image//Proceedings of the IEEE Conference on Computer Vision and Pattern Recognition, 2018, pp. 459-468.

B41. Tan V., Budvytis I., Cipolla R. Indirect deep structured learning for 3d human body shape and pose prediction, 2018.

C1. Xuaner Cecilia Zhang, Lam Yuk Wong. Virtual fitting: real-time garment simulation for online shopping. ACM SIGGRAPH 2014 Posters, July 2014, Article No. 41, DOI: 10.1145/2614217.2633388.

C2. Amit Raj, Patsorn Sangkloy, Huiwen Chang, James Hays, Duygu Ceylan, Jingwan Lu. SWAPNET: image based garment transfer. In: Ferrari V., Hebert M., Sminchisescu C., Weiss Y. (eds) Computer Vision—ECCV 2018. ECCV 2018. Lecture Notes in Computer Science, vol. 11216, DOI: 10.1007/978-3-030-01258-8_41.

C3. Igor Santesteban, Miguel A. Otaduy, Dan Casas. Learning-based animation of clothing for virtual try-on. Eurographics 2019 (submitted on 17 Mar. 2019), DOI: 10.1111/cgf.13643.

C4. Luo Ronglei; He Wenjie; Li Chengyi. An algorithm based on wavelet neural network for garment size selection. Telkomnika. December 2014, Vol. 12, Issue 4, pp. 1073-1078, DOI: 10.12928/TELKOMNIKA.v12i4.788.

C5. Suthar Dhruvi J. A review on virtual try and suggest system. Journal of the Gujarat Recearch Society Vol. 21, Issue 13, December 2019.

C6. Guan, Congying, Qin, Sheng-feng, Ling, Wessie and Ding, Guofu. Apparel recommendation system evolution: An empirical review. International Journal of Clothing Science and Technology, 28 (6). pp. 854-879, DOI: 10.1108/IJCST-09-2015-0100.

C7. Haoye Dong, Xiaodan Liang, Xiaohui Shen, Bochao Wang, Hanjiang Lai, Jia Zhu, Zhiting Hu, Jian Yin. Towards multi-pose guided virtual try-on network. IEEE International Conference on Computer Vision (ICCV), 2019, pp. 9026-9035.

C8. Bochao Wang, Huabin Zheng, Xiaodan Liang, Yimin Chen, Liang. Lin, Meng Yang. Toward characteristic-preserving image-based virtual try-on network. European Conference on Computer Vision, September 8-14, 2018, DOI: 10.1007/978-3-030-01261-8_36.

C9. Thanasiri Muttulingam. A neural network approach to the virtual dressing room. Master's thesis, Department of Systems and Computer Engineering, the Faculty of Graduate Studies and Research, Ottawa-Carleton Institute for Electrical and Computer Engineering, 2007.

C10. J. Q. Yan, V. E. Kuzmichev. Virtual technology of made-to-measure men shirt. IOP Conference Series: Materials Science and Engineering, Volume 460, conference 1, DOI: 10.1088/1757-899X/460/1/012014.

C11. Ruiyun Yu, Xiaoqi Wang, Xiaohui Xie. VTNFP: An image-based virtual try-on network with body and clothing feature preservation. The IEEE International Conference on Computer Vision (ICCV), 2019, pp. 10511-10520.

C12. Chia-Wei Hsieh, Chieh-Yun Chen, Chien-Lung Chou, Hong-Han Shuai, Jiaying Liu, Wen-Huang Cheng. FashionOn: Semantic-guided image-based virtual try-on with detailed human and clothing information. Proceedings of the 27th ACM International Conference on Multimedia October 2019, pp. 275-283, DOI: 10.1145/3343031.3351075.

C13. Taleb Alashkar, Songyao Jiang, Shuyang Wang, Yun Fu. Examples-rules guided deep neural network for makeup recommendation. Proceedings of the Thirty-First AAAI Conference on Artificial Intelligence 2017, Pages 941-947.

C14. Hyug Jae Lee, Rokkyu Lee, Minseok Kang, Myounghoon Cho, Gunhan Park. LA-VITON: A network for looking-attractive virtual try-on. The IEEE International Conference on Computer Vision (ICCV), 2019.

C15. Surgan Jandial, Ayush Chopra, Kumar Ayush, Mayur Hemani, Abhijeet Kumar, Balaji Krishnamurthy Sieve- Net: A unified framework for robust image-based virtual try-on. Accepted at IEEE WACV 2020 (Submitted on 17 Jan. 2020).

C16. Pascal Volino, Frederic Cordier, Nadia Magnenat-Thalmann. From early virtual garment simulation to interactive fashion design. Computer-Aided Design 37 (2005) pp. 593-608, DOI: 10.1016/j.cad.2004.09.003.

C17. Shantseva O. A., Petrosova I. A., Andreeva E. G., Ivanova A. A. Research of existing systems of virtual fitting of clothes. Modern problems of science and education, ¹2-3, 2015, p. 2. 10.

The invention claimed is:

1. A method for determining dimensional parameters of a person, the method comprising:
    forming a geometric model of a person's body for a canonical pose of the person;
    forming a parametric model of the person's body based on the geometric model; and
    determining the dimensional parameters of the person based on the parametric model,
    wherein the forming of the parametric model includes:
        calculating an initial approximation of pose parameters based on feature points of a human skeleton;
        refining pose and shape parameters by minimizing an error function; and
        forming a morphing field graph for transforming the geometric model from the canonical pose and shape into an arbitrary pose and shape of the parametric model,
        wherein the morphing field graph comprises vertices containing three-dimensional space coordinates, parameters of Euclidean transformation and a weight factor, and also comprises edges between vertices, the edges providing connectivity of the morphing field graph, and
        wherein the Euclidean transformation of an arbitrary point x of the geometric model includes
            forming an orthogonal transformation matrix R and a translation vector t, so that the point x is transformed to a point Rx+t.

2. The method of claim 1, wherein the forming of the geometric model includes generating a depth map.

3. The method of claim 2, wherein the forming of the geometric model includes transforming the depth map into a point cloud.

4. The method of claim 3, wherein the transforming the depth map into the point cloud includes application of a bilateral filter.

5. The method of claim 1, wherein the error function is a sum of squares of angles between pairs of segments connecting feature points of a human skeleton in the geometrical model and in the parametric model.

6. The method of claim 1, wherein the error function for the pose parameters is a sum of squares of distances between pairs of points in a set of feature points in the geometrical model and in the parametric model.

7. The method of claim 1, wherein the error function for the pose parameters that is a sum of squares of angles between pairs of segments connecting feature points of a human skeleton in the geometrical model and in the parametric model is used first, and the error function for the pose parameters that is a sum of squares of distances between pairs of points in a set of feature points in the geometrical model and in the parametric model is used afterwards to refine pose and shape parameters.

8. The method of claim 1, wherein the error function for the pose and shape parameters is $$E_{init}(P, \theta, \beta) = \sum_{x \in P} \min_{v \in U} \rho(\|v - x\|) + \sum_{v \in U} \min_{x \in P} \rho(\|v - x\|),$$

where P is a plurality of visible points x of the geometrical model, θ refers to the pose parameters, β refers to the shape parameters, U is a plurality of visible vertices v of the parametric model with the pose and shape parameters (θ, β), and ρ is Huber function, in which a parameter δ is equal to 1.

9. The method of claim 1, wherein the vertices of the graph are formed by:
    selecting a neighborhood radius δ value;
    partitioning space into voxels, whose side is equal to 2δ;
    determining vertex coordinates as medoid coordinates for each voxel;
    assigning a weigh factor equal to 2δ to each vertex.

10. The method of claim 1, wherein the edges between the vertices the graph are formed if these vertices are among a predetermined number of nearest vertices within a shortest path in the graph.

11. The method of claim 10, wherein a number of the nearest vertices is equal to eight.

12. The method of claim 1, further comprising identifying vertices of the graph nearest to the point x,
    wherein the transformation matrix R and the translation vector t are calculated based on a weighted sum of dual quaternions of the identified vertices $v_c$ nearest to the point x, where a weight w of each dual quaternion is calculated as follows:

$$w = \exp\left(-\frac{\|x - v_c\|_2^2}{2v_w^2}\right),$$

or taken as 0, if $\|x-x_c\|_2 > 3v_w$ is the vertex weight factor.

13. The method of claim 1, wherein the parametric model of the person's body is formed using a machine learning algorithm comprising minimization of a composite error function including a morphing field error function, a model position error function, a binding error function, and a regularization error function.

14. The method of claim 13, wherein the morphing field error function is $$E_{field} = \sum_{(v,u) \in C} \tilde{n}_v^T(\tilde{v} - u),$$

where C is a plurality of pairs (v, u), in which v is a vertex of a visible surface of a scene or a model in a canonical position, u is a point of a current frame point cloud, $\tilde{v}$ is a vertex transformed by the morphing field, ñ is a surface normal at the vertex v, transformed by the morphing field.

15. The method of claim 13, wherein the model position error function is $$E_{model} = \sum_{(v,u) \in C} \hat{n}_v^T(\hat{v} - u),$$

where C is a plurality of pairs (v, u), in which v is a vertex of a visible surface of a scene or a model in the canonical position, u is a point of a current frame point cloud, $\tilde{v}$ is a vertex transformed by the morphing field, $\tilde{n}_v$ is a surface normal at the vertex v, transformed by a skinning function.

16. The method of claim 15, wherein the visible surface of the scene is determined as follows:
- a surface is rendered into a depth map using a standard rendering approach, then a value of $Z_{depth}$ is read from a depth buffer, while camera parameters are kept the same as for a previous frame;
- a surface vertex is projected onto an image plane, and a pixel of a previous depth map is calculated based on the projection coordinates for the vertex;
- a distance $z_{vert}$ between the image plane and the vertex is compared with a value of $Z_{depth}$ for the corresponding pixel of the previous depth map, then the surface vertex is considered visible, if $Z_{vert} < Z_{depth+\epsilon}$, where $\epsilon$ is a constant.

17. The method of claim 13, wherein the binding error function is $$E_{bind} = \sum_{x \in V_f} \|\hat{x}_c - \tilde{x}_c\|_2^2,$$

where $\hat{x}_c$ is a vertex transformed by a skinning function, $\tilde{x}_c$ is a vertex transformed by the morphing field.

18. The method of claim 13, wherein the regularization error function is $$E_{reg} = \sum_{x \in V_f} \sum_{y|(x,y) \in E_f} \rho(\|W_x - W_y\|_2^2)\|T_x y_c - T_y y_c\|_2^2,$$

where $W_x$ is a skinning weight factor for a vertex x, $W_y$ is a skinning weight factor for a vertex y, the weight factors defined by the parametric model for each vertex, $\rho$ is Huber weight function with parameter $\delta=0.2$, $T_x$, $T_y$ are Euclidean transformation matrices corresponding to dual quaternions of the vertex x and the vertex y, correspondingly.

19. The method of claim 1, further comprising determining a human shape type of the person's body as one of thin, normal, and thick (for men), and thin, normal with apparent waist, normal without apparent waist, stout with apparent waist, stout without apparent waist (for women).

* * * * *